US012696041B2

(12) United States Patent
Fyrlund et al.

(10) Patent No.: US 12,696,041 B2
(45) Date of Patent: Jul. 28, 2026

(54) TRANSDUCER WITH NEW SPRING ATTACHMENT

(71) Applicant: COCHLEAR LIMITED, Macquarie University (AU)

(72) Inventors: Henrik Fyrlund, Macquarie University (AU); Tommy Bergs, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 390 days.

(21) Appl. No.: 18/277,018

(22) PCT Filed: Feb. 12, 2022

(86) PCT No.: PCT/IB2022/051263
§ 371 (c)(1),
(2) Date: Aug. 11, 2023

(87) PCT Pub. No.: WO2022/172226
PCT Pub. Date: Aug. 18, 2022

(65) Prior Publication Data
US 2024/0340601 A1 Oct. 10, 2024

Related U.S. Application Data

(60) Provisional application No. 63/148,814, filed on Feb. 12, 2021.

(51) Int. Cl.
*H04R 25/00* (2006.01)

(52) U.S. Cl.
CPC ....... *H04R 25/606* (2013.01); *H04R 2460/13* (2013.01)

(58) Field of Classification Search
CPC .......................... H04R 25/606; H04R 2460/13
USPC .......................................................... 381/322
See application file for complete search history.

(56) References Cited

U.S. PATENT DOCUMENTS

| | | | | |
|---|---|---|---|---|
| 6,942,469 | B2 | 9/2005 | Seale et al. | |
| 8,246,532 | B2 | 8/2012 | Ball et al. | |
| 9,113,277 | B2 | 8/2015 | Ball et al. | |
| 9,716,953 | B2 | 7/2017 | Andersson et al. | |
| 2008/0255406 | A1 | 10/2008 | Ball et al. | |
| 2010/0145135 | A1 | 6/2010 | Ball et al. | |
| 2015/0123499 | A1 | 5/2015 | Park et al. | |
| 2017/0111728 | A1 | 4/2017 | Kim et al. | |
| 2018/0372692 | A1* | 12/2018 | Bergs | H04R 9/047 |

(Continued)

FOREIGN PATENT DOCUMENTS

| | | | |
|---|---|---|---|
| KR | 101484650 | B1 | 1/2015 |
| KR | 20150051786 | A | 5/2015 |
| KR | 20180090489 | A | 8/2018 |

OTHER PUBLICATIONS

International Search Report and Written Opinion for PCT/IB2020/051263, mailed May 19, 2022.

*Primary Examiner* — Sean H Nguyen
(74) *Attorney, Agent, or Firm* — Pilloff Passino & Cosenza LLP; Martin J. Cosenza

(57) ABSTRACT

A device including a yoke, a counterweight apparatus and a flexible apparatus connecting the yoke to the counterweight apparatus and enabling the counterweight apparatus to move relative to the yoke, wherein the flexible apparatus is attached to the counterweight apparatus via a radial connection, and the device is an electromagnetic transducer.

21 Claims, 34 Drawing Sheets

(56) References Cited

U.S. PATENT DOCUMENTS

| | | | | |
|---|---|---|---|---|
| 2018/0376247 | A1* | 12/2018 | Bergs | H04R 9/027 |
| 2020/0296525 | A1* | 9/2020 | Nyström | H04R 11/02 |

* cited by examiner

TRANSDUCER WITH NEW SPRING ATTACHMENT

CROSS-REFERENCE TO RELATED APPLICATIONS

This application claims priority to U.S. Provisional Application No. 63/148,814, entitled TRANSDUCER WITH NEW SPRING ATTACHMENT, filed on Feb. 12, 2021, naming Henrik FYRLUND of Molnlycke, Sweden as an inventor, the entire contents of that application being incorporated herein by reference in its entirety.

BACKGROUND

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In an exemplary embodiment, there is a device, comprising: a yoke; a counterweight apparatus; and a flexible apparatus connecting the yoke to the counterweight apparatus and enabling the counterweight apparatus to move relative to the yoke, wherein the flexible apparatus is attached to the counterweight apparatus via a radial connection, and the device is an electromagnetic transducer.

In an exemplary embodiment, there is a device, comprising: a counterweight apparatus; and a spring connected to the counterweight apparatus, wherein the spring positively interferes with the counterweight apparatus, thus attaching the counterweight apparatus to the spring, and wherein the device is an electromagnetic transducer.

In an exemplary embodiment, there is a method, comprising: obtaining a counterweight of an electromagnetic transducer; obtaining a yoke-counterweight connector spring of the electromagnetic transducer; and establishing a transduction functional connection between the spring and the counterweight, wherein the action of establishing the transduction functional connection is executed primarily without piercing the spring with a retention component and without adhesives.

In an exemplary embodiment, there is an electromagnetic transducer, comprising: a counterweight apparatus of the electromagnetic transducer, the counterweight apparatus including permanent magnets; a bobbin and coil assembly of the electromagnetic transducer; and a spring connected to the counterweight apparatus and connected to the bobbin and coil assembly, the spring enabling relative movement between the counterweight apparatus and the bobbin and coil assembly, wherein the spring positively interferes with the counterweight apparatus, thus attaching the counterweight apparatus to the spring.

BRIEF DESCRIPTION OF THE DRAWINGS

Some embodiments are described below with reference to the attached drawings, in which.

DETAILED DESCRIPTION

Figure 1A:
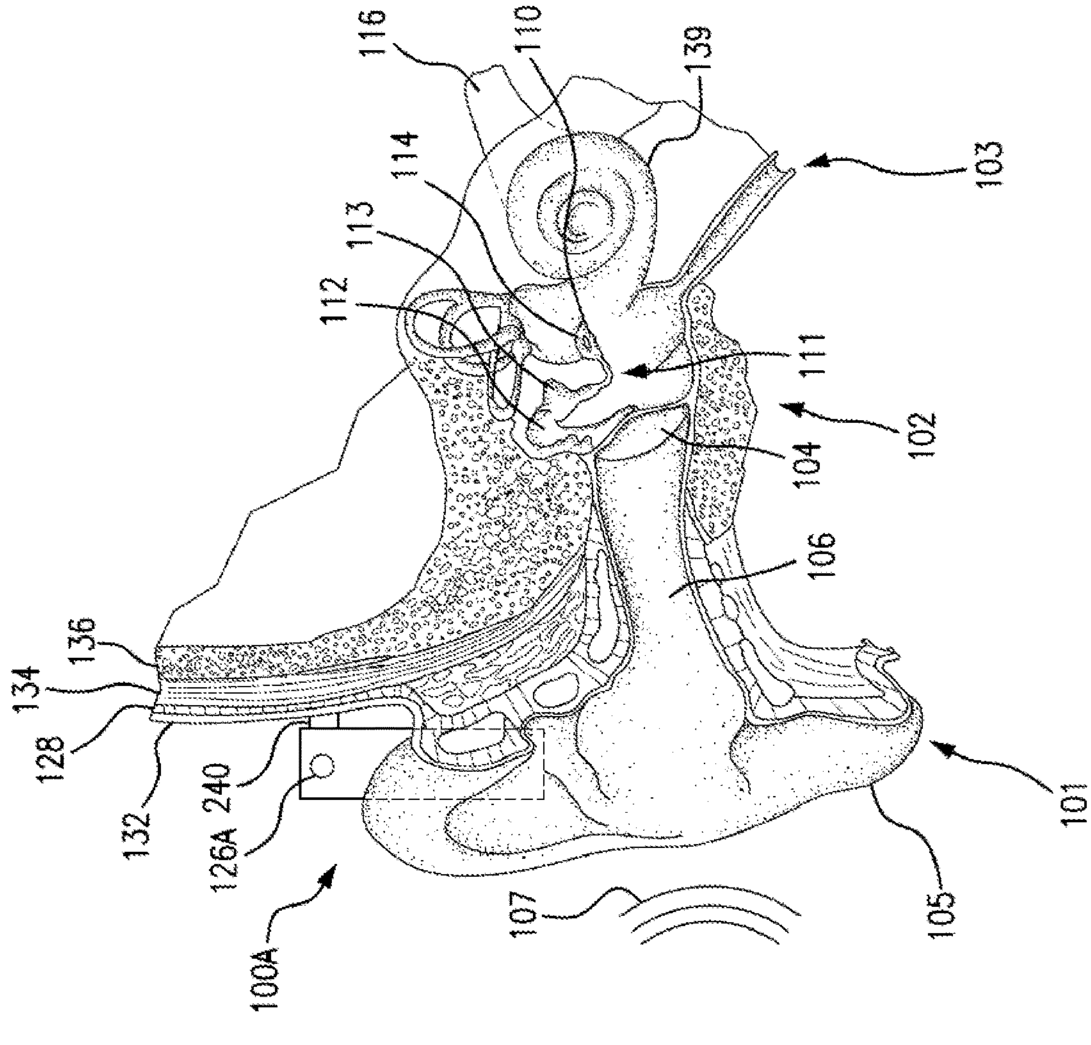
FIG. 1A is a perspective view of an exemplary bone conduction device in which at least some embodiments can be implemented.

Merely for ease of description, the techniques presented herein are primarily described herein with reference to an illustrative medical device, namely a hearing prosthesis. First introduced is a percutaneous bone conduction device. The techniques presented herein may also be used with a variety of other medical devices that, while providing a wide range of therapeutic benefits to recipients, patients, or other users, may benefit from the teachings herein used in other medical devices. For example, any techniques presented herein described for one type of hearing prosthesis, such as a percutaneous bone conduction device, corresponds to a disclosure of another embodiment of using such teaching with another hearing prosthesis, including other types of bone conduction devices (active transcutaneous and/or passive transcutaneous), middle ear auditory prostheses (particularly, the EM vibrator/actuator thereof), direct acoustic stimulators), etc. The techniques presented herein can be used with implantable/implanted microphones (where such is a transducer that receives vibrations and outputs an electrical signal (effectively, the reverse of an EM actuator), whether or not used as part of a hearing prosthesis (e.g., a body noise or other monitor, whether or not it is part of a hearing prosthesis) and/or external microphones. (And again, the EM transducers disclosed herein can correspond to implanted or external body vibration monitors.) The techniques presented herein can also be used with vestibular devices (e.g., vestibular implants), sensors, seizure devices (e.g., devices for monitoring and/or treating epileptic events, where applicable), and thus any disclosure herein is a disclosure of utilizing such devices with the teachings herein (and visa-versa), providing that the art enables such. The teachings herein can also be used with conventional hearing devices, such as telephones and ear bud devices connected MP3 players or smart phones or other types of devices that can provide audio signal output, that use an EM transducer. Indeed, the teachings herein can be used with specialized communication devices, such as military communication devices, factory floor communication devices, professional sports communication devices, etc.

By way of example, any of the technologies detailed herein which are associated with components that are implanted in a recipient can be combined with information delivery technologies disclosed herein, such as for example, devices that evoke a hearing percept, to convey information to the recipient. By way of example only and not by way of limitation, a sleep apnea implanted device can be combined with a device that can evoke a hearing percept so as to provide information to a recipient, such as status information, etc. In this regard, the various sensors detailed herein and the various output devices detailed herein can be combined with such a non-sensory prosthesis or any other nonsensory prosthesis that includes implantable components so as to enable a user interface, as will be described herein, that enables information to be conveyed to the recipient, which information is associated with the implant.

While the teachings detailed herein will be described for the most part with respect to hearing prostheses, in keeping with the above, it is noted that any disclosure herein with respect to a hearing prosthesis corresponds to a disclosure of another embodiment of utilizing the associated teachings with respect to any of the other prostheses noted herein, and/or with any of the other technologies herein (e.g., a body vibration sensor using an EM transducer as detailed herein), whether a species of a hearing prosthesis, or a species of a sensory prosthesis.

Also, it is noted that in at least some exemplary embodiments, the electromagnetic transducers disclosed herein can be utilized as vibration sensors and equipment and/or structure and/or vehicles. By way of example only and not by way limitation, in an exemplary embodiment, any and transducer according to the teachings detailed herein can be utilized to detect vibrations in general, and determine the frequency thereof in particular, that are imparted on to, for example, the door of an automobile. This can have utilitarian value with respect to determining whether or not there are vibrations that will result in discomfort or otherwise an irritating driving situation for a driver thereof.

Conversely, the teachings detailed herein can be utilized in a vibrator context to impart vibrations onto/into, equipment and/or structure and/or vehicles. As will be detailed below, in an exemplary embodiment, a vibrator according to the teachings detailed herein can be utilized to maintain the flow of dust particulates from a collecting hopper of an electrostatic precipitator. In an exemplary embodiment, the vibrator detailed herein can maintain the flow of pasta or some other quasi-particle group of products, for example from bins to a packaging line, etc.

FIG. 1A is a perspective view of a bone conduction device 100A in which embodiments may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113, and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1A also illustrates the positioning of bone conduction device 100A relative to outer ear 101, middle ear 102 and inner ear 103 of a recipient of device 100. As shown, bone conduction device 100 is positioned behind outer ear 101 of the recipient and comprises a sound input element 126A to receive sound signals. Sound input element may comprise, for example, a microphone, telecoil, etc. In an exemplary embodiment, sound input element 126A may be located, for example, on or in bone conduction device 100A, or on a cable extending from bone conduction device 100A.

In an exemplary embodiment, bone conduction device 100A comprises an operationally removable component and a bone conduction implant. The operationally removable component is operationally releasably coupled to the bone conduction implant. By operationally releasably coupled, it is meant that it is releasable in such a manner that the recipient can relatively easily attach and remove the operationally removable component during normal use of the bone conduction device 100A. Such releasable coupling is accomplished via a coupling assembly of the operationally removable component and a corresponding mating apparatus of the bone conduction implant, as will be detailed below. This as contrasted with how the bone conduction implant is attached to the skull, as will also be detailed below. The operationally removable component includes a sound processor (not shown), a vibratory electromagnetic actuator and/or a vibratory piezoelectric actuator and/or other type of actuator (not shown-which are sometimes referred to herein as a species of the genus vibrator) and/or various other operational components, such as sound input device 126A. In this regard, the operationally removable component is sometimes referred to herein as a vibrator unit. More particularly, sound input device 126A (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100A further includes a coupling assembly 240 configured to operationally removably attach the operationally removable component to a bone conduction implant (also referred to as an anchor system and/or a fixation system) which is implanted in the recipient. In the embodiment of FIG. 1, coupling assembly 240 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture, which is screwed into bone 136, through muscle 134, fat 128 and skin 232 so that the coupling assembly may be attached thereto. Such a percutaneous abutment provides an attachment location for the coupling assembly that facilitates efficient transmission of mechanical force.

It is noted that while many of the details of the embodiments presented herein are described with respect to a percutaneous bone conduction device, some or all of the teachings disclosed herein may be utilized in transcutaneous bone conduction devices and/or other devices that utilize a vibratory electromagnetic actuator. For example, embodiments include active transcutaneous bone conduction systems utilizing the electromagnetic actuators disclosed herein and variations thereof where at least one active component (e.g. the electromagnetic actuator) is implanted beneath the skin. Embodiments also include passive transcutaneous bone conduction systems utilizing the electromagnetic actuators disclosed herein and variations thereof where no active component (e.g., the electromagnetic actuator) is implanted beneath the skin (it is instead located in an external device), and the implantable part is, for instance a magnetic pressure plate. Some embodiments of the passive transcutaneous bone conduction systems are configured for use where the vibrator (located in an external device) containing the electromagnetic actuator is held in place by pressing the vibrator against the skin of the recipient. In an exemplary embodiment, an implantable holding assembly is implanted in the recipient that is configured to press the bone conduction device against the skin of the recipient. In other embodiments, the vibrator is held against the skin via a magnetic coupling (magnetic material and/or magnets being implanted in the recipient and the vibrator having a magnet and/or magnetic material to complete the magnetic circuit, thereby coupling the vibrator to the recipient).

Figure 1B:
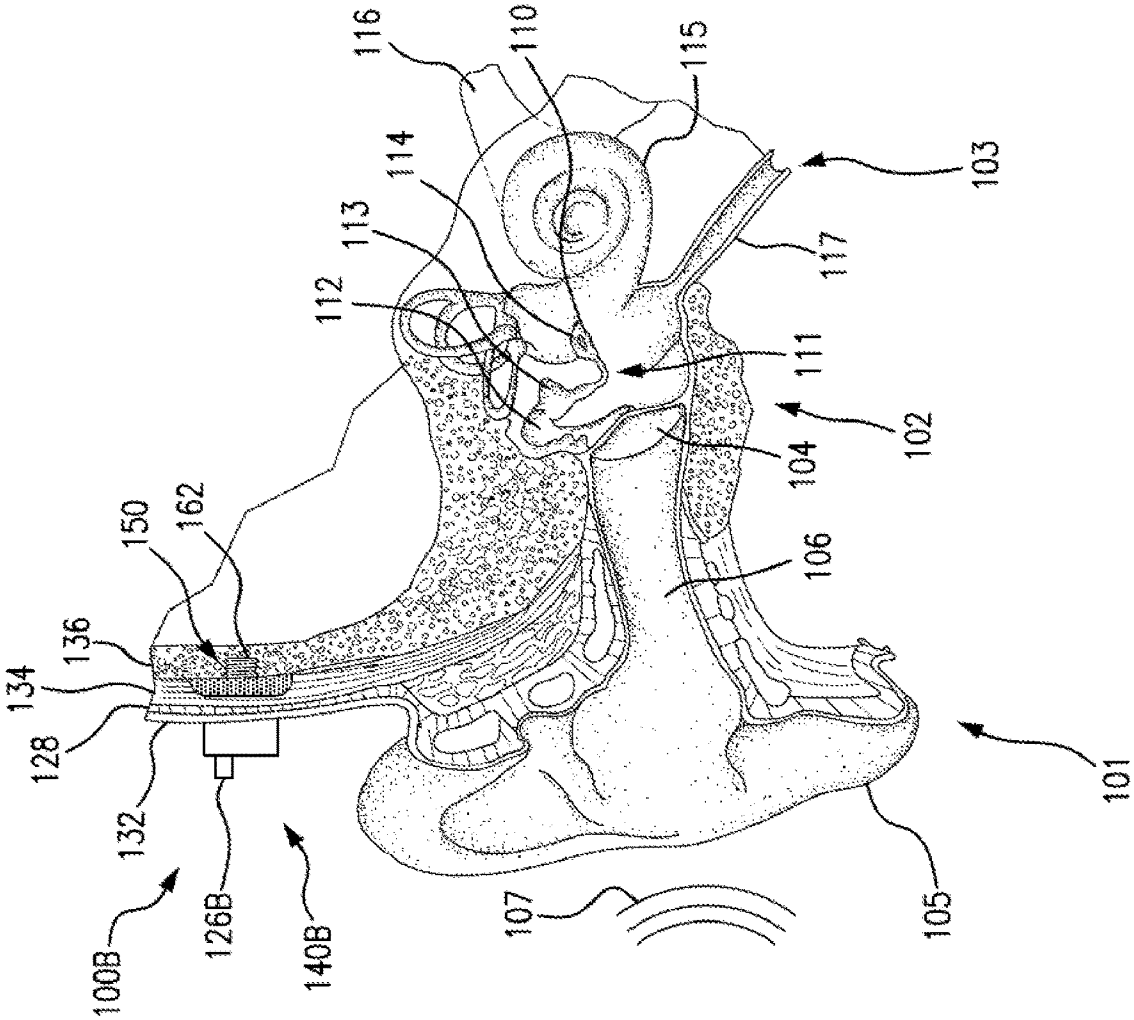
FIG. 1B is a perspective view of an alternate exemplary bone conduction device in which at least some embodiments can be implemented.

More specifically, FIG. 1B is a perspective view of a transcutaneous bone conduction device 100B in which embodiments can be implemented.

FIG. 1A also illustrates the positioning of bone conduction device 100B relative to outer ear 101, middle ear 102 and inner ear 103 of a recipient of device 100. As shown, bone conduction device 100 is positioned behind outer ear 101 of the recipient. Bone conduction device 100B comprises an external component 140B and implantable component 150. The bone conduction device 100B includes a sound input element 126B to receive sound signals. As with sound input element 126A, sound input element 126B may comprise, for example, a microphone, telecoil, etc. In an exemplary embodiment, sound input element 126B may be located, for example, on or in bone conduction device 100B, on a cable or tube extending from bone conduction device 100B, etc. Alternatively, sound input element 126B may be subcutaneously implanted in the recipient, or positioned in the recipient's ear. Sound input element 126B may also be a component that receives an electronic signal indicative of sound, such as, for example, from an external audio device. For example, sound input element 126B may receive a sound signal in the form of an electrical signal from an MP3 player electronically connected to sound input element 126B.

Bone conduction device 100B comprises a sound processor (not shown), an actuator (also not shown) and/or various other operational components. In operation, sound input device 126B converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1B, bone conduction device 100B is a passive transcutaneous bone conduction device. That is, no active components, such as the actuator, are implanted beneath the recipient's skin 132. In such an arrangement, the active actuator is located in external component 140B, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1B, bone conduction device 100B is an active transcutaneous bone conduction device where at least one active component, such as the actuator, is implanted beneath the recipient's skin 132 and is thus part of the implantable component 150. As described below, in such an arrangement, external component 140B may comprise a sound processor and transmitter, while implantable component 150 may comprise a signal receiver and/or various other electronic circuits/devices.

Figure 1C:
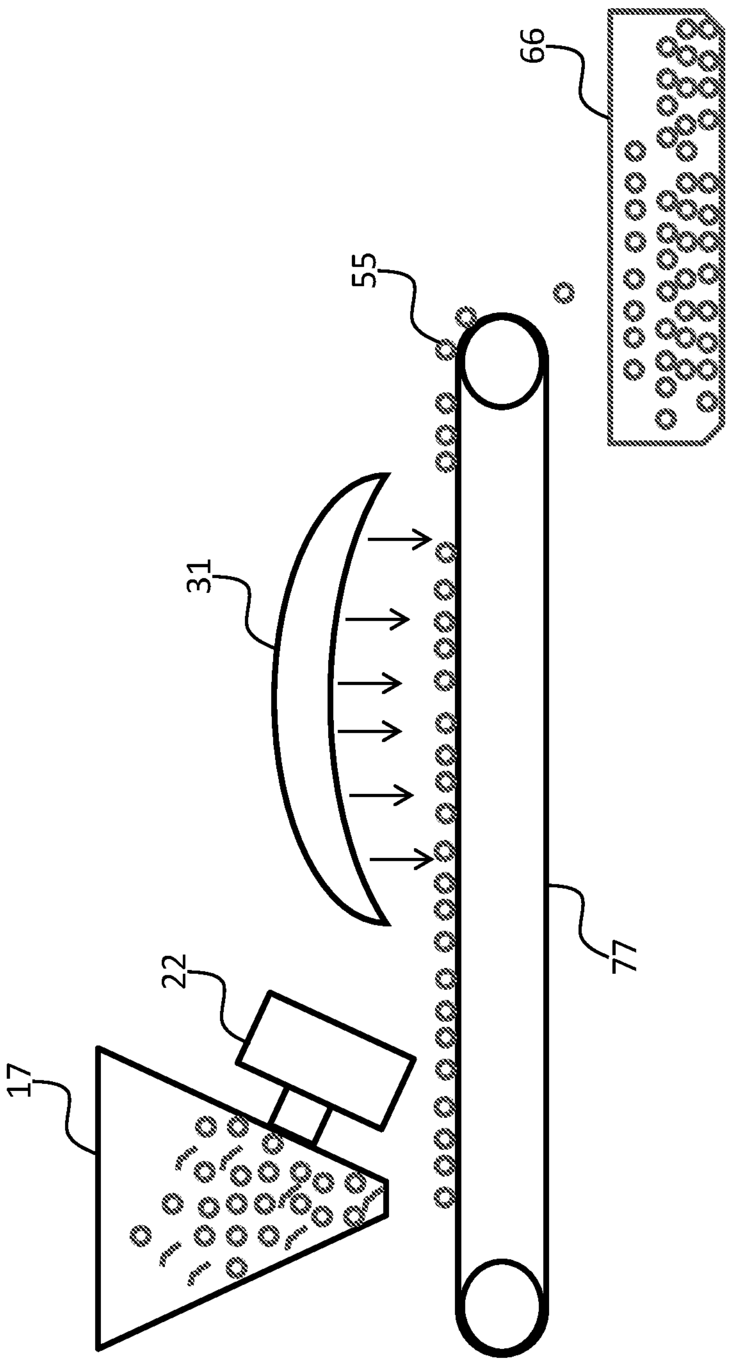
FIGS. 1C and 1D are schematics of uses of embodiments in which transducers according to the teachings herein can be used.

FIG. 1C depicts an exemplary embodiment of a bin 17 to which is attached in vibrational communication a vibrator 22. The vibrator 22 vibrates, and thus "shakes" the material therein to more evenly distribute a solid mixture of electrostatically charged particles and golf balls 55. Briefly, the shaking results in a more evenly distributed coating of the particles on the golf balls, after which they are dropped out of the bin 17 onto conveyor belt 77, where they are taken to heater 31 which bakes the particles one to the outer surface of the golf balls. The now coated golf balls then fall into bin 66 for later packaging.

Figure 1D:
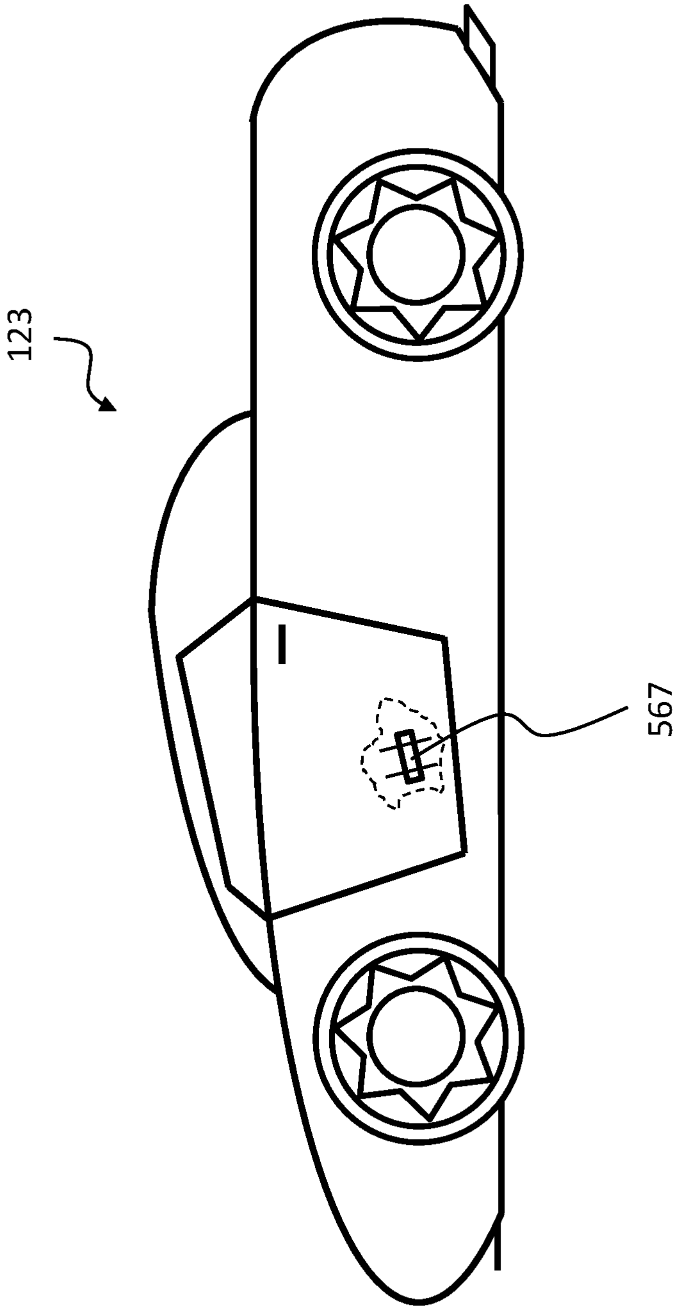

FIG. 1D depicts another exemplary embodiment that can utilize a transducer. Here, transducer 567 is located inside the door of automobile 123, held in the interior compartment thereof by straps, where the transducer 567, more accurately, the housing of the transducer 567 is in vibrational communication with the body of the door. In this embodiment, the transducer 567 is in electrical communication with and onboard computer of the automobile 123. The transducer consents vibrations, such as those above the 500 Hz level, which might result in an uncomfortable sensation for the driver. An onboard computer can adjust the operation of the automobile 123 so as to potentially alleviate the vibration.

Figure 2:
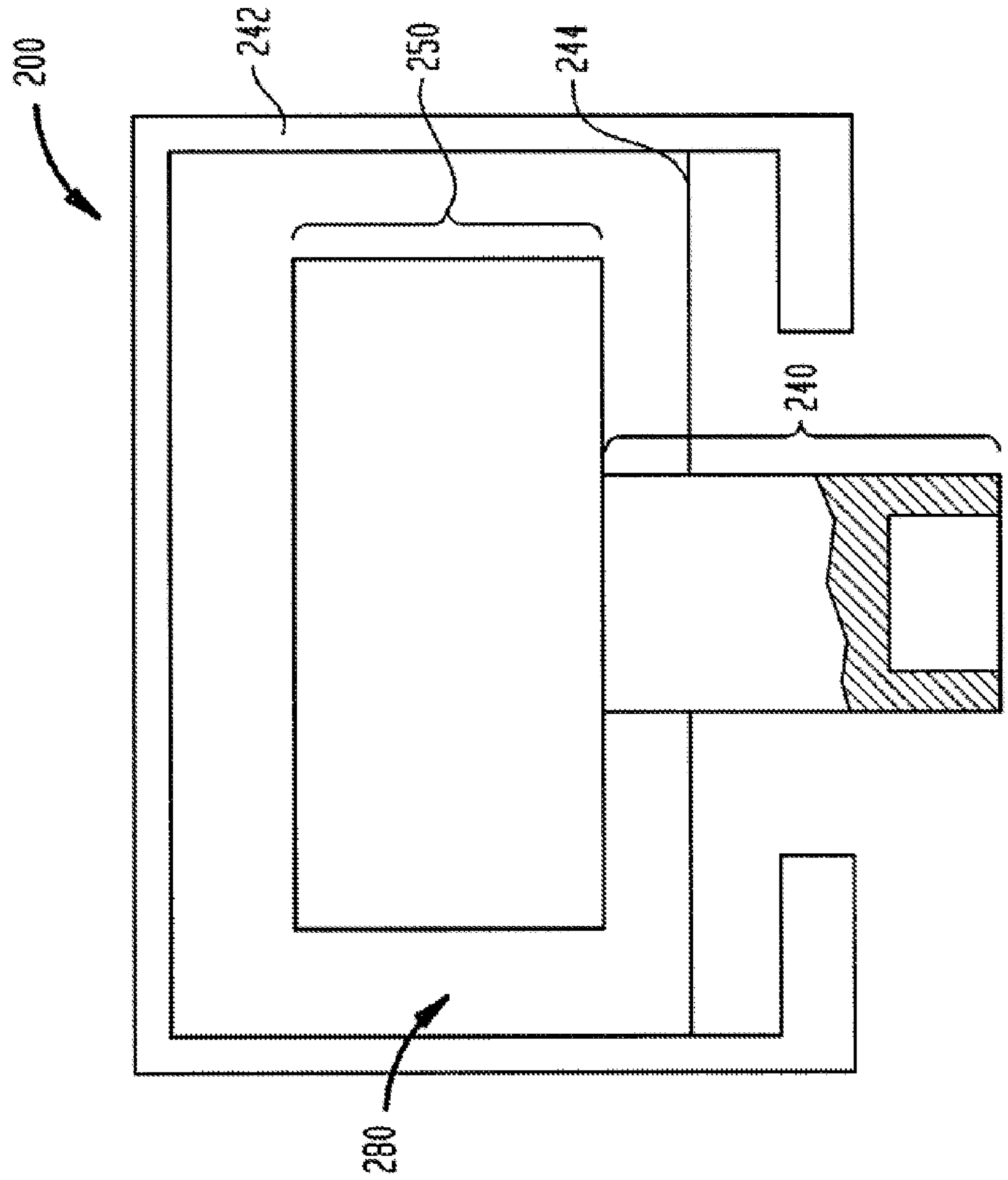
FIG. 2 is a schematic diagram conceptually illustrating a removable component of a percutaneous bone conduction device in accordance with at least some exemplary embodiments.

FIG. 2 is an embodiment of a bone conduction device 200 in accordance with an embodiment corresponding to that of FIG. 1A, illustrating use of a percutaneous bone conduction device. Bone conduction device 200, corresponding to, for example, element 100A of FIG. 1A, includes a housing 242, a vibratory electromagnetic actuator 250, a coupling assembly 240 that extends from housing 242 and is mechanically linked to vibratory electromagnetic actuator 250. Collectively, vibratory electromagnetic actuator 250 and coupling assembly 240 form a vibratory actuator-coupling assembly 280. Vibratory actuator-coupling assembly 280 is suspended in housing 242 by spring 244. In an exemplary embodiment, spring 244 is connected to coupling assembly 240, and vibratory electromagnetic actuator 250 is supported by coupling assembly 240.

Figure 3:
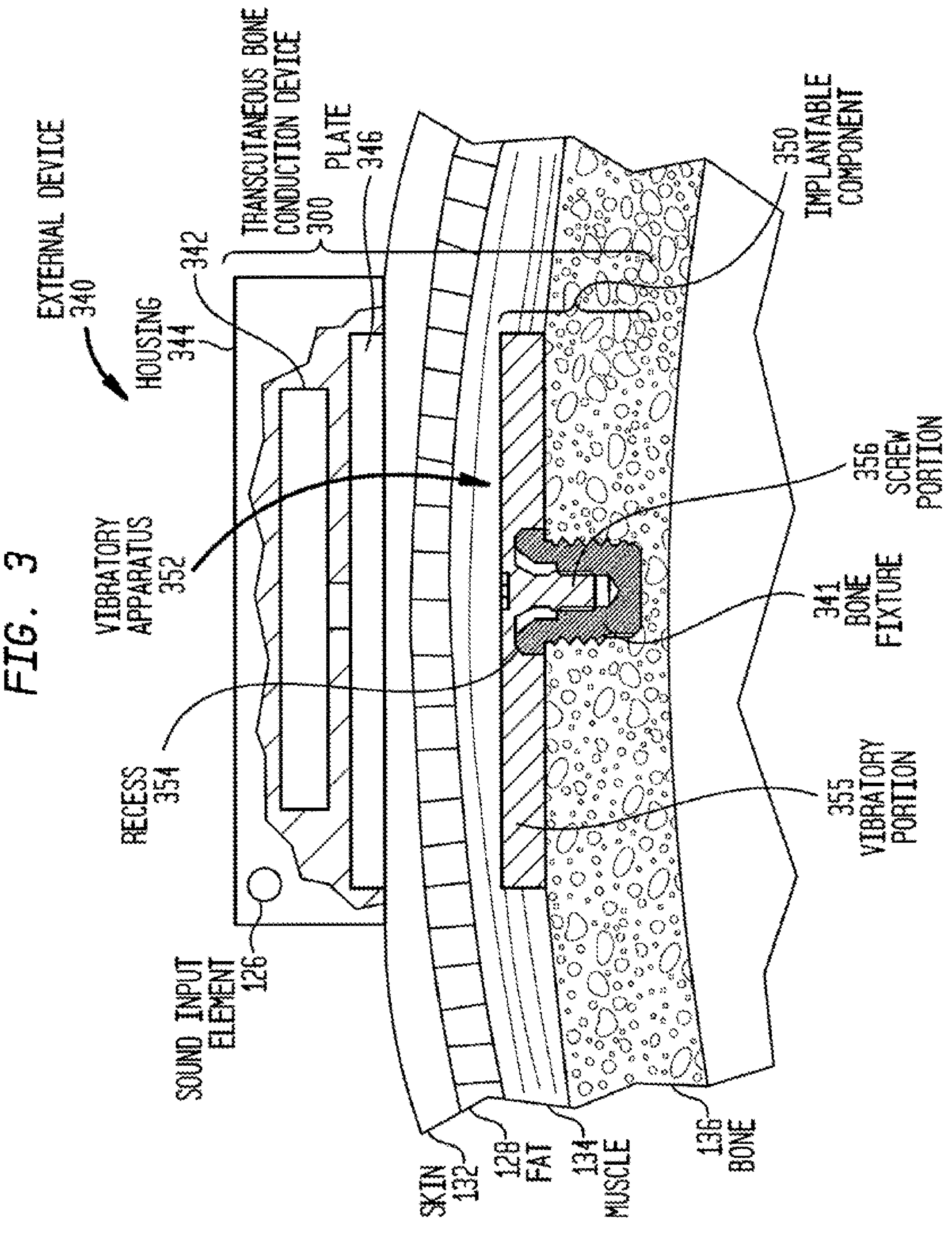
FIG. 3 is a schematic diagram conceptually illustrating a passive transcutaneous bone conduction device in accordance with at least some exemplary embodiments.

FIG. 3 depicts an exemplary embodiment of a transcutaneous bone conduction device 300 according to an embodiment that includes an external device 340 (corresponding to, for example, element 140B of FIG. 1B) and an implantable component 350 (corresponding to, for example, element 150 of FIG. 1B). The transcutaneous bone conduction device 300 of FIG. 3 is a passive transcutaneous bone conduction device in that a vibratory electromagnetic actuator 342 is located in the external device 340. Vibratory electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibratory electromagnetic actuator 342 is a device that converts electrical signals into vibration. In operation, sound input element 126 converts sound into electrical signals. Specifically, the transcutaneous bone conduction device 300 provides these electrical signals to vibratory actuator 342, or to a sound processor (not shown) that processes the electrical signals, and then provides those processed signals to vibratory electromagnetic actuator 342. The vibratory electromagnetic actuator 342 converts the electrical signals (processed or unprocessed) into vibrations. Because vibratory electromagnetic actuator 342 is mechanically coupled to plate 346, the vibrations are transferred from the vibratory actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibratory electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

Figure 4:
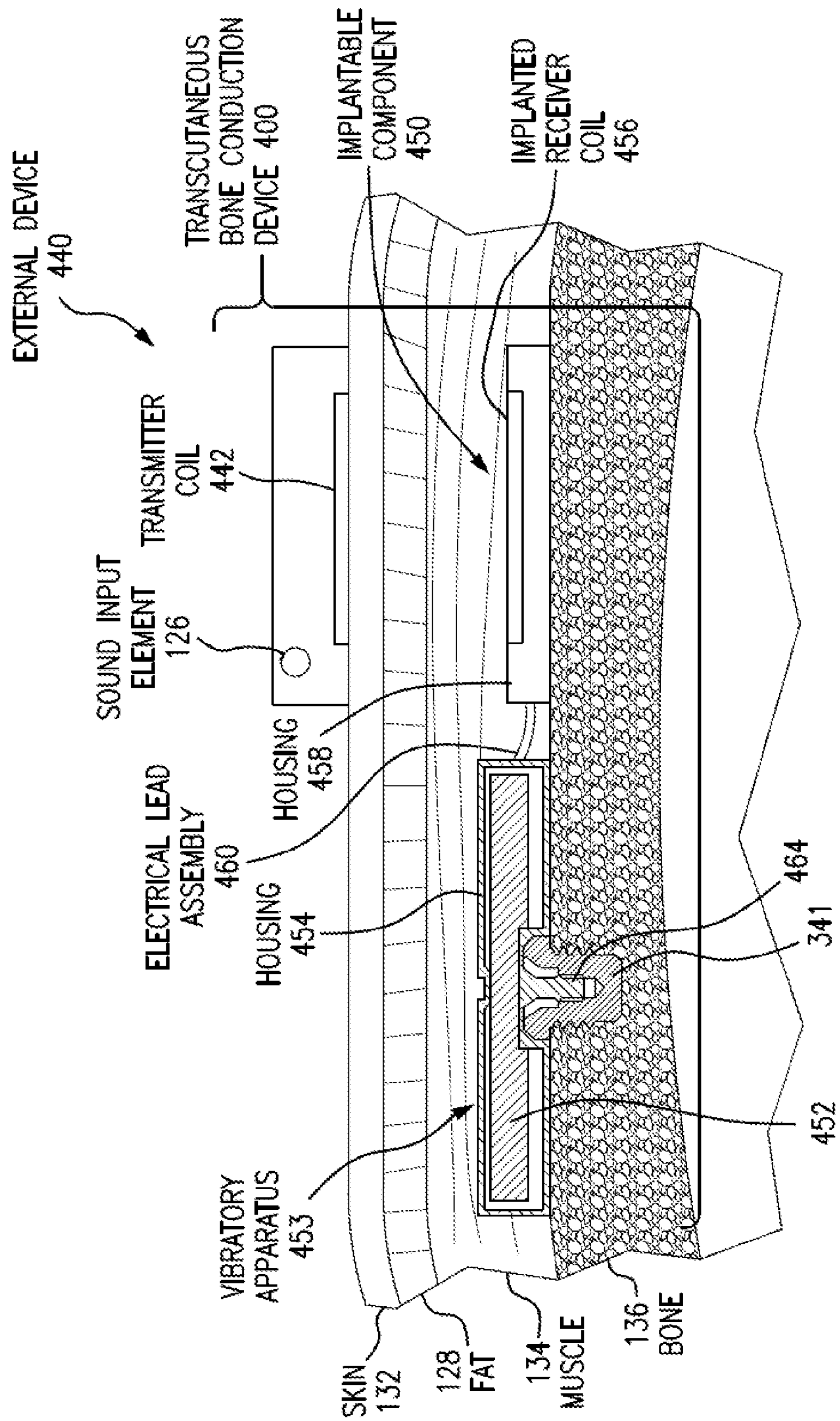
FIG. 4 is a schematic diagram conceptually illustrating an active transcutaneous bone conduction device in accordance with at least some exemplary embodiments.

FIG. 4 depicts an exemplary embodiment of a transcutaneous bone conduction device 400 according to another embodiment that includes an external device 440 (corresponding to, for example, element 140B of FIG. 1B) and an implantable component 450 (corresponding to, for example, element 150 of FIG. 1B). The transcutaneous bone conduction device 400 of FIG. 4 is an active transcutaneous bone conduction device in that the vibratory actuator 452 is located in the implantable component 450. Specifically, a vibratory element in the form of vibratory actuator 452 is located in housing 454 of the implantable component 450. In an exemplary embodiment, much like the vibratory actuator 342 described above with respect to transcutaneous bone conduction device 300, the vibratory actuator 452 is a device that converts electrical signals into vibration.

External component 440 includes a sound input element 126 that converts sound into electrical signals. Specifically, the transcutaneous bone conduction device 400 provides these electrical signals to vibratory electromagnetic actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibratory actuator 452 via electrical lead assembly 460. The vibratory electromagnetic actuator 452 converts the electrical signals into vibrations.

The vibratory electromagnetic actuator 452 is mechanically coupled to the housing 454. Housing 454 and vibratory actuator 452 collectively form a vibratory element 453. The housing 454 is substantially rigidly attached to bone fixture 341.

Some exemplary features of the vibratory electromagnetic actuator usable in some embodiments of the bone conduction devices detailed herein and/or variations thereof will now be described in terms of a vibratory electromagnetic actuator used in the context of the percutaneous bone conduction device of FIG. 1A. It is noted that any and/or all of these features and/or variations thereof may be utilized in transcutaneous bone conduction devices such as those of FIGS. 1B, 3 and 4 and/or other types of prostheses and/or medical devices and/or other devices, at least with respect to enabling utilitarian performance thereof. It is also noted that while the embodiments detailed herein are detailed with respect to an electromagnetic actuator, the teachings associated therewith are equally applicable to electromagnetic transducers that receive vibrations and output a signal indicative of the vibrations, at least unless otherwise noted. In this regard, it is noted that use of the term actuator herein also corresponds to transducer, and vice-versa, unless otherwise noted.

Figure 5:
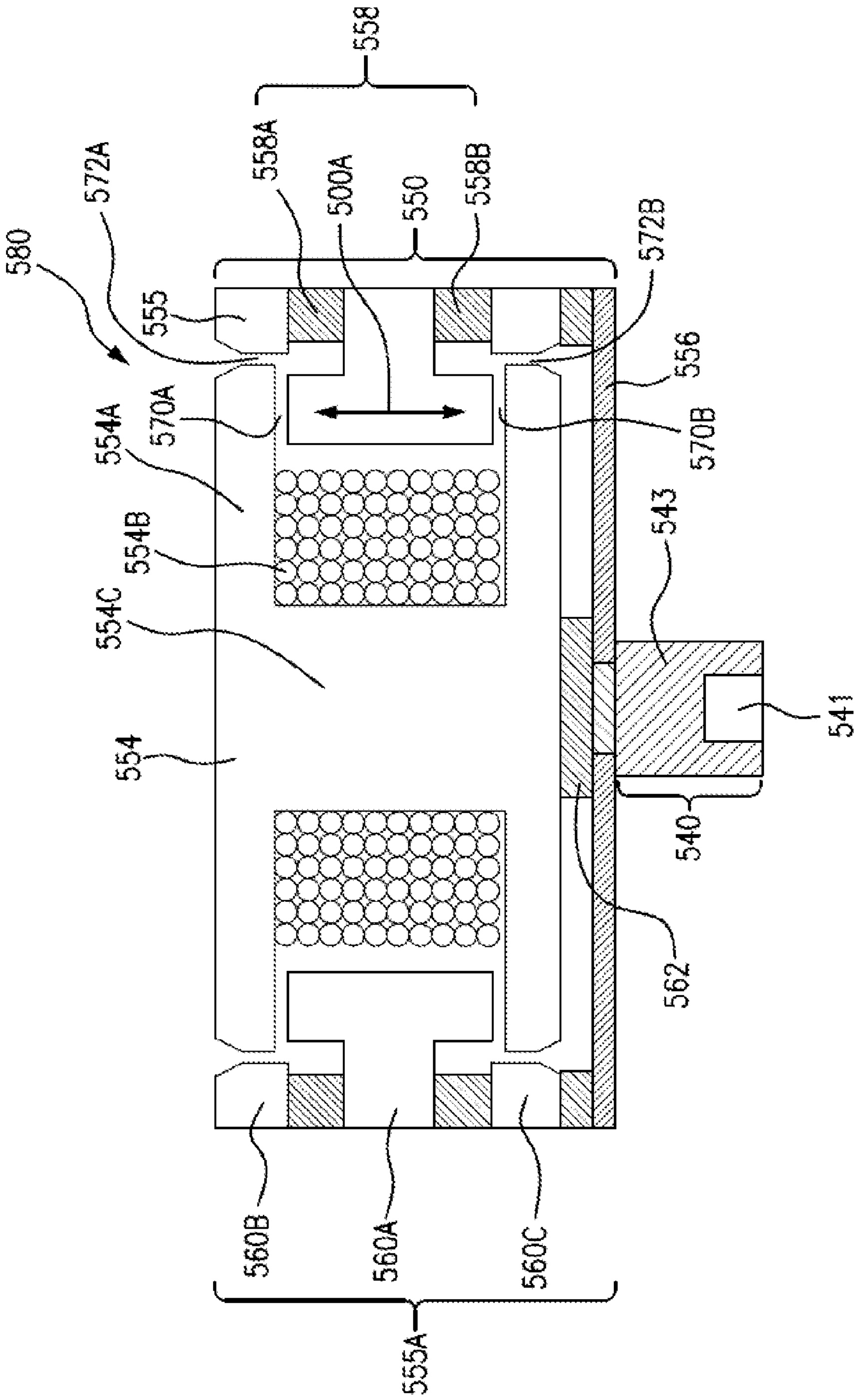
FIG. 5 is a cross-sectional view of an example of a vibratory actuator-coupling assembly of the bone conduction device of FIG. 2.

FIG. 5 is a cross-sectional view of a vibratory actuator-coupling assembly 580, which can correspond to vibratory actuator-coupling assembly 280 detailed above. The vibratory actuator-coupling assembly 580 includes a vibratory electromagnetic actuator 550 and a coupling assembly 540. Coupling assembly 540 includes a coupling 541 mounted on coupling shaft 543. Additional details pertaining to the coupling assembly are described further below with respect to the design of FIG. 6A.

As illustrated in FIG. 5, vibratory electromagnetic actuator 550 includes a bobbin assembly 554 and a counterweight assembly 555. As illustrated, bobbin assembly 554 includes a bobbin 554A and a coil 554B that is wrapped around a core 554C of bobbin 554A. In the illustrated design, bobbin assembly 554 is radially symmetrical.

Counterweight assembly 555 includes spring 556, permanent magnets 558A and 558B, yokes 560A, 560B and 560C, and spacer 562. Spacer 562 provides a connective support between spring 556 and the other elements of counterweight assembly 555 just detailed. Spring 556 connects bobbin assembly 554 via spacer 524 to the rest of counterweight assembly 555, and permits counterweight assembly 555 to move relative to bobbin assembly 554 upon interaction of a dynamic magnetic flux, produced by bobbin assembly 554.

Coil 554B, in particular, may be energized with an alternating current to create the dynamic magnetic flux about coil 554B. Conversely, permanent magnets 558A and 558B generate a static magnetic flux. These permanent magnets 558A and 558B are part of counterweight assembly 555, which also includes yokes 560A, 560B and 560C. The yokes 560A, 560B and 560C can be made of a soft iron in some designs.

As may be seen, vibratory electromagnetic actuator 550 includes two axial air gaps 570A and 570B that are located between bobbin assembly 554 and counterweight assembly 555. With respect to a radially symmetrical bobbin assembly 554 and counterweight assembly 555, such as that detailed in FIG. 5, air gaps 570A and 570B extend in the direction of relative movement between bobbin assembly 554 and counterweight assembly 555, indicated by arrow 500A.

Further as may be seen in FIG. 5, the vibratory electromagnetic actuator 550 includes two radial air gaps 572A and 572B that are located between bobbin assembly 554 and counterweight assembly 555. With respect to a radially symmetrical bobbin assembly 554 and counterweight assembly 555, the air gap extends about the direction of relative movement between bobbin assembly 554 and counterweight assembly 555. As may be seen in FIG. 5, the permanent magnets 558A and 558B are arranged such that their respective south poles face each other, and their respective north poles face away from each other. It is noted that in an alternate design, the reverse can be the case (respective north poles face towards each other and respective south poles face away from each other).

In the electromagnetic actuator of FIG. 5, the radial air gaps 572A and 572B close static magnetic flux between the bobbin 554A and the yokes 560B and 560C, respectively. Further, axial air gaps 570A and 570B close the static and dynamic magnetic flux between the bobbin 554A and the yoke 560A. Accordingly, in the radially symmetrical device of FIG. 5, there are a total of four (4) air gaps.

It is noted that the electromagnetic actuator of FIG. 5 is a balanced actuator. In alternate configuration a balanced actuator can be achieved by adding additional axial air gaps above and below the outside of bobbin 554B (and in some variations thereof, the radial air gaps are not present due to the addition of the additional axial air gaps). In such an alternate configuration, the yokes 560B and 560C are reconfigured to extend up and over the outside of bobbin 554B (the geometry of the permanent magnets 558A and 558B and/or the yoke 560A might also be reconfigured to achieve utility of the actuator). Collectively magnets 558B and 558A make up the static magnetic flux assembly 558C (see FIG. 22).

Some designs of a balanced electromagnetic transducer will now be described that utilize fewer air gaps than the configuration of FIG. 5 and the alternate variations as described above. In some exemplary designs, the electromagnetic actuator (balanced and/or unbalanced, as detailed below) is achieved by providing functionality to a resilient element, such as by way of example and not by way of limitation, a spring, beyond that which is normally associated therewith. Designs detailed herein are detailed with respect to a spring. It is noted, however, that in alternate designs of these designs and/or variations thereof, the disclosure of spring also corresponds to the disclosure of a resilient element. More particularly, not only does the spring provide resilient elasticity concomitant with the traditional use of the spring, but the spring also provides a conduit for magnetic flux (static and/or dynamic). In an exemplary design utilizing a spring having such functionality, one or more of the above mentioned air gaps with respect to the design of FIG. 5 (e.g. the radial air gaps) are eliminated and/or one or more of the soft iron parts utilized in that design are not utilized in this exemplary design.

More particularly, it is noted that the balance electromagnetic actuator of FIG. 5 relies on at least four air gaps (while the design of FIG. 5 is depicted as including two axial air gaps and two radial air gaps, other balance electromagnetic actuators utilize four axial air gaps). An exemplary design includes a spring having dual functionality as a traditional spring, on the one hand, and a conduit for magnetic flux, on the other hand, such that at least one or two of the air gaps of the design of FIG. 5 can eliminated. Functionality according to a "traditional spring" includes, for example, an device that elastically deforms/moves from its unloaded position when pushed or pulled or pressed (i.e., subjected to load) and then returns to its original shape/returns to is unloaded position when the pushing, pulling or pressing is removed (load is removed).

In this regard, in some designs, there is an electromagnetic actuator that is balanced that has only two air gaps (both axial air gaps) owing to the fact that the spring(s) replaces two of the radial air gaps. That is, the magnetic flux is conducted through spring(s) instead of through air gaps. An exemplary design of such will now be described, followed by some exemplary descriptions of some alternate designs.

Figure 6A:
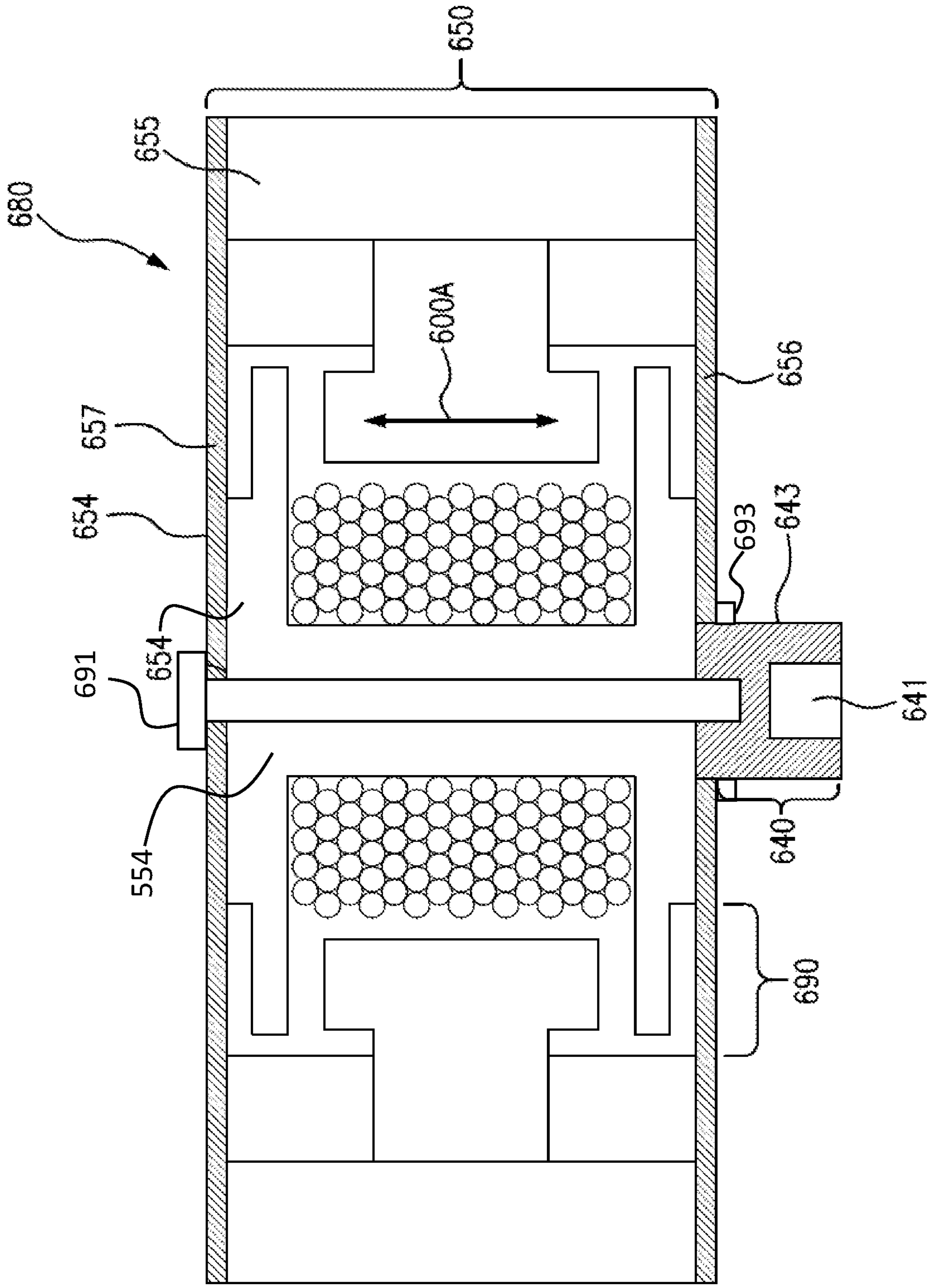
FIG. 6A is a cross-sectional view of a vibratory actuator-coupling assembly of the bone conduction device of FIG. 2.

FIG. 6A is a cross-sectional view of a vibratory actuator-coupling assembly 680, which can correspond to vibratory actuator-coupling assembly 280 detailed above.

Coupling assembly 640 includes a coupling 641 in the form of a snap coupling configured to "snap couple" to an anchor system on the recipient. As noted above with reference to FIG. 1, the anchor system may include an abutment that is attached to a fixture screw implanted into the recipient's skull and extending percutaneously through the skin so that snap coupling 341 can snap couple to a coupling of the abutment of the anchor system. In the design depicted in FIG. 6A, coupling 641 is located at a distal end-relative to housing 242 if vibratory actuator-coupling assembly 680 were installed in bone conduction device 200 of FIG. 2 (i.e., element 680 being substituted for element 280 of FIG. 2)—of a coupling shaft 643 of coupling assembly 640. In a design, coupling 641 corresponds to coupling described in U.S. patent application Ser. No. 12/177,091 assigned to Cochlear Limited. In yet other designs, alternate couplings can be used. In an exemplary embodiment, coupling 641 corresponds to a male snap coupling that fits into a female receptacle of a percutaneous abutment.

Coupling assembly 640 is mechanically coupled to vibratory electromagnetic actuator 650 configured to convert electrical signals into vibrations. In an exemplary design, vibratory electromagnetic actuator 650 (and/or any vibratory electromagnetic actuator detailed herein and/or variations thereof) corresponds to vibratory electromagnetic actuator 250 or vibratory electromechanical actuator 342 or vibratory electromechanical actuator 452 detailed above, and, accordingly, in some designs, the teachings detailed above and/or variations thereof with respect to such actuators are included in the genus of devices, genus of systems and/or genus of methods of utilizing the vibratory electromagnetic actuator 650 and/or any vibratory electromagnetic actuator detailed herein and/or variations thereof. This is further detailed below.

In operation, sound input element 126A (FIG. 1A) converts sound into electrical signals. As noted above, the bone conduction device provides these electrical signals to a sound processor which processes the signals and provides the processed signals to the vibratory electromagnetic actuator 650 (and/or any other electromagnetic actuator detailed herein and/or variations thereof—it is noted that unless otherwise specified, any teaching herein concerning a given design is applicable to any variation thereof and/or any other design and/or variations thereof), which then converts the electrical signals (processed or unprocessed) into vibrations. Because vibratory electromagnetic actuator 650 is mechanically coupled to coupling assembly 640, the vibrations are transferred from vibratory electromagnetic actuator 650 to coupling assembly 640 and then to the recipient via the anchor system (not shown).

As noted, the teachings detailed herein and/or variations thereof with respect to any given electromagnetic transducer are not only applicable to a percutaneous bone conduction device such as that according to the design of FIG. 2, but also to a transcutaneous bone conduction device such as those according to designs of FIG. 3 and FIG. 4. In this regard, the electromagnetic transducers detailed herein and/or variations thereof can be substituted for the vibratory actuator 342 of the design of FIG. 3 and the vibratory actuator 452 of the design of FIG. 4. Accordingly, some designs include an active transcutaneous bone conduction device having the electromagnetic transducers detailed herein and/or variations thereof. Also, some designs include a passive transcutaneous bone conduction device having the electromagnetic transducers detailed herein and/or variations thereof. It is further again noted that other medical devices and/or other devices can utilize the electromagnetic transducers detailed herein and/or variations thereof.

Figure 6B:
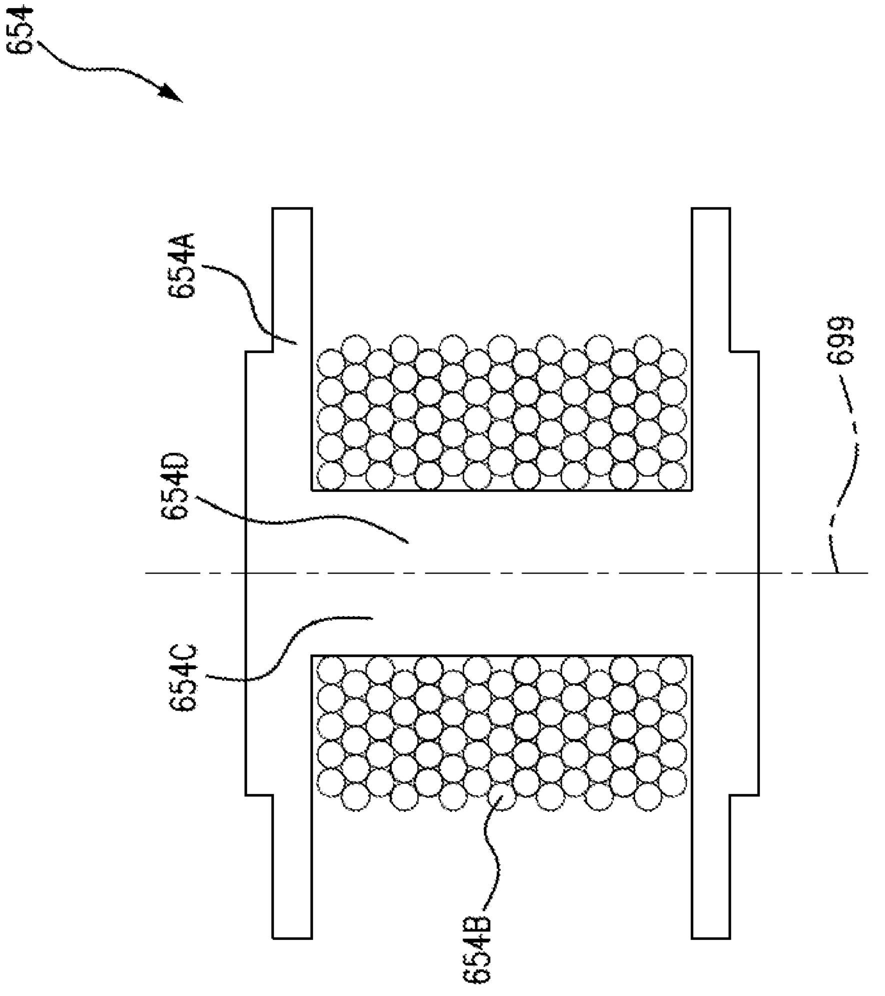
FIG. 6B is a cross-sectional view of the bobbin assembly of the vibratory actuator-coupling assembly of FIG. 3A.

As illustrated in FIG. 6A, vibratory electromagnetic actuator 650 includes a bobbin assembly 654, a counterweight assembly 655, springs 657 and 656 (the springs are not part of the counterweight assembly as that phrase is used herein) and coupling assembly 640. For ease of visualization, FIG. 6B depicts bobbin assembly 654 separately. As illustrated, bobbin assembly 654 includes a bobbin 654A and a coil 654B that is wrapped around a core 654C of bobbin 654A. In the illustrated design, bobbin assembly 654 is radially symmetrical (i.e., symmetrical about the longitudinal axis 699.

Figure 6C:
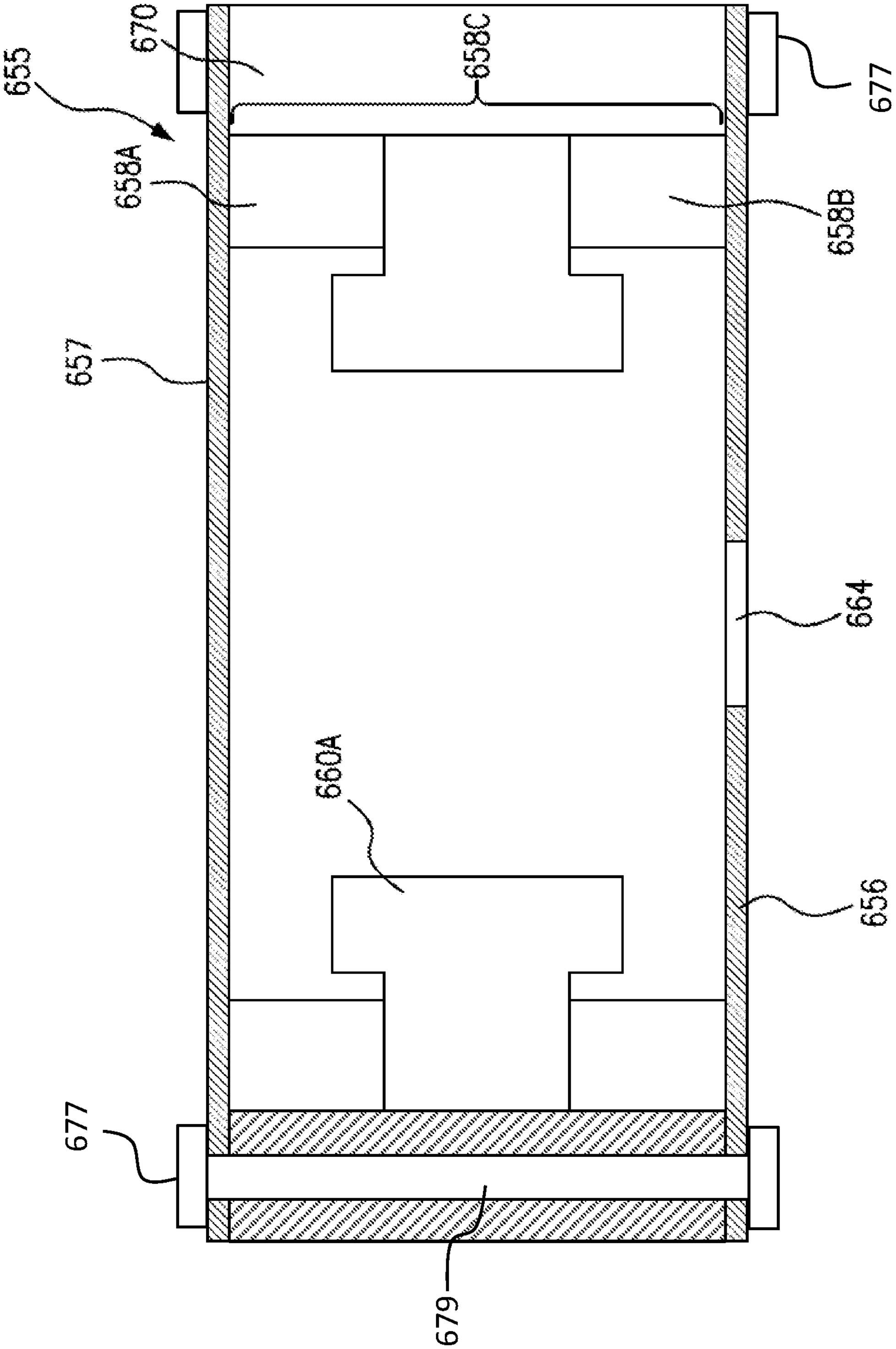
FIG. 6C is a cross-sectional view of the counterweight assembly of the vibratory actuator-coupling assembly of FIG. 3A.

FIG. 6C illustrates counterweight assembly 655 separately, and springs 656 and 567 separately, for ease of visualization. As illustrated, counterweight assembly 655 includes permanent magnets 658A and 658B, yoke 660A, and counterweight mass 670. Springs 656 and 657 connect bobbin assembly 654 to the counterweight assembly 655, and permit counterweight assembly 655 to move relative to bobbin assembly 654 upon interaction of a dynamic magnetic flux, produced by bobbin assembly 654. In this regard, with reference back to FIG. 6A, spring 656 includes a flexible section 690 that is not directly connected and adhered surface to surface to any component of the bobbin assembly 654 or to any component of the counterweight assembly 655 that flexes, as will be further detailed below (it is noted that the flexible section can enlarge if the spring is not adhered to, for example, the bobbin, even though there is contact). Along these lines, here, spring 657 can be directly adhesively bonded, riveted, bolted (here, bolted as seen, using bolt 691, wherein the head clamps the top spring 654 to the bobbin 554, and bolt 691 is threaded into the body of 643 (here, the bottom spring 654 is clamped by washer 693, which is welded or is a monolithic extension of body 643)—the clamping results from the screwing down of bolt 691 into the body 643), welded, etc., directly to the bobbin 554. Spring 657 can be directly adhesively bonded, riveted, bolted, welded, etc., directly to any component of the counterweight assembly 655 (see FIG. 6C, showing rivets with body 679 and heads 677, extending from one side of the counter mass 670 to the other, through the counterweight-again other arrangements noted above are used in some instances-herein, sometimes, what is shown in FIG. 6C can instead represent a bolt and nut arrangement-elements 677 and 679 will sometimes be referred to as such) so as to hold the components together/in contact with one another such that designs detailed herein and/or variations thereof can be practiced.

As can be seen, the two permanent magnets 658A and 658B respectively directly contact the springs 656 and 657. That is, there is no yoke or other component (e.g., in the form of a ring) interposed between the magnets and the springs. Accordingly, the magnetic flux generated by the magnets flows directly into the springs without passing through an intermediary component or without passing through a gap. However, it is noted that in an alternate design, there can be an intermediary component, such as a yoke or the like. Further, in some designs, there can be a gap between the magnets and the springs.

The dynamic magnetic flux is produced by energizing coil 654B with an alternating current. The static magnetic flux is produced by permanent magnets 658A and 658B of counterweight assembly 655, as will be described in greater detail below. In this regard, counterweight assembly 655 is a static magnetic field generator and bobbin assembly 654 is a dynamic magnetic field generator. As may be seen in FIGS. 6A and 6C, hole 664 in spring 656 provides a feature that permits coupling assembly 641 to be rigidly connected to bobbin assembly 654.

It is noted that while designs presented herein are described with respect to a bone conduction device where counterweight assembly 655 includes permanent magnets 658A and 658B that surround coil 654*b* and moves relative to coupling assembly 640 during vibration of vibratory electromagnetic actuator 650, in other designs, the coil may be located on the counterweight assembly 655 as well, thus adding weight to the counterweight assembly 655 (the additional weight being the weight of the coil).

As noted, bobbin assembly 654 is configured to generate a dynamic magnetic flux when energized by an electric current. In this exemplary design, bobbin 654A is made of a soft iron. Coil 654B may be energized with an alternating current to create the dynamic magnetic flux about coil 654B. The iron of bobbin 654A is conducive to the establishment of a magnetic conduction path for the dynamic magnetic flux. Conversely, counterweight assembly 655, as a result of permanent magnets 658A and 658B, in combination with yoke 660A and springs 656 (this feature being described in greater detail below), at least the yoke, in some designs, being made from soft iron, generate, due to the permanent magnets, a static magnetic flux. The soft iron of the bobbin and yokes may be of a type that increases the magnetic coupling of the respective magnetic fields, thereby providing a magnetic conduction path for the respective magnetic fields.

Figure 7:
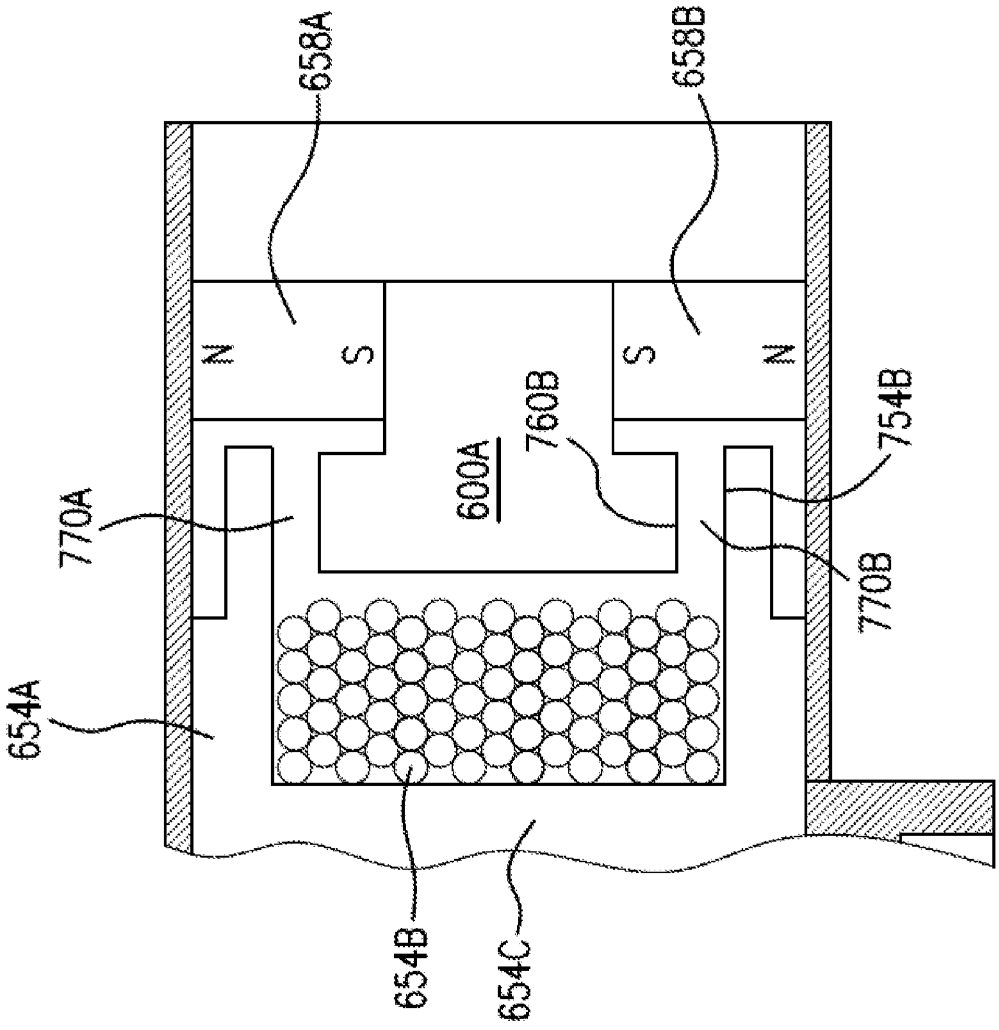
FIG. 7 is a schematic diagram of a portion of the vibratory actuator-coupling assembly of FIG. 6A.

FIG. 7 depicts a portion of FIG. 6A. As may be seen, vibratory electromagnetic actuator 650 includes two axial air gaps 770A and 770B that are located between bobbin assembly 654 and counterweight assembly 655. As used herein, the phrase "axial air gap" refers to an air gap that has at least a component that extends on a plane normal to the direction of primary relative movement (represented by arrow 600A in FIG. 6A-more on this below) between bobbin assembly 654 and counterweight assembly 655 such that the air gap is bounded by the bobbin assembly 654 and counterweight assembly 655 in the direction of relative movement between the two.

Accordingly, the phrase "axial air gap" is not limited to an annular air gap, and encompasses air gaps that are formed by straight walls of the components (which may be present in designs utilizing bar magnets and bobbins that have a non-circular (e.g. square) core surface). With respect to a radially symmetrical bobbin assembly 654 and counterweight assembly 655, cross-sections of which are depicted in FIGS. 6A-7, air gaps 770A and 770B extend in the direction of relative movement between bobbin assembly 654 and counterweight assembly 655, air gaps 770A and 770B are bounded as detailed above in the "axial" direction. With respect to FIG. 7, the boundaries of axial air gap 770B are defined by surface 754B of bobbin 654A and surface 760B of yoke 660A.

It is noted that the primary direction of relative motion of the counterweight assembly of the electromagnetic transducer is parallel to the longitudinal direction of the electromagnetic transducer, and with respect to utilization of the transducers in a bone conduction device, normal to the tangent of the surface of the bone 136 (or, more accurately, an extrapolated surface of the bone 136) local to the bone fixtures. It is noted that by "primary direction of relative motion," it is recognized that the counterweight assembly may move inward towards the longitudinal axis of the electromagnetic actuator owing to the flexing of the springs (providing, at least, that the spring does not stretch outward, in which case it may move outward or not move in this dimension at all), but that most of the movement is normal to this direction.

Further as may be seen in FIG. 7, in contrast to the device of FIG. 5, the vibratory electromagnetic actuator 650 includes no radial air gaps located, for example, between bobbin assembly 654 and counterweight assembly 655. As used herein, the phrase "radial air gap" refers to an air gap that has at least a component that extends on a plane normal to the direction of relative movement between bobbin assembly 654 and counterweight assembly 655 such that the air gap is bounded by bobbin assembly 654 and counterweight assembly 655 in a direction normal to the primary direction of relative movement between the two (represented by arrow 600A in FIG. 6A). Accordingly, in some exemplary designs, due to the feature of the conductive springs 656 and 657, the radial air gaps of the configuration of FIG. 5 are not utilized in the design of FIG. 6A and variations thereof, and, in some designs and variations thereof, there are no additional axial air gaps than those depicted in FIG. 6A.

As can be seen in FIG. 7, the permanent magnets 658A and 658B are arranged such that their respective south poles face each other, and their respective north poles face away from each other. It is noted that in other designs, the respective south poles may face away from each other and the respective north poles may face each other.

Figure 8A:
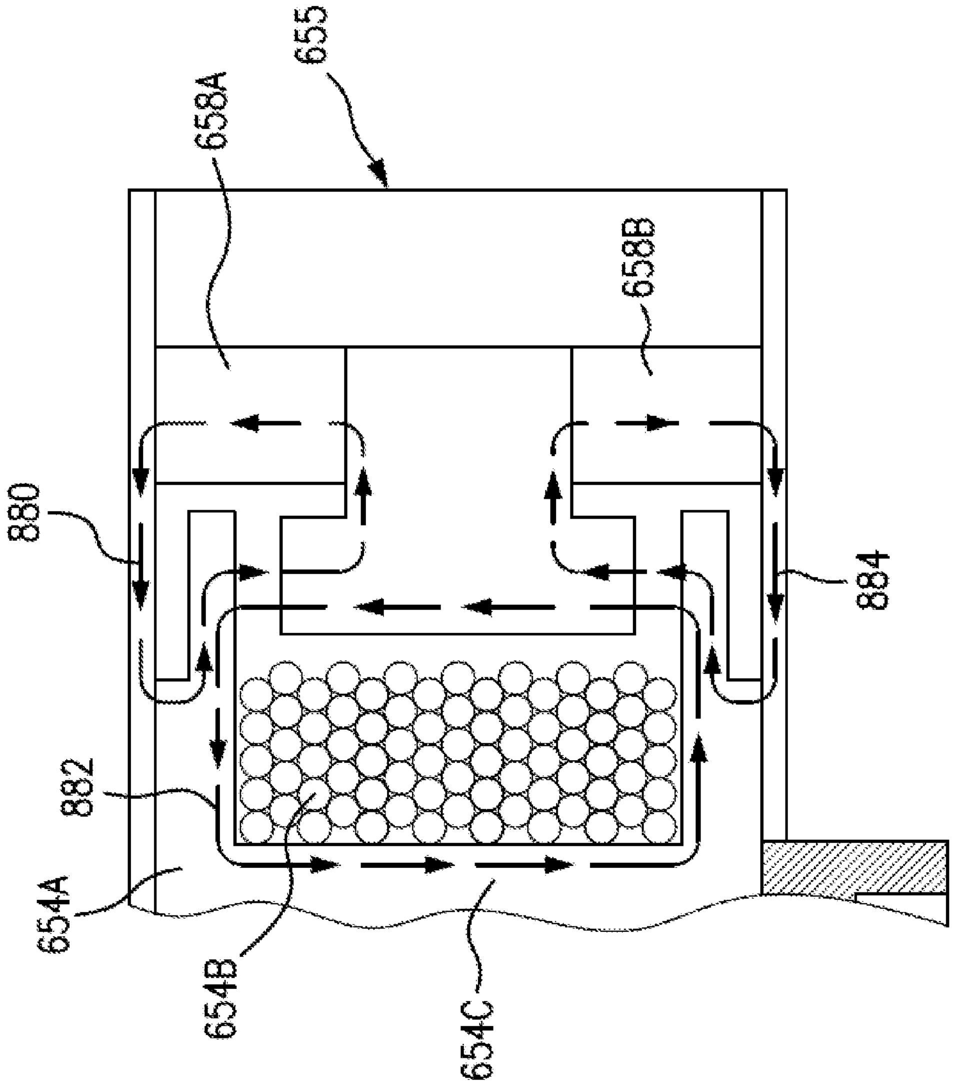
FIGS. 8A and 8B are schematic diagrams detailing static and dynamic magnetic flux in the vibratory actuator-coupling assembly at the moment that the coils are energized when the bobbin assembly and the counterweight assembly are at a balance point with respect to magnetically induced relative movement between the two.

FIG. 8A is a schematic diagram detailing the respective static magnetic flux 880 and static magnetic flux 884 of permanent magnets 658A and 658B, and dynamic magnetic flux 882 of coil 654B in vibratory actuator-coupling assembly 680 when coil 654B is energized according to a first current direction and when bobbin assembly 654 and counterweight assembly 655 are at a balance point with respect to magnetically induced relative movement between the two (hereinafter, the "balance point"). That is, while it is to be understood that the counterweight assembly 655 moves in an oscillatory manner relative to the bobbin assembly 654 when the coil 654B is energized, there is an equilibrium point at the fixed location corresponding to the balance point at which the counterweight assembly 654 returns to relative to the bobbin assembly 654 when the coil 654B is not energized.

Figure 8B:
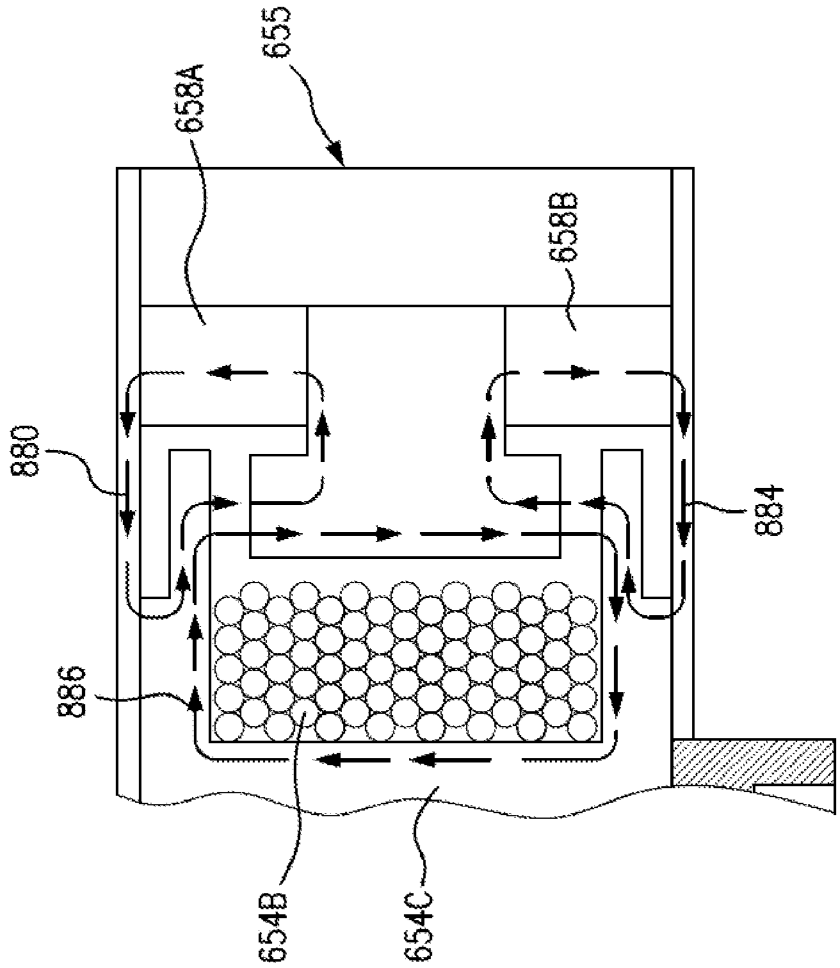

FIG. 8B is a schematic diagram detailing the respective static magnetic flux 880 and static magnetic flux 884 of permanent magnets 658A and 658B, and dynamic magnetic flux 886 of coil 654B in vibratory actuator-coupling assembly 680 when coil 654B is energized according to a second current direction (a direction opposite the first current direction) and when bobbin assembly 654 and counterweight assembly 655 are at a balance point with respect to magnetically induced relative movement between the two.

It is noted that FIGS. 8A and 8B do not depict the magnitude/scale of the magnetic fluxes. In this regard, it is noted that in some designs, at the moment that coil 654B is energized and when bobbin assembly 654 and counterweight assembly 655 are at the balance point, relatively little, if any, static magnetic flux flows through the core 654C of the bobbin 654A/the space 654D (see FIG. 6B) in the coil 654B (the space 654D being formed as a result of the coil 654B being wound about, and at least partially filled by, the core 654C of the bobbin 654A). Accordingly, FIGS. 8A and 8B depict this fact. However, during operation, the amount of static magnetic flux that flows through the core increases as the bobbin assembly 654 travels away from the balance point (both downward and upward away from the balance point) and decreases as the bobbin assembly 654 travels towards the balance point (both downward and upward towards the balance point). Still, the amount that travels through the core is minimal compared to the amount the travels through the respective air gaps. In this regard, static magnetic flux circuits 880 and 884 as depicted in FIG. 8A represent an ideal static magnetic flux path, where it is to be understood that magnetic flux, albeit relatively limited quantities, can also travel outside this ideal path.

As can be seen from FIGS. 8A and 8B, the static magnetic flux and the dynamic magnetic flux all cross the same air gaps, and there are no air gaps crossed by the static magnetic flux that are not cross by the dynamic magnetic flux, at least with respect to the ideal paths of the static magnetic flux and the dynamic magnetic flux.

It is noted that the directions and paths of the static magnetic flux and dynamic magnetic flux are representative of some exemplary designs, and in other designs, the directions and/or paths of the fluxes can vary from those depicted.

As may be seen from FIGS. 8A and 8B, axial air gaps 770A and 770B close static magnetic flux circuits 880 and 884. It is noted that the phrase “air gap” refers to a gap between the component that produces a static magnetic field and a component that produces a dynamic magnetic field where there is a relatively high reluctance, but magnetic flux still flows through the gap. The air gap closes the magnetic field. In an exemplary design, the air gaps are gaps in which little to no material having substantial magnetic aspects is located in the air gap. Accordingly, an air gap is not limited to a gap that is filled by air.

Still with reference to FIGS. 8A and 8B, it is noted that static magnetic flux circuits 880 and 884 each constitute closed flux paths/closed circuits. These paths/circuits are considered herein to be “local circuits” in that they are local to the individual permanent magnets that generate the circuit. As can be seen, each closed static magnetic flux path depicted in FIGS. 8A and 8B travels across no more than one air gap. That said, it is noted that in some designs or in potentially all designs, there is a static magnetic flux that travels across both air gaps. Such a scenario can exist in the case of trace flux and/or in the case of movement of the counterweight assembly 655 from the balance point, where some of the flux from one magnet travels through one air gap and some flux travels through another air gap. Without being bound by theory, such can exist in the scenario where the static magnetic flux also travels through the core of the bobbin. Still, even in such a scenario, there is a closed static magnetic flux path that travels across only one air gap. The path, however, is considered herein to be a “global” circuit as it extends outside the local circuit owing to, for example, its travels through the core of the bobbin.

FIGS. 8A and 8B clearly depict that the static magnetic flux generated by the counterweight assembly 655 travels across only two air gaps. This is as contrasted to the design of FIG. 5, where the generated static magnetic flux crosses four air gaps. In this regard, an exemplary design includes a balanced electromagnetic transducer where only two air gaps are present.

As can be seen from the figures, the dynamic magnetic flux also crosses both air gaps. In an exemplary design, neither the dynamic magnetic flux nor the static magnetic flux crosses an air gap at the other does not cross.

Figure 9A:
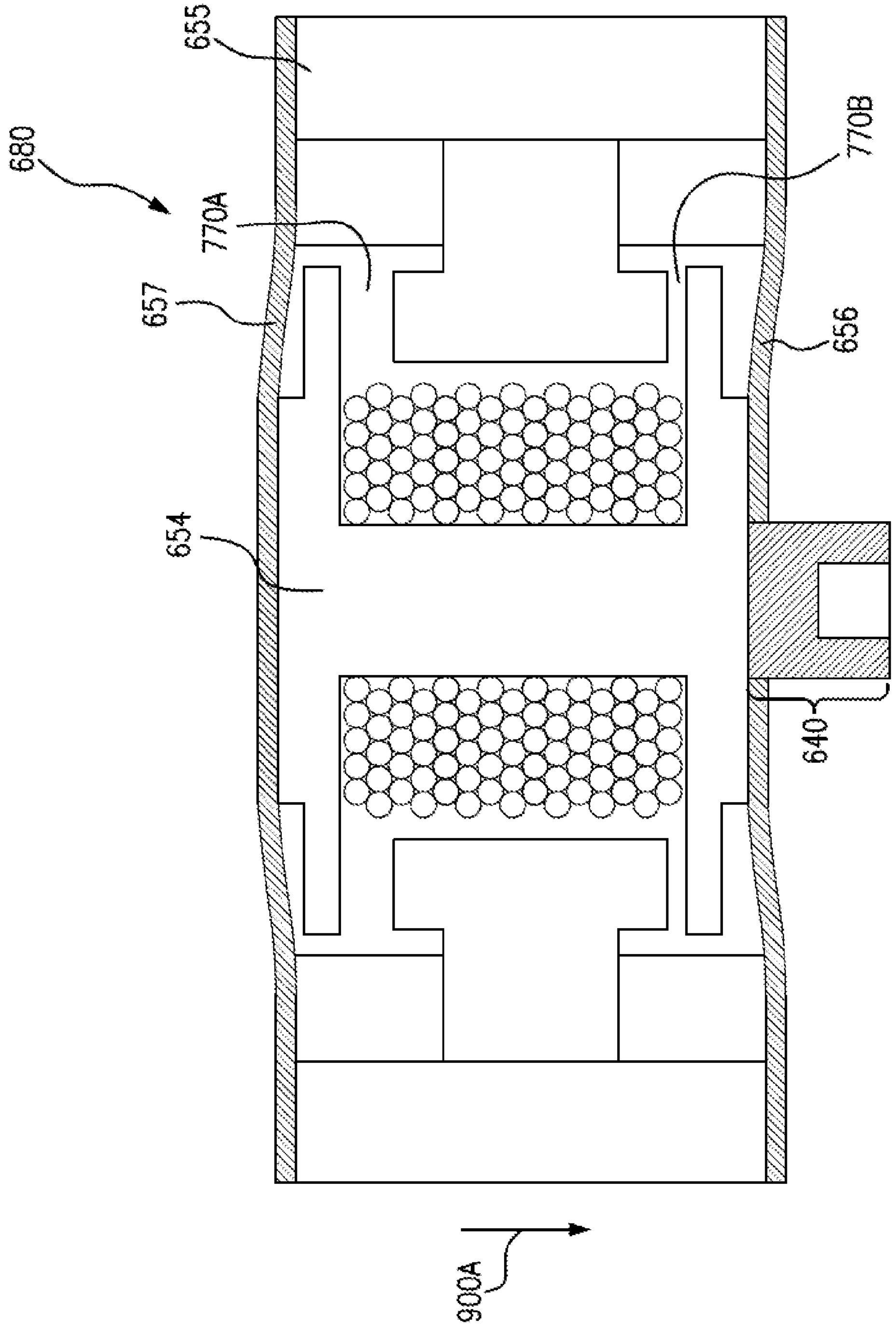
FIG. 9A is a schematic diagram depicting movement of the counterweight assembly relative to the bobbin assembly of the vibratory actuator-coupling assembly of FIG. 6A.

Referring now to FIG. 9A, the depicted magnetic fluxes 880, 882 and 884 of FIG. 8A will magnetically induce movement of counterweight assembly 655 downward (represented by the direction of arrow **900*a* in FIG. 9A) relative to bobbin assembly 654 so that vibratory actuator-coupling assembly 680 will ultimately correspond to the configuration depicted in FIG. 9A. More specifically, vibratory electromagnetic actuator 650 of FIG. 6A is configured such that during operation of vibratory electromagnetic actuator 650 (and thus operation of bone conduction device 200), an effective amount of the dynamic magnetic flux 882 and an effective amount of the static magnetic flux (flux 880, flux 884 and/or a combination of flux 880 and 884) flow through at least one of axial air gaps 770A and 770B sufficient to generate substantial relative movement between counterweight assembly 655 and bobbin assembly 654**.

As used herein, the phrase “effective amount of flux” refers to a flux that produces a magnetic force that impacts the performance of vibratory electromagnetic actuator 650, as opposed to trace flux, which may be capable of detection by sensitive equipment but has no substantial impact (e.g., the efficiency is minimally impacted) on the performance of the vibratory electromagnetic actuator. That is, the trace flux will typically not result in vibrations being generated by the electromagnetic actuators detailed herein and/or typically will not result in the generation electrical signals in the absence of vibration inputted into the transducer.

Further, as may be seen in FIGS. 8A and 8B, the static magnetic fluxes enter bobbin 654A substantially only at locations lying on and parallel to a tangent line of the path of the dynamic magnetic fluxes 882.

As may be seen from FIGS. 8A and 8B, the dynamic magnetic flux is directed to flow within the area sandwiched by the springs 656 and 657. In particular, no substantial amount of the dynamic magnetic flux 882 or 886 passes through or into springs 656. Further, no substantial amount of the dynamic magnetic flux 882 or 886 passes through the two permanent magnets 658A and 658B of counterweight assembly 655. Moreover, as may be seen from the FIGS., the static magnetic fluxes (880, 884 and/or a combination of the two) is produced by no more than two permanent magnets 658A and 658B.

It is noted that the schematics of FIGS. 8A and 8B represent respective instantaneous snapshots while the counterweight assembly 655 is moving in opposite directions (FIG. 8A being downward movement, FIG. 8B being upward movement), but both when the bobbin assembly 654 and counterweight assembly 655 are at the balance point.

As counterweight assembly 655 moves downward relative to bobbin assembly 654, as depicted in FIG. 9A, the span of axial air gap 770A increases and the span of axial air gap 770B decreases. This has the effect of substantially reducing the amount of effective static magnetic flux through axial air gap 770A and increasing the amount of effective static magnetic flux through axial air gap 770B. However, in some designs, the amount of effective static magnetic flux through springs 656 and 657 collectively substantially remains about the same as compared to the flux when counterweight assembly 655 and bobbin assembly 654 are at the balance point. (Conversely, as detailed below, in other designs the amount is different.) Without being limited by theory, this is believed to be the case because the deflection of the springs 656 and 657 is within parameters that do not result in a significant change in spring orientation that substantially impacts the amount of effective static magnetic flux through the springs. That is, the springs do not substantially impact the flow of magnetic flux.

Upon reversal of the direction of the dynamic magnetic flux, the dynamic magnetic flux will flow in the opposite direction about coil 654B. However, the general directions of the static magnetic flux will not change. Accordingly, such reversal will magnetically induce movement of counterweight assembly 655 upward (represented by the direction of arrow 900B in FIG. 9B) relative to bobbin assembly 654 so that vibratory actuator-coupling assembly 680 will ultimately correspond to the configuration depicted in FIG. 9B. As counterweight assembly 655 moves upward relative to bobbin assembly 654, the span of axial air gap 770B increases and the span of axial air gap 770A decreases. This has the effect of reducing the amount of effective static magnetic flux through axial air gap 770B and increasing the amount of effective static magnetic flux through axial air gap 770A. However, the amount of effective static magnetic flux through the springs 656 does not change due to a change in the span of the axial air gaps as a result of the displacement of the counterweight assembly 655 relative to the bobbin assembly 654 for the reasons detailed above with respect to downward movement of counterweight assembly 655 relative to bobbin assembly 654.

Figure 9B:
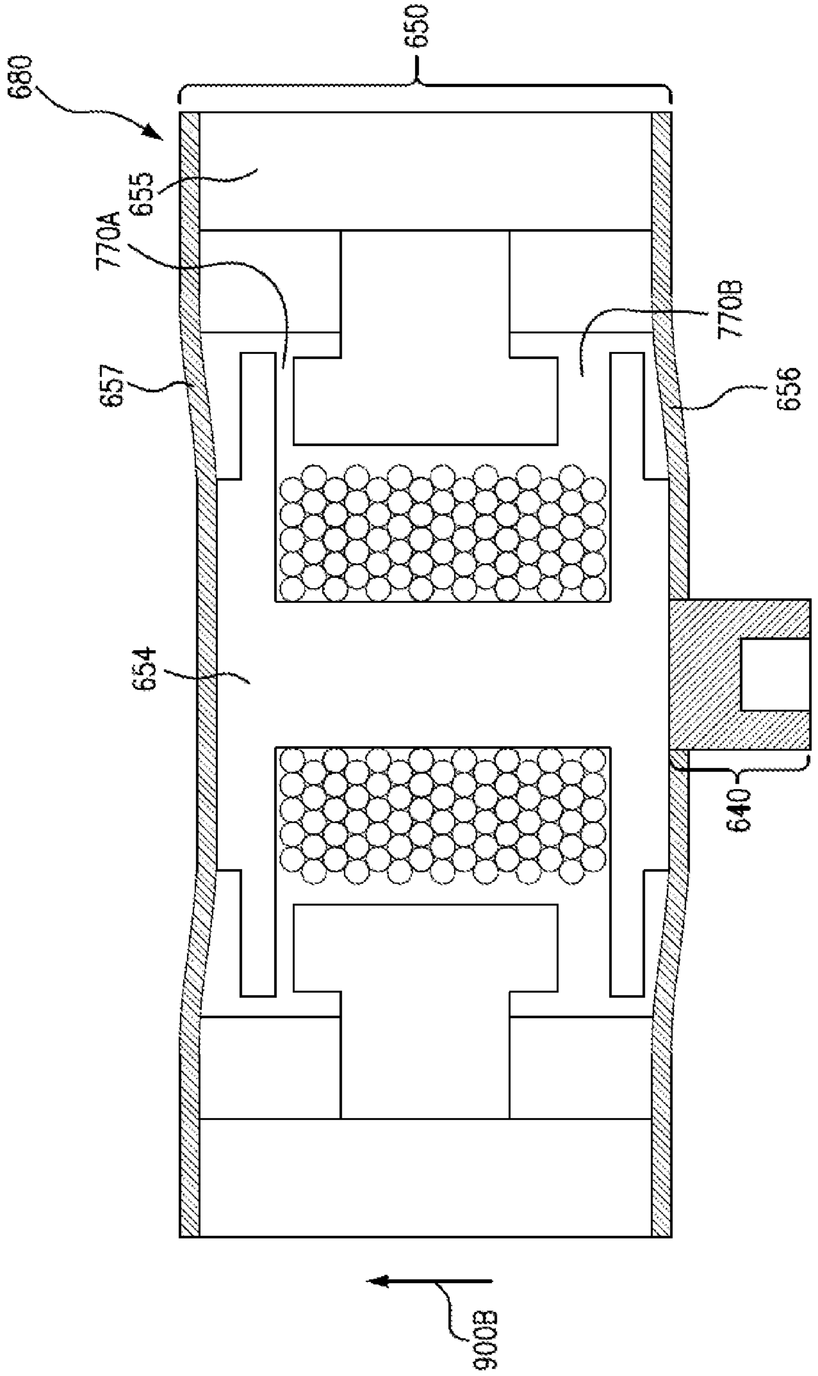
FIG. 9B is a schematic diagram depicting movement of the counterweight assembly relative to the bobbin assembly of the vibratory actuator-coupling assembly of FIG. 6A in the opposite direction of that depicted in FIG. 9A.

As can be seen from FIGS. 9A and 9B, the springs 656 and 657 deform with transduction of the transducer (e.g., actuation of the actuator). Accordingly, at least a portion of the static magnetic flux flows through solid material that deforms during transduction by the electromagnetic transducer. This as contrasted to the flow of static magnetic flux through, for example, the yokes of the design of FIG. 5, where the yokes do not deform during actuation (transduction).

Referring back to FIG. 5, it can be seen that the designs thereof utilizes yokes 560B and 560C to establish the radial air gaps between the yokes and the bobbin assembly 354. That is, the design of FIG. 5 utilizes three separate yokes (including yoke 560A). Conversely, the design of FIG. 6A utilizes only one yoke (it is noted that the depictions of FIGS. 6A to 6C are cross-sectional views of a rotationally symmetric vibratory electromagnetic actuator, and thus yoke 660A is in the form of a ring). Note further that in the case of a balanced actuator that utilizes only axial air gaps, it has been heretofore known to utilize yokes that extend above and below (with respect to the orientation of FIG. 5) the bobbin assembly. Accordingly, an exemplary design provides for a balance electromagnetic actuator having fewer yokes.

In some embodiments, the spring(s) can be used to close some of the airgaps (such as the radial air gaps-those air gaps will thus no longer be air gaps).

The designs of FIGS. 6A-9B detailed above include the use of two separate springs 656 and 657 as conduits of the static magnetic flux and no radial air gaps. In an alternate design, only one spring is used (either the top or the bottom spring) as a conduit of static magnetic flux (but two or more springs may be present—the additional springs being utilized for their traditional resilient purposes), and in the place of the other spring, a radial air gap located between bobbin assembly 654 and counterweight assembly 655 is utilized to close the static magnetic flux. It is noted that in an alternate design, two or more springs can be utilized as conduits for static magnetic flux along with one or two or more radial air gaps.

Figure 10:
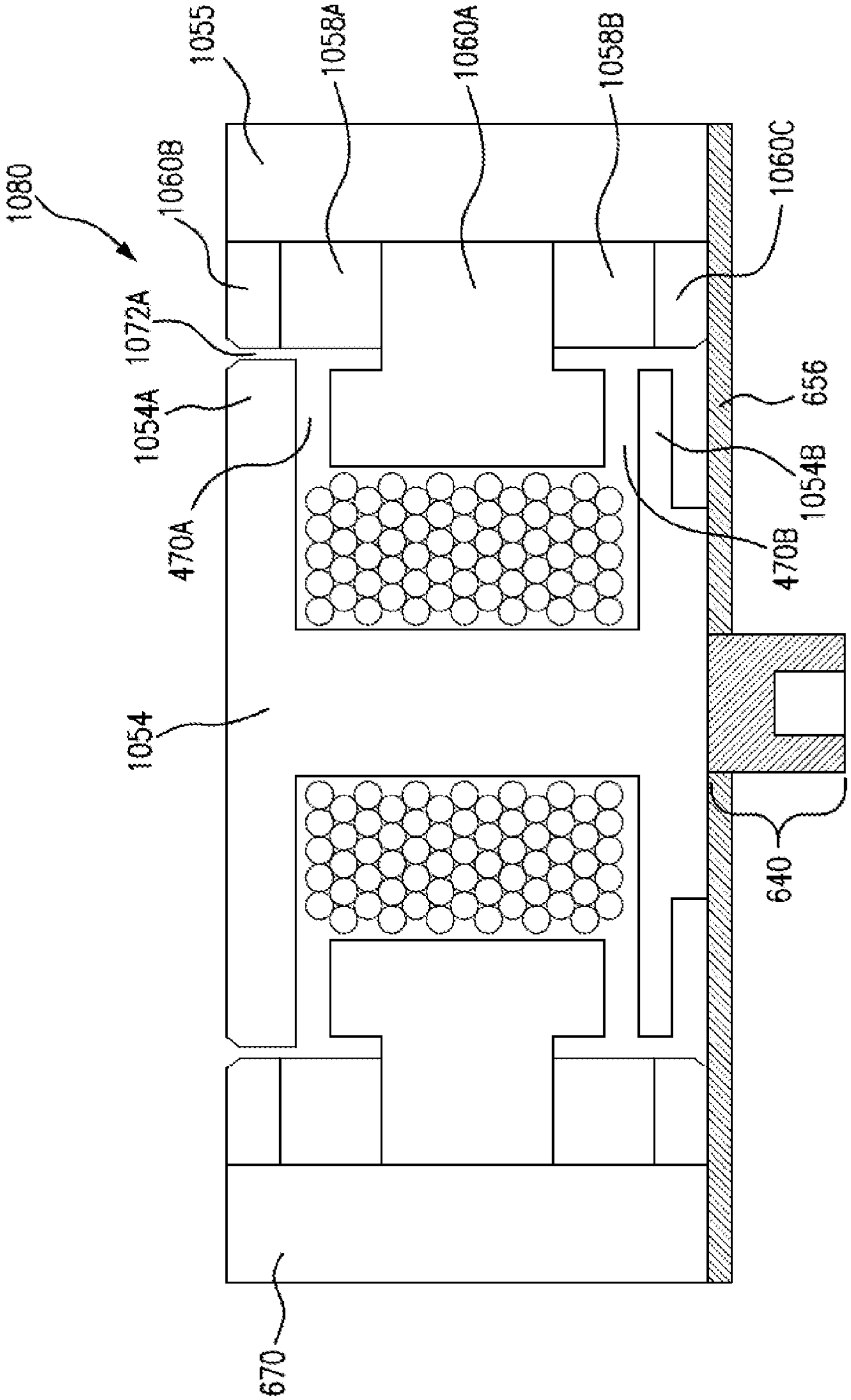
FIG. 10 is a cross-sectional view of an alternate design of a vibratory actuator-coupling assembly of the bone conduction device of FIG. 2.

More particularly, FIG. 10 depicts an alternate design of a vibratory actuator-coupling assembly 1080, that utilizes both a spring 656 and a radial air gap 1072A to close the static magnetic flux, where like reference numbers correspond to the components detailed above. As can be seen, bobbin assembly 1054 includes a bobbin that has arms 1054A and 1054B that are different from one another, with arm 1054B corresponding to the bottom arm of the bobbin 654A of FIG. 6A. However, arm 1054A extends further in the lateral direction than arm 1054B, and arm 1054A is "thicker" in the longitudinal direction than arm 1054B, at least with respect to the portions closest to counterweight assembly 1055.

As can be seen, permanent magnets 1058A and 1058B are of a different geometry than the permanent magnets of the design of FIG. 6A. More particularly, in the design depicted in FIG. 10, the permanent magnets 1058A and 1058A are shorter than the permanent magnets of FIG. 6A. Also, the permanent magnets 1058A and 1058B are of the same configuration, although in other designs, different configurations can be utilized. In this regard, depending on the path of the magnetic fluxes, different sized permanent magnets (i.e., magnets of different strength) can be utilized to obtain a balanced vibratory actuator.

Referring still to FIG. 10, it can be seen that yokes 1060B and 1060C have been added in addition to yoke 1060A (which corresponds to yoke 660A of FIG. 6A). The magnetic flux generated by permanent magnet 1058B flows through yoke 1060A and bobbin assembly 1054 and spring 656 in a manner substantially the same as that detailed above with respect to the design of FIGS. 6A-9B, with the exception that the flux also flows through yoke 1060C. With regard to the flow of flux through yoke 1060C, the flux flows in a substantially linear manner therethrough (i.e., vertically into and out of yoke 1060C). Conversely, the magnetic flux generated by permanent magnet 1058A flows through yoke 1060B and bobbin assembly 1054A in a manner more akin to the flux of permanent magnet 558A of FIG. 5. In at least general terms, the flux enters yoke 1060B in a vertical direction, and then arcs to a generally horizontal direction to leave the yoke 1060B and enter arm 1054A of bobbin assembly 1054 across radial air gap 1072A. In this regard, radial air gap 1072A generally corresponds to the radial air gap between yoke 560B and bobbin 554A of FIG. 5. The flux then arcs from the horizontal direction to the vertical direction to flow into yoke 1060A across axial air gap 470A. (It is noted that the just described flux flows would be reversed for magnets having an opposite polarity than that which would result in the just described flow. In some designs any direction of magnetic flux flow can be utilized, providing that the teachings detailed herein and/or variations thereof can be practiced.)

It is noted that in the design of FIG. 10, a number of the components are depicted as being symmetrical and/or are identical to one another (albeit some are reversed). However, in other designs the configurations of the components can be varied. By way of example only and not by way of limitation, because of the presence of radial air gap 1072A at the "top" of the actuator and the absence of such an air gap at the "bottom" of the actuator (while there is a gap, the gap is relatively much larger than the radial air gap 1072A at the top (although in other designs, this is not the case) and little to no magnetic flux flows through that gap (instead the flux flows through the spring), and thus it is not an air gap), there may be utilitarian value in utilizing a permanent magnet 1058A that is stronger than permanent magnet 1058B and/or utilizing a yoke 1060B that is different from yoke 1060C, etc., at least if such results in a balanced actuator. Indeed, in some designs, the bottom yoke 1060C might be eliminated, and an elongated permanent magnet 1058B and/or the geometry of yoke 1060A being substituted in its place. With regard to the latter scenario, while the design of yoke 1060A is depicted as being symmetrical, other designs can include a yoke that is not symmetrical, at least in order to compensate for any flux path discrepancies resulting from utilizing the spring 656 on the bottom and the radial air gap 1072A on the top.

It is noted that the distance spanning the radial air gap 1060B can be set during design so as to result in a utilitarian balanced actuator. Alternatively, or in addition to this, the properties of the spring 656 can be set during design to achieve such a balanced actuator. (Exemplary properties of the spring 656 that can be set during design are described below.) In this regard, owing to the fact that there is no corresponding radial air gap at the bottom of the actuator, in an exemplary design, there is a relationship between the distance of the air gap 1072A and the thickness of the spring 656 that exists such that with respect to other parameters, a balance actuator is achieved.

While the design of FIG. 10 includes a radial air gap located at the top but not at the bottom, in an alternative design the radial air gap and the corresponding componentry is located at the bottom instead of the top (and the spring and corresponding componentry is located at the top).

As noted above, the design of FIG. 10 utilizes yokes positioned at both the north and south Poles of the permanent magnets, as opposed to the design of FIGS. 6A, which utilizes a yoke only at the north or south poles of the permanent magnets. In an exemplary design, yokes can be positioned on both sides of the permanent magnets (i.e., interposed between the permanent magnets and the respective springs, along with a yoke (or more than one yoke) interposed between the two permanent magnets. Any configuration and/or flux path flow that can be utilized to practice designs detailed herein and/or variations thereof can be utilized in some designs.

Referring back to FIG. 6A, because of the elimination of corresponding air gaps via use of springs 656 and 657 to close the static magnetic flux, the tendency of such eliminated air gaps to collapse is correspondingly effectively eliminated, and, in an exemplary design, the spring constant need not be as high as might be the case in designs that utilize four axial air gaps, such as that detailed above with respect to FIG. 5 and variations thereof.

As can be seen from the designs illustrated in the figures, all permanent magnets of counterweight assembly 655 that are configured to generate the static magnetic fluxes 880 and 884 are located to the sides of the bobbin assembly 655. Along these lines, such permanent magnets may be annular permanent magnets with respective interior diameters that are greater than the maximum outer diameter of the bobbin 654A, when measured on the plane normal to the direction (represented by arrow 900A in FIG. 9A) of the generated substantial relative movement of the counterweight assembly 655 relative to the bobbin assembly 654, as illustrated in FIGS. 9A and 9B. Conversely, in an alternate design, some or all of the permanent magnets of counterweight assembly 655 that are configured to generate the static magnetic fluxes are located above and/or below the bobbin assembly 655.

In some designs, the configuration of the counterweight assembly 655 reduces or eliminates the inaccuracy of the distance (span) between faces of the components forming the air gaps that exists due to the permissible tolerances of the dimensions of the permanent magnets. In this regard, in some designs, the respective spans of the axial air gaps 770A and 770B, when measured when the bobbin assembly 654 and the counterweight assembly 655 are at the balance point, are not dependent on the thicknesses of the permanent magnets 658A and 658B as compared to the design of FIG. 5 and/or variations thereof, all other things being equal.

It is noted that while the surfaces creating the radial air gap of FIG. 10 are depicted as uniformly flat, in other designs, the surfaces may be partitioned into a number of smaller mating surfaces. It is further noted that the use of radial air gap 1072A permits relative ease of inspection of the radial air gaps from the outside of the vibratory electromagnetic actuator 650, in comparison to, for example absence of the radial air gap.

Figure 11:
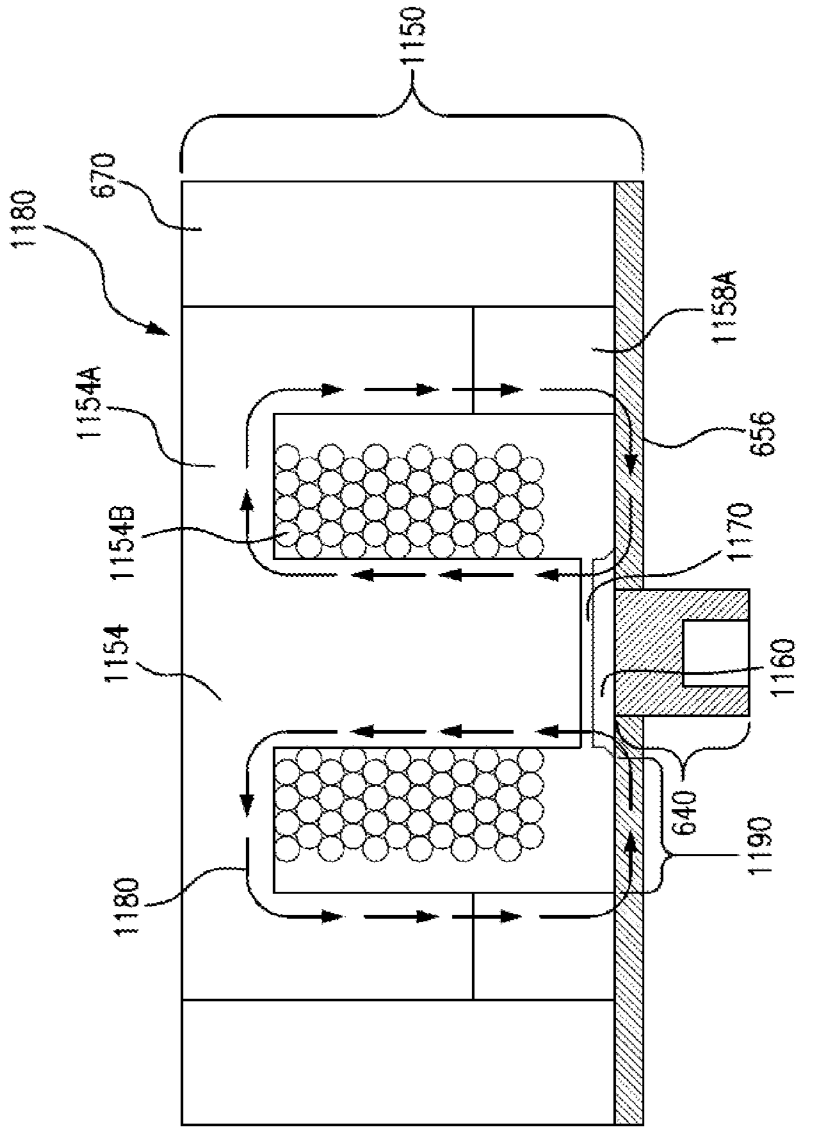
FIG. 11 is a cross-sectional view of an alternate design of t of a vibratory actuator-coupling assembly of the bone conduction device of FIG. 2.

FIG. 11 depicts an exemplary alternate design of a vibratory actuator, one that is unbalanced, as will now be described.

FIG. 11 is a cross-sectional view of a vibratory actuator-coupling assembly 1180, which can correspond to vibratory actuator-coupling assembly 280 detailed above. Like reference numbers corresponding to elements detailed above will not be addressed.

As illustrated in FIG. 11, vibratory electromagnetic actuator 1150 includes a bobbin assembly 1154 connected to coupling assembly 640 via spring 656. Reference numeral 1190 indicates the flexible section of the spring 656, a section of the spring which flexes because, in this design, it is not directly connected to any component of the bobbin assembly or to any component of the yoke 1160. It is noted that in some designs, yoke 1160 can flex to a certain degree, and thus those sections of spring 655 that are connected to the flexing portions of yoke 1160 also flex. Accordingly, section 1190 can extend into the section attached to yoke 1160 in some designs. It can be seen that mass 670 is attached to bobbin 1154A of bobbin assembly 1154. In the embedment of FIG. 11, the bobbin assembly 1154 also functionally serves as a counterweight assembly. (It is noted that the designs detailed above likewise can be configured in alternate variations such that the bobbin assembly, or at least portions thereof, functionally correspond to the counterweight.)

Spring 656 permits the bobbin assembly 1154 and mass 670 to move relative to yoke 1160 and coupling assembly 640, which is connected thereto, upon interaction of a dynamic magnetic flux, produced by bobbin assembly 1154 upon energizement of coils 1154B. More particularly, a dynamic magnetic flux is produced by energizing coil 1154B with an alternating current. The dynamic magnetic flux is not shown, but it parallels the static magnetic flux 1180 produced by permanent magnet 1158A of the bobbin assembly. That is, in an exemplary design, the dynamic magnetic flux, if depicted, would be located at the same place as the depicted static magnetic flux 1180, with the exception that the arrow heads would change direction depending on the alternation of the current.

In this regard, bobbin assembly 1154 is both a static magnetic field generator and a dynamic magnetic field generator.

The functionality and configuration of the elements of the design of FIG. 11 (and FIG. 12 detailed below) can correspond to that of the corresponding functional elements of one or more or all of the other designs detailed herein.

Vibratory electromagnetic actuator 1150 includes a single axial air gap 1170 that is located between bobbin assembly 1154 and yoke 1160. In this regard, the spring 656 is utilized to close both the static and dynamic magnetic flux, and both fluxes are closed through the same air gap 1170 (and thus a single air gap 1170).

It is noted that the directions and paths of the static magnetic fluxes (and thus by description above, the dynamic magnetic fluxes) are representative of some exemplary designs, and in other designs, the directions and/or paths of the fluxes can vary from those depicted.

As noted above, coupling assembly 640 is attached (either directly or indirectly) to yoke 1160. Without being bound by theory, yoke 1160, in some designs, channels the fluxes into and/or out of (depending on the alternation of the current and/or the polarity direction of the permanent magnet 1158A) the bobbin assembly so as to achieve utilitarian functionality of the vibratory electromagnetic actuator 1150. It is noted that in an alternate design, yoke 1160 is not present (i.e., the fluxes enter and/or exit or at least substantially enter and/or exit the spring 656 from/to the bobbin assembly 1154).

Figure 12:
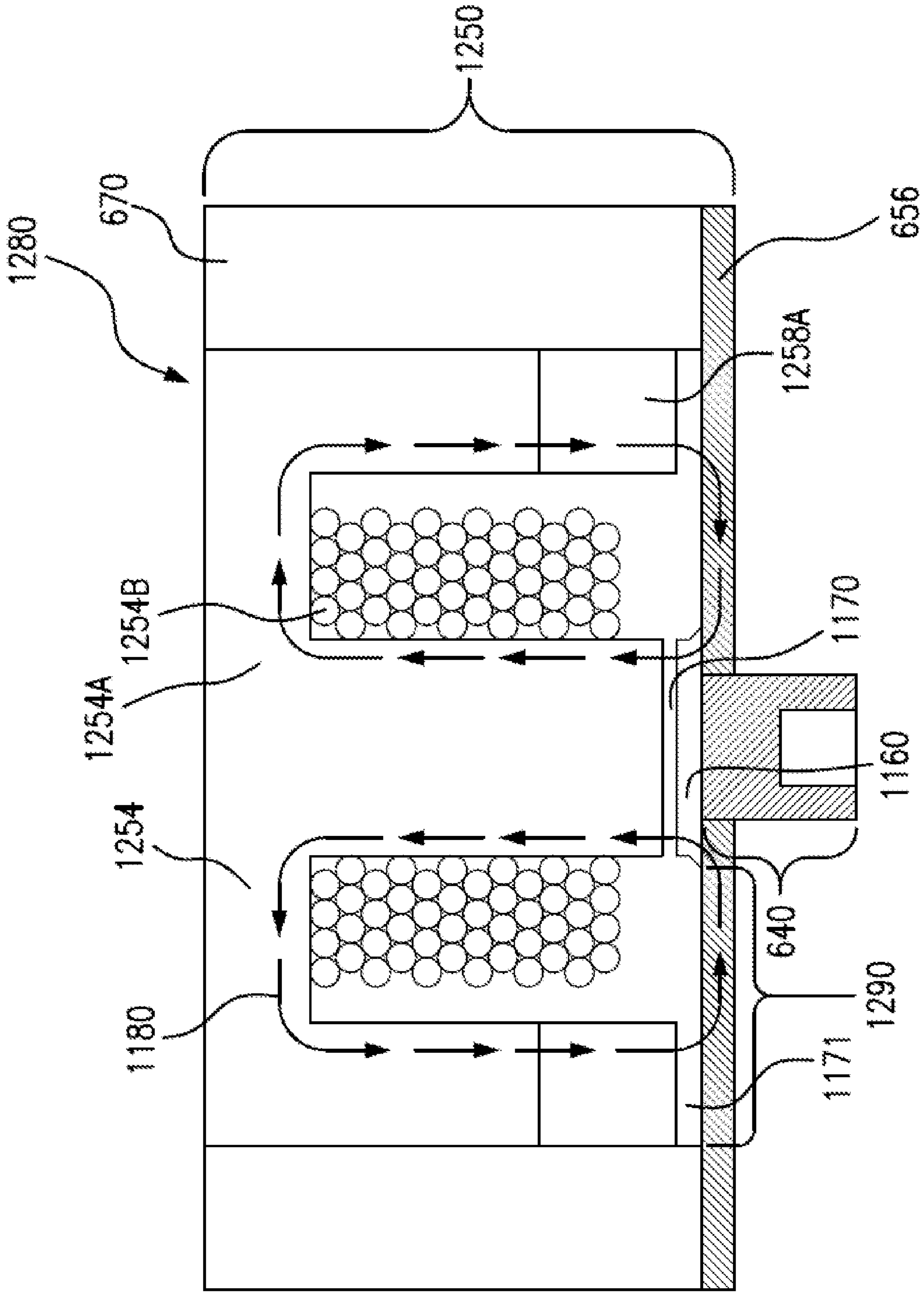
FIG. 12 is a cross-sectional view of an alternate vibratory actuator-coupling assembly of the bone conduction device of FIG. 2.

As can be seen, the flux enters and/or exits magnet 1158A directly from or to spring 656. Conversely in an alternate design this is not the case. In this regard, FIG. 12 depicts an alternate design of a vibratory electromagnetic actuator 1250 of a vibratory actuator-coupling assembly 1280, where the fluxes enter and/or exit a further axial air gap 1171. Reference numeral 1290 indicates the flexible section of the spring 655, corresponding to flexible section 1190 detailed above.

In view of the above, designs detailed herein and/or variations thereof can enable a method of transducing energy. In an exemplary design of this method there is the action of moving the counterweight assembly 655 relative to the bobbin assembly 654A in an oscillatory manner. This action is such that during the movement of the two assemblies relative to one another, there is interaction of a dynamic magnetic flux and a static magnetic flux (e.g. at the air gaps). An exemplary method further includes the action of directing the static magnetic flux along a closed circuit that in its totality extends across one or more air gaps. In an exemplary design, this action is such that all of the one or more air gaps have respective widths that vary while the static magnetic flux is so directed and interacting with the dynamic magnetic flux. This action is further qualified by the fact that if there is more than one air gap present in the closed-circuit (e.g., the design of FIG. 12, as compared to for example the design of FIG. 6A or the design of FIG. 11), a rate of change of variation of the width of one of the air gaps of the closed-circuit is different from that of at least one of the other air gaps of the closed-circuit. Along these lines, it can be seen from FIG. 12 that the air gap between the spring and the permanent magnet will vary in width at a different rate than that of the air gap between the yoke and the bobbin. This is in contrast to, for example, the design of FIG. 5, where the closed static magnetic flux crosses two air gaps, where the width of one of the air gaps (i.e. the radial air gap) does not vary while the static magnetic flux interacts with the dynamic magnetic flux. Further, in an exemplary design, the amount of width variation of the air gap between the spring and the permanent magnet will vary by a different amount than that of the air gap between the yoke and the bobbin.

At least some designs detailed herein and/or variations thereof enable a method to be practiced where static magnetic flux is directed along a path that extends through a solid body while the solid body flexes (e.g., the design of FIGS. 6A, 10, 11 and 12).

The teachings above regarding the specifics of the electromagnetic are to be considered to form a background of the subject matter disclosed herein, and do not form part of the inventive features herein. Teachings herein are directed to novel arrangements of connecting the spring to the counterweight (where the counterweight can include the bobbin, as seen in, for example, the embodiment of FIG. 12). Accordingly, and features associated with 35 USC 112, 6th paragraph and connection/securement of the flexible apparatus to the counterweight do not cover the above, but cover the below. Other such recitations will cover the teachings above (e.g., a means for generating a dynamic magnetic flux, etc.).

To be clear, embodiments include any of the teachings detailed below and/or variations thereof relating to the attachment of the flexible apparatus to the counterweight, which can in turn be applied to any of the teachings above. Thus, embodiments include any one or more of the teachings detailed above in combination with/as modified using the teachings below relating to the attachments of the flexible apparatus to the counterweight.

It is also noted that while embodiments below focus on the so-called balance transducer, such as that of FIG. 6A, embodiments can also be applicable to the unbalanced transducers, such as those of FIGS. 11 and 12, by example. Briefly, any disclosure below with respect to a spring that is utilized to connect a bobbin and/or a bobbin assembly to the counterweight assembly corresponds to a disclosure of a spring that is utilized to connect a yoke to a counterweight assembly, such as where the counterweight assembly may or may not include a bobbin.

It is also noted that while most of the embodiments below are directed towards transducers that utilize two springs (one at the top and one at the bottom), embodiments can also be practiced where only a single spring is utilized (either at the top or the bottom). Accordingly, any disclosure herein with respect to the utilization two springs corresponds to an alternate disclosure of an alternate exemplary embodiment that utilizes a single spring, in the interests of textual economy.

Also, while the embodiments of FIGS. 11 and 12 depict the utilization of the spring to close an air gap, in an alternate embodiment where the teachings below are used, additional air gaps are present in this modified unbalanced transducer based on the general design of FIGS. 11 and 12. For example, yoke 1160 extends outward further (almost to the mass 670) and the permanent magnets 1158A do not extend to the spring (the yoke 1160 extends into the space left by the now shrunken permanent magnets). There is an axial air gap between the now extended yoke 1160 and the now shrunken permanent magnets 1158A. Also, the yoke 1160 is positioned further away from the spring so that the spring can flex without contacting or otherwise interfering with the yoke numeral 1160.

It is also noted that some embodiments of the unbalanced transducer are such that the bobbin is separate from the counterweight. In this regard, the yoke could be at the top instead of the bottom with respect to an alternate arrangement of FIG. 12.

Embodiments of the teachings herein are directed to attaching a flexible apparatus (e.g., a spring), which flexible apparatus connects the bobbin to the counterweight (the functional equivalent to springs 656 and 657 above), in a manner different from the above noted manners. In this regard, in some embodiments, there is no adhesive, no rivets, no bolts and/or no welds, used to attach the flexible apparatus to the counterweight. That said, in some embodiments, these arrangements may be present, but the additional innovative manner of attaching the flexible ember to the counterweight is present, which innovative manner will now be described.

Figure 13:
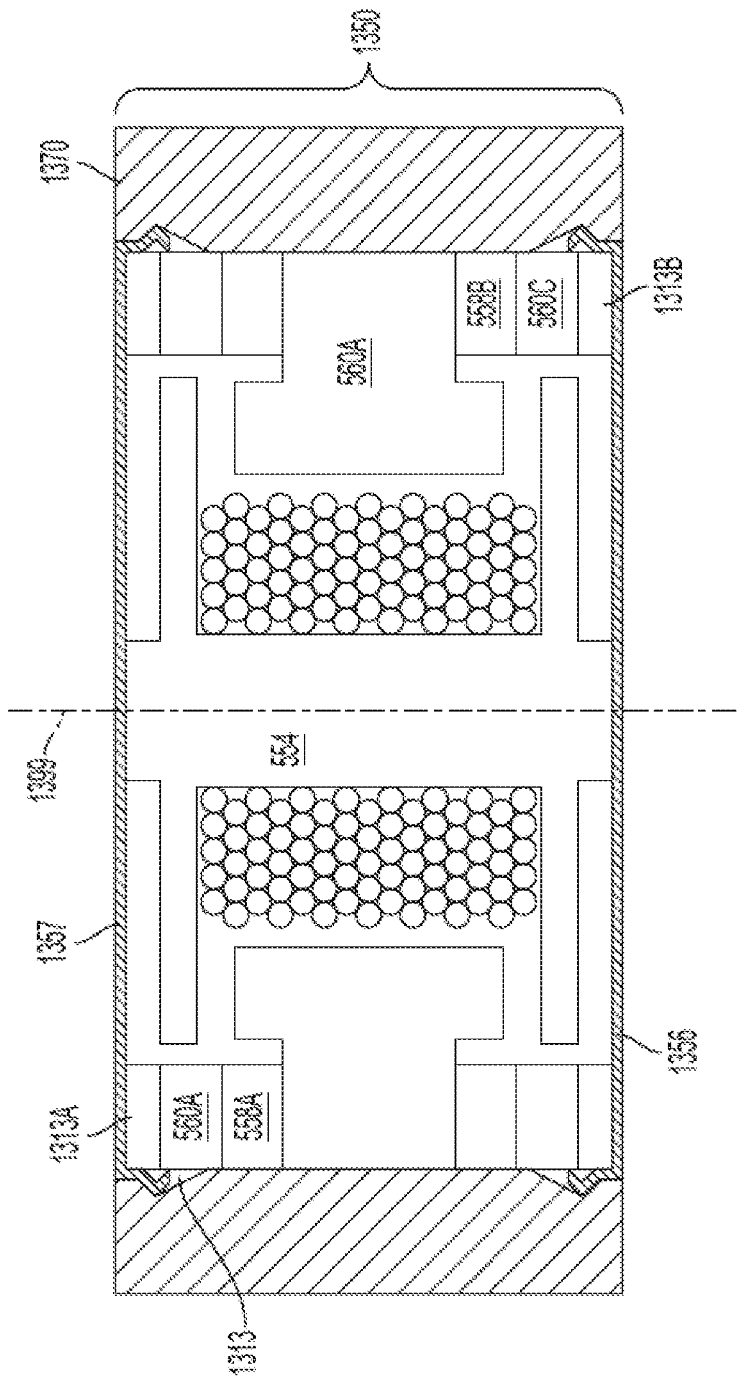
FIG. 13 depicts an embodiment of an electromagnetic transducer according to the teachings herein.

FIG. 13 depicts an exemplary vibratory electromagnetic actuator 1350, utilizing an embodiment of the attachment of the spring 1357 to the counterweight mass 1370. The phrase "counterweight mass" corresponds to the extra material that is added to the permanent magnets 560A and 560B and the yokes that move relative to the bobbin 554 during actuation and/or transduction. Conversely, the word "counterweight" refers to the overall mass that moves relative to the bobbin 554, which includes the permanent magnets and the yokes, etc., and the counterweight mass. While embodiments depicted herein are directed towards showing the interface between the spring and the counterweight mass, it is to be understood that an alternative embodiments, the interface can be between the spring and other components of the overall counterweight, such as for example the yoke 560A, etc.

As seen in FIG. 13, there is a spring 1357 extends over and beyond the outboard most portions of the permanent magnets 560A and yokes 558A and B, and the spacer 1313A. Spring 1356 at the bottom does the same with respect to the respective components. Spring 1357 also extends around those components and downward as seen. The spring 1367 extends between the spacer 1313A then the yoke 560A and the counterweight mass 1370.

Figure 14:
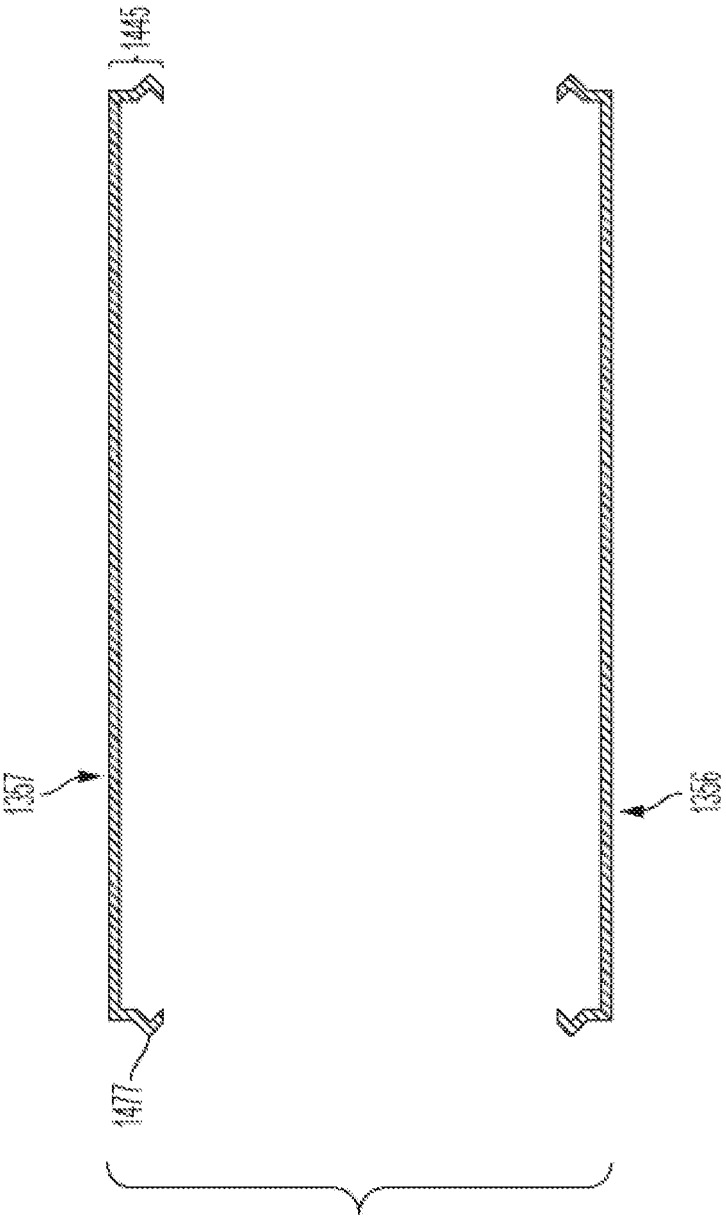
FIGS. 14 and 14A and 16 present views of springs according to some embodiments.

FIG. 14 depicts the springs 1357 and 1356 in isolation from the other components of the transducer. As can be seen, the springs extend in a manner concomitant with the springs 657 and 656 of the embodiment of FIG. 6C. However, here, there is no through hole or the like through which bolts extend (because bolts are not used). Note that there may be, in some embodiments, through holes, such as that to attach the spring to the bobbin, or simply for flexural and/or air movement purposes, etc.

Figure 14A:
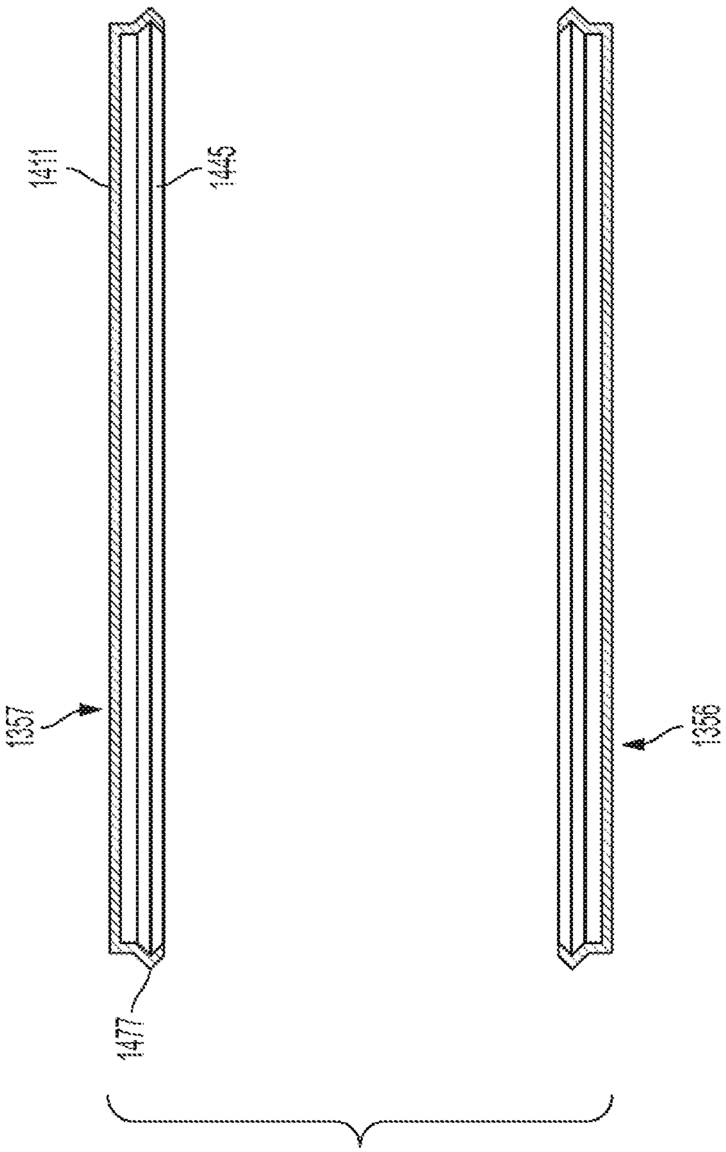

In any event, in this exemplary embodiment, there are no through holes on the outboard portions of the springs. That is, with respect to the outboard portions of the springs, the view of FIG. 14 represents a cross-section through the spring, which cross-section is uniform throughout a 360° rotation. Indeed, with embodiments that utilize an adhesive or the like to attach the spring to the bobbin, the cross-section shown in FIG. 14 represents a cross-section that is uniform throughout a 360° rotation. (FIG. 14A depicts the "backdrop" of the spring, where the front is a cross-section.) It is noted that with respect to the aforementioned 360° of rotation, the views of FIG. 14 are applicable for the entire spring, except the center portion, which in some embodiments, can have a through hole for a bolt or a rivet or the like for attachment of the spring to the bobbin.

On the outboard portions of spring 1357 and spring 1356, there are respective walls 1445 extending downward and upward respectively, from the face 1411 of the spring. These walls can be established by plastically deforming the outboard most portions of the spring. In an exemplary embodiment, instead of walls, these can be arms. That is, with respect to the embodiment depicted in FIG. 14, FIG. 14 can be representative of arms instead of walls. There can be two forms as shown, while in other embodiments, there can be three, four, five, six, seven, eight, nine, 10, 11, 12, 13, 14 arms or more, which may or may not be evenly dispersed. In an exemplary embodiment, there will be relief sections in the walls to accommodate stress risers that might result from the establishment of the walls.

More to the point, the purpose of the walls or the arms is to provide an elastic portion that can be used to provide a connection that will retain the spring to the counterweight. Returning to FIG. 13, it can be seen that there is a recess 1313 in the counterweight mass 1370. This recess is angled and contoured in a manner to receive the outwardly extending portion 1477 of the wall 1445. The outwardly extending portion 1477 is also plastically deformed, and can be established during the creation of the wall proper. That is, instead of a vertical wall, the wall is a complex contoured wall. Here, the wall extends downward in a first section, then outward in a second section, and then inward in a third section. The contours interface with the upper wall of the recess 1313, and owing to the elasticity of the wall/spring in general, and owing to the radial dimensions of the features at issue, an interference fit and/or a spring fit is established between the spring, or more accurately, the outermost portions of the spring 1357, and the interior walls of the counterweight mass 1370, or, more accurately, the walls of the recess 1313. (It is briefly noted that with respect to the embodiments under discussion, the various features are rotationally present about the longitudinal axis 1399, and in some embodiments, rotationally symmetric about 360 degrees about the axis 1399.) The geometry of the recesses of the counterweight mass presses the walls 1445 (or arms) inward towards the longitudinal axis 1399, and the spring force which reacts against such, which biases the walls outward, holds the spring relative to the counterweight or holds the counterweight relative to the spring, depending on the frame of reference one uses.

Not shown in the figures is a relief section in the spacer 1313A and the permanent magnet 560A, which can be utilitarian with respect to providing an area for the wall to flex inward when the spring is attached to the counterweight mass. In some embodiments, this relief is present. In an exemplary embodiment, after the attachment of the spring to the mass, the relief area can be filled with a rigid material to resist movement of the walls inward, effectively "locking" the outwardly extending portion 1477 in the recess 1313, and thus locking the spring to the counterweight. In an exemplary embodiment, a resin can be injected, which resin easily flows into the area behind the wall, and upon curing, hardens, and thus provides resistance to inward movement of the wall. In an exemplary embodiment, a solid structure can be placed behind the wall. In this regard, by way of example, there can be a path through the spacer 1313A that can enable placements of pins or the like to press against the wall, and thus prevent the wall from flexing inward. Any device, system, and/or method that will enable the locking of the wall in the recess 1313 can utilize at least some exemplary embodiments.

Thus, as can be seen, in an exemplary embodiment, the spring is positively retained to the counterweight mass (where positive retention means that there is a piece of the mass that is interposed between a path of removal of the spring and the spring—by analogy, threads positively retain a bolt in a hole-whereas a nail is not positively retained in wood, as it is friction force that holds the nail into the wood), because the outwardly extending portion 1477 extends into the counterweight mass. With respect to the embodiment of FIG. 6C, the bolts/rivets positively retain the spring to the counterweight mass. However, the spring or the flexible apparatus does not positively retain the spring to the counterweight mass. Conversely, the embodiment of FIG. 13 is such that the spring does indeed positively retain the spring to the counterweight mass, because a piece of the spring interferes with a piece of the counterweight mass.

Figure 15:
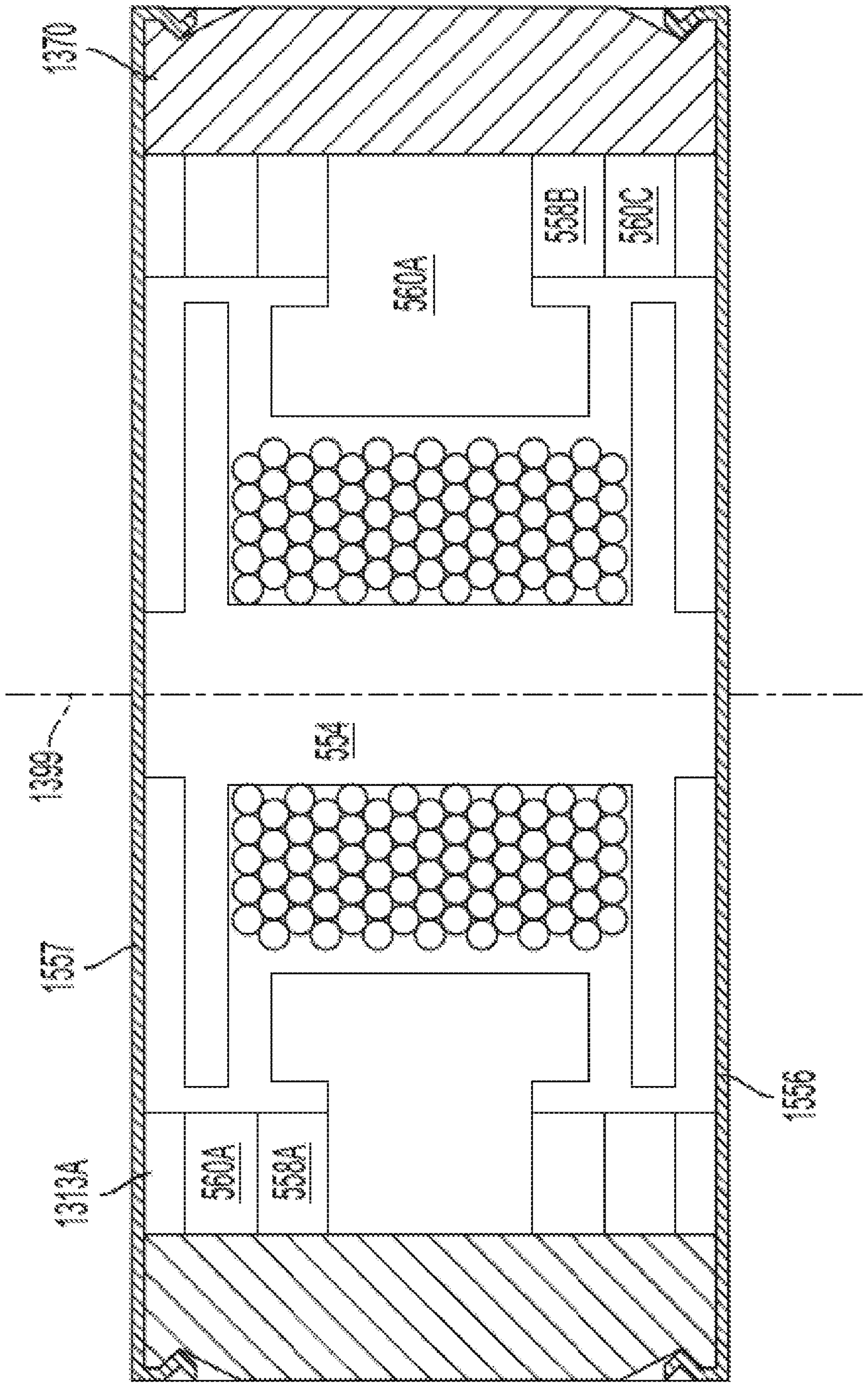
FIG. 15 depicts an embodiment of an electromagnetic transducer according to the teachings herein.
Figure 16:
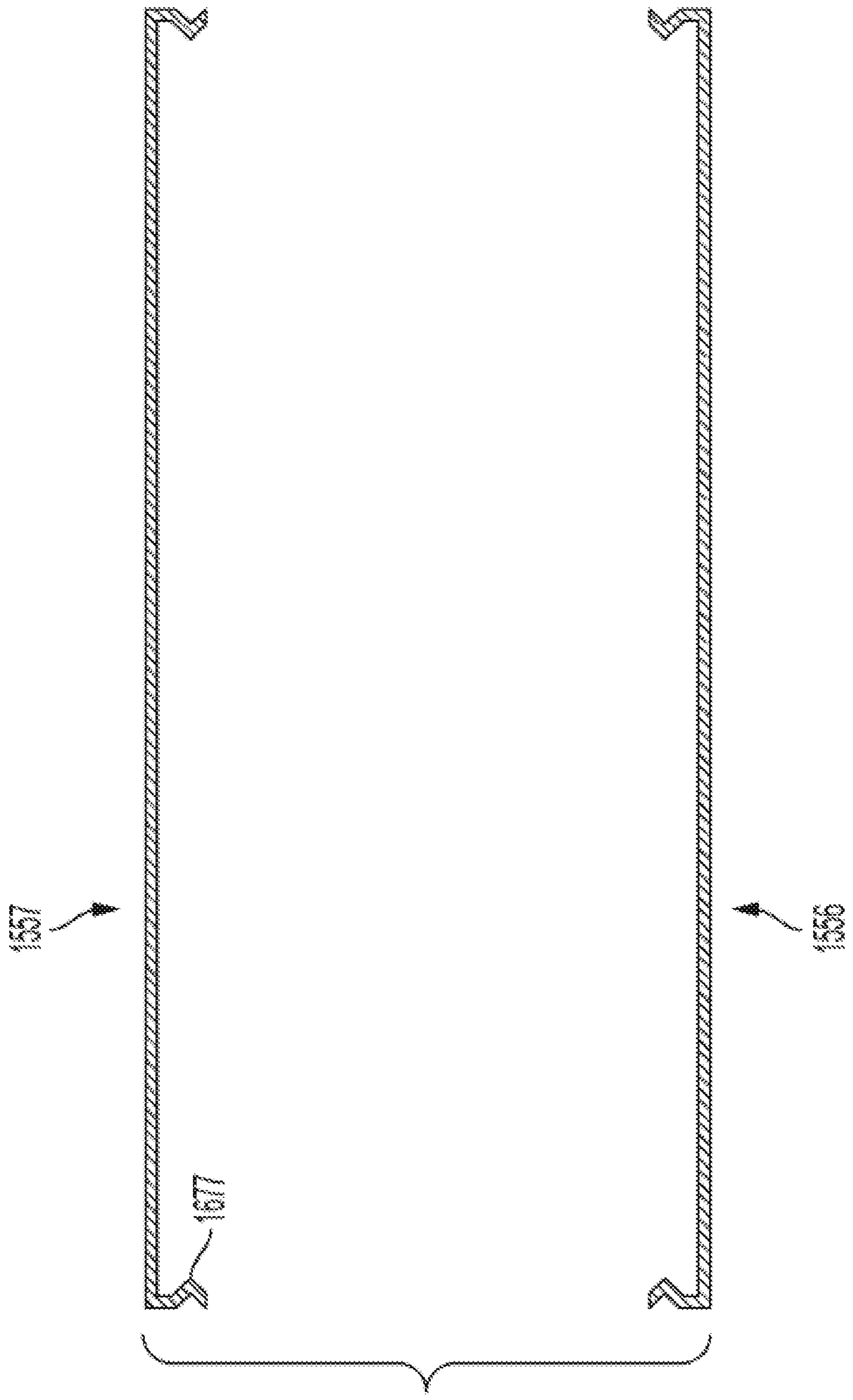

FIG. 15 presents an alternate exemplary embodiment of a regime utilized to attach the spring to the counterweight. Here, there is spring 1557 and spring 1556, which springs extend all the way outward of the counterweight mass 1370, and then around the counterweight mass 1370. FIG. 16 depicts springs 1557 and 1556 in isolation. In some embodiments, features of the springs are identical to those detailed above save for the walls (and the overall dimensions, owing to the fact that the spring extends further in the outboard direction). As seen, the walls are mirror images of the walls of the embodiment of FIG. 14. Here, instead of outward extending portions, there are inward extending portions 1677. As seen in FIG. 15, the inwardly extending portion of the spring 1557 extends into a recess in the outer circumference of the counterweight 1370. Other than that, the principle of operation here is relatively the same as the embodiment of FIG. 13 except that the walls are biased outwardly by the mass 1370 in the spring bias drives/pushes the inwardly extending portion towards the longitudinal axis of the assembly.

Figure 17:
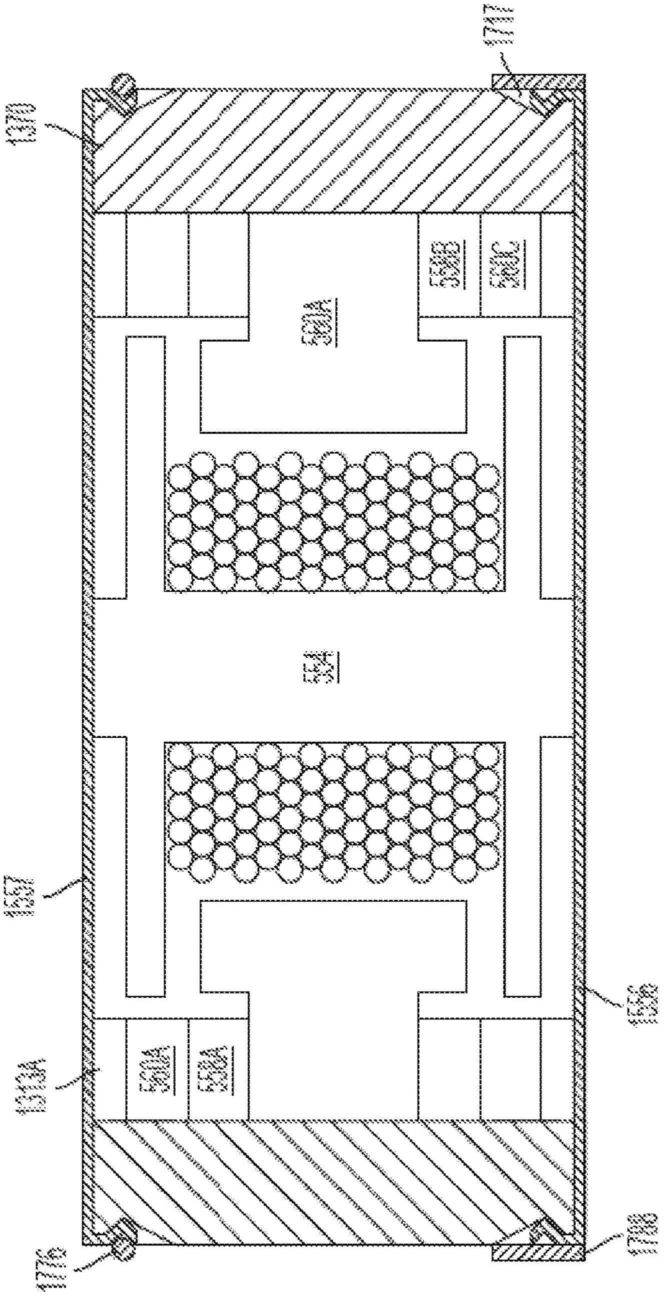
FIGS. 17-20 depict various embodiments of electromagnetic transducers according to the teachings herein.

Consistent with the embodiment of using a second element to secure the spring in place, in the embodiment of FIG. 17, a metal band 1776 with a circular cross-section extends about the wall (or arms) of the spring 1557 (and can be done with the spring 1556), which band applies a compressive force onto the outside of the wall, resisting any movement of the wall outward away from the longitudinal axis 1399. In an exemplary embodiment, the band 1776 can be heated to expand, and then as the band cools, shrinks about the outer profile of the wall, and thus providing resistance to outward movement of the wall. In an exemplary embodiment, the band can be cinched around the wall.

FIG. 17 also shows another exemplary embodiment utilized to secure the spring in place. Here, there is a band 1788 that has a rectangular cross-section. In an exemplary embodiment, a resin or the like, such as the resin detailed above, can be utilized to fill the space 1717 behind the inwardly extending portion of the wall, which space extends to the inward face of the band 1788. When this resin hardens, the resin becomes effectively incompressible, and thus the hardened resin will be pressed against the interior wall of the band 1788 if the walls attempt to move outward so that the inwardly extending portion 1577 can be removed from the recess. This resists such movement, thus maintaining the spring in place.

While resin, such as an epoxy based resin, has been described above, in some other embodiments, solder and/or sintering and/or weld can be utilized to fill the space and thus secure the spring in place (this can also be the case with respect to the embodiment of FIG. 13). Note also that the band 1788 can be utilized with respect to spring 1557. FIG. 17 simply shows two of the various possibilities used together in the interest of pictorial economy.

Figure 18:
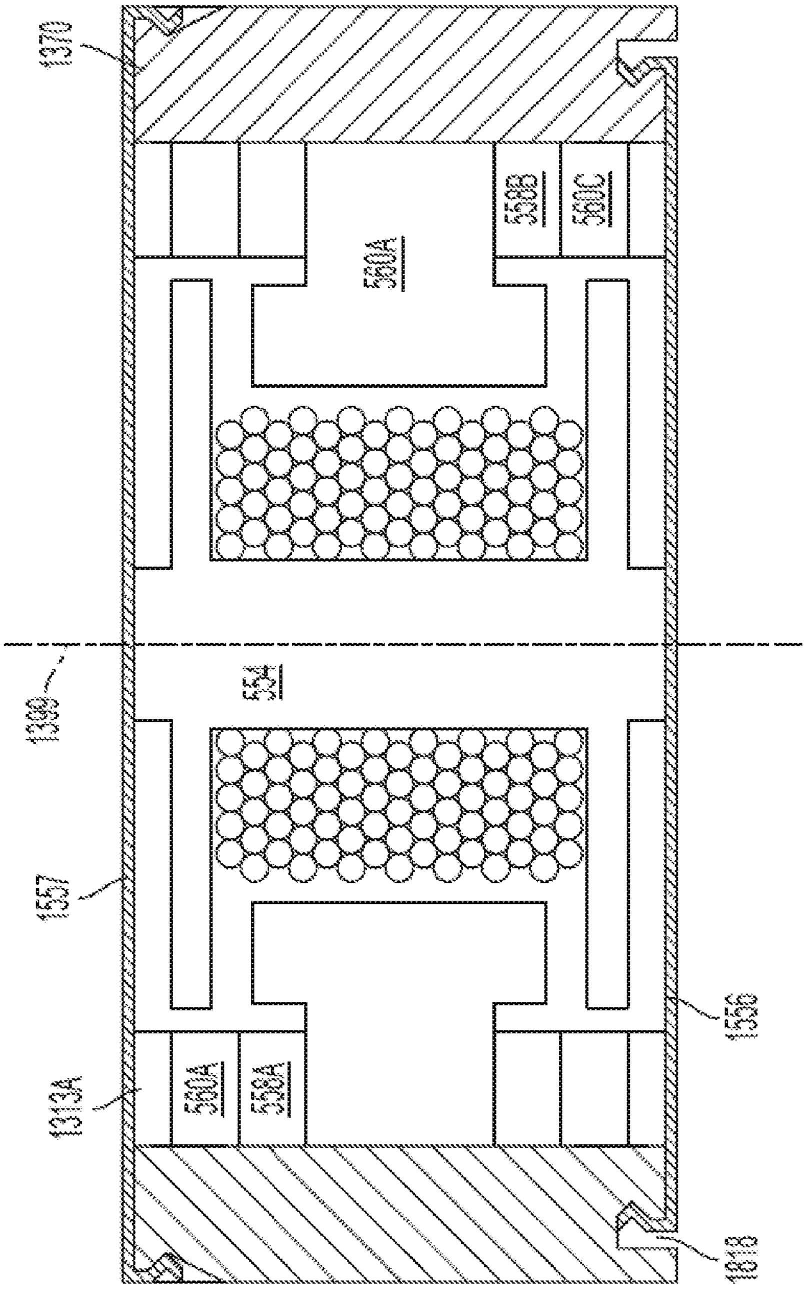

FIG. 18 presents another exemplary embodiment, where the spring extends mid-way or so over the counterweight mass 1370. Here, there is a recess 1818 within the counterweight mass 1370, at the bottom thereof. The recess 1818 is machined to have a contour on the inboard side to interface with the wall of the spring 1556 in general, and the inwardly extending portion 1577 in particular. This operates in principle similar to the arrangement of FIG. 17, except that the interface of the spring and the counterweight mass is located as shown. In an exemplary embodiment, the material can be placed into the recess 1818 after the spring is located therein, which material can be utilized to secure the spring in the recess. The material can be a resin or solder, etc. It is noted that the arrangements of the spring 1556 can also be utilized for spring 1557. It is also noted that while the spring 1556 is depicted as having inwardly extending portions, the spring can have outwardly extending portions, concomitant with the arrangement of FIG. 14. The geometry of the recess 1818 would be reversed accordingly from the presented in FIG. 18.

The embodiments above focused on a monolithic spring 1557 and a monolithic spring 1556, which monolithic spring is utilized to attach the spring to the counterweight mass. In an exemplary embodiment, an alternate embodiment can be utilized which has functionality similar to that of the embodiment of FIG. 15, but utilizes a two-piece arrangement. Specifically, the spring 1957 can be a circular plate spring without walls, and a band 1988 having a geometry corresponding to the outboard portions of the spring 1557 can be utilized to clamp the spring 1957 to the counterweight mass 1370. The band 1988 interfaces with the counterweight mass 1370 in a manner consistent with how spring 1557 interfaces there with. Band 1988 has a horizontally extending portion that overhangs the spring 1957, thus clamping the spring. The band 1988 can be secured to the counterweight mass utilizing any of the teachings detailed above with respect to spring 1557 or spring 1556. In some exemplary embodiments, the band 1988 can be utilized with the arrangement at the bottom of FIG. 18.

Figure 19:
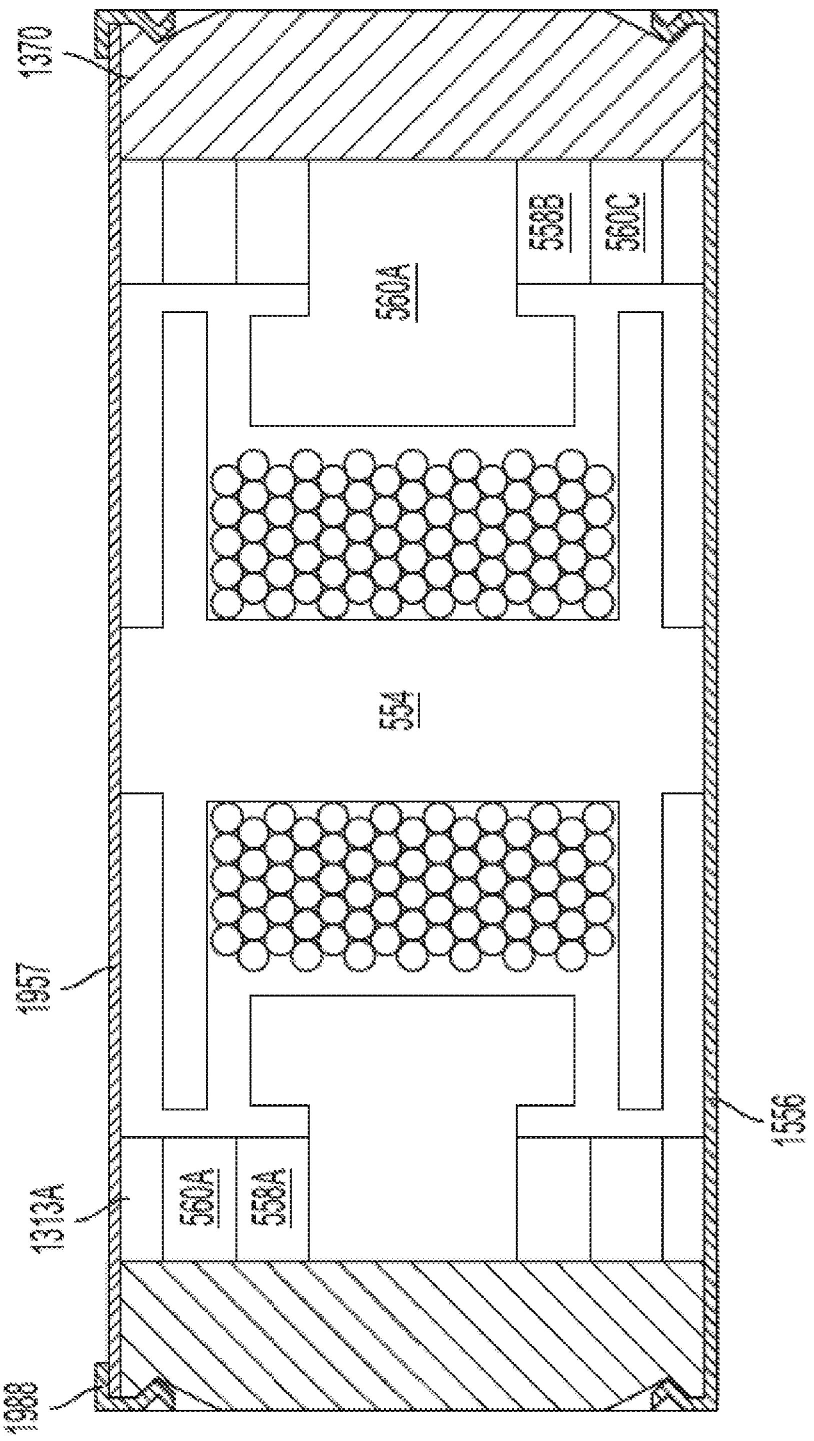

While the embodiment depicted in FIG. 19 is presented in view of a manufacturing method where the spring 1957 is placed onto the counterweight 1370, and then the band 1988 is placed over the spring to attach the spring to the counterweight, and also in this embodiment, the spring 1957 and the band 1988 can be preassembled to form an integral component (as opposed to a monolithic component—where spring 1557 is a monolithic component), and then in combination, the integral component-spring and band—can be placed onto the counterweight mass 1370. In an exemplary embodiment, the spring and the band can be pre-manufactured from a supplier, where the band can be adhesively adhered or welded or riveted, to the spring.

Figure 20:
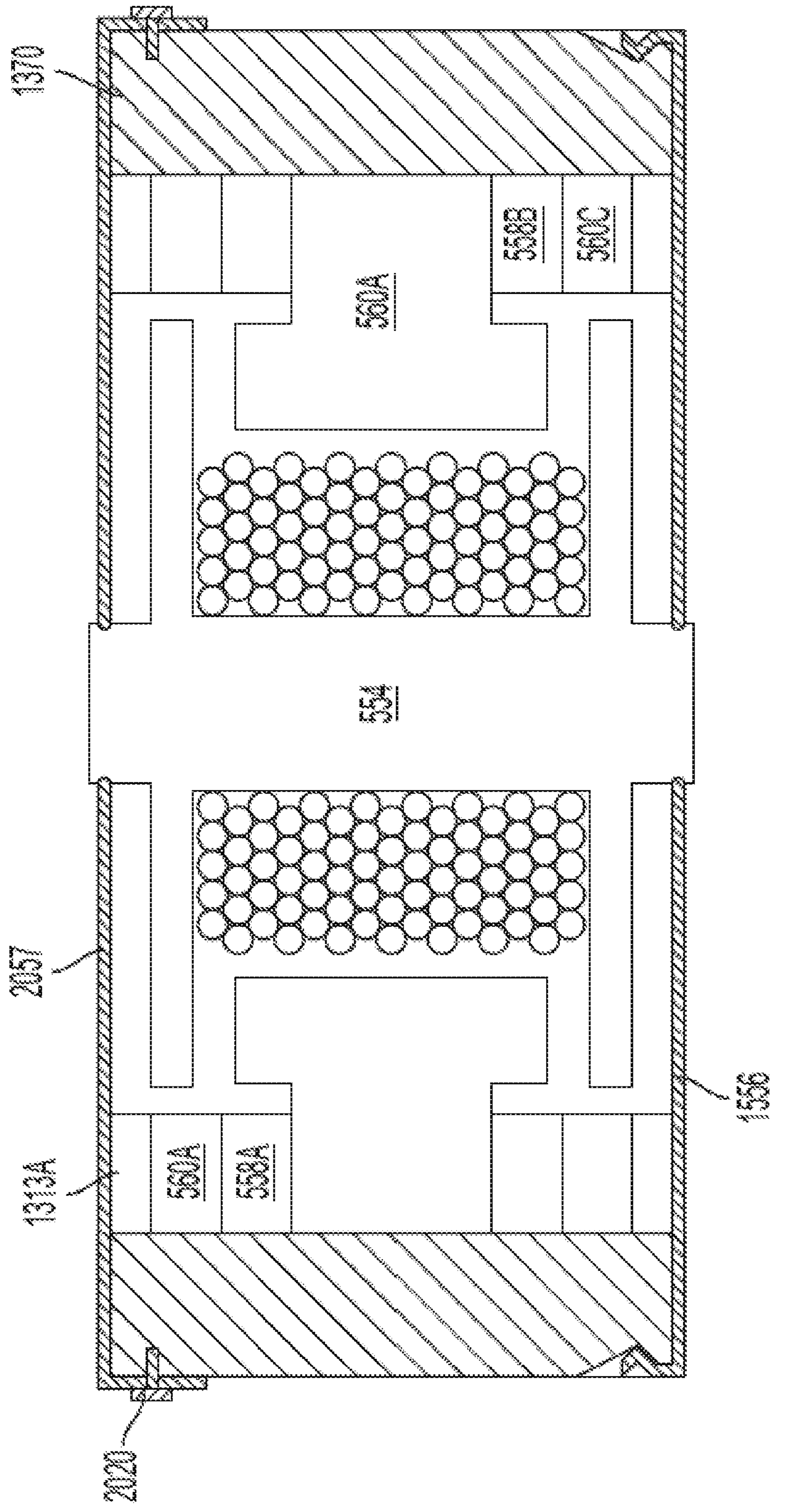

FIG. 20 presents another exemplary embodiment where a spring 2057 includes a wall that extends vertically without any outwardly or inwardly extending portions. Thus, there is no component of the spring that positively interferes with the mass 1370. Instead, bolts 2020 are utilized. These bolts extend through holes in the sidewalls, and can be threaded into the mass 1370. Here, these bolts are in shear as opposed to tension with respect to the embodiment of FIG. 6C. In an exemplary embodiment, 2, 3, 4, 5, 6, 7, 8, 9, 10, 11, 12, 13, 14, 15, 16, 17, 18, 19, or 20 or more bolts arrayed about a given spring. Owing to the ability to use more bolts than that which is the case with respect to the embodiment of FIG. 6, smaller bolts can be utilized. Also, in some embodiments, an interference that can be established with respect to the wall in the outer circumference of the mass 1370. Indeed, in an exemplary embodiment, the spring can be heated to expand, and then as it cools, it will shrink around the outer circumference of the mass 1370, and thus secure the spring to the mass. Indeed, in some embodiments, owing to this friction fit/interference fit, bolts do not bear the bulk of the holding forces. In some embodiments, there are no bolts, only the interference fit. That said, and in an exemplary embodiment, a multiple component assembly can be utilized in a manner somewhat analogous to the spring 1957 in the band 1988 of FIG. 19. More particularly, the band 1988 could instead be an L-shaped band that does not have the inwardly extending portion. Providing that the band 1988 is made out of material robust enough to withstand the interference fit, pure interference fit can easily be used to clamp the spring to the mass 1370. That is, by utilizing a band that is substantially stronger on a per unit basis than the spring itself, the band can be more readily used to establish the interference. As with the embodiment detailed above with respect to establishing an integral device using two parts, the spring can be attached to this robust band beforehand. Indeed, in an exemplary embodiment, the band can be analogous to a drum band. That is, the band supports the spring, and it is the band that is directly attached to the counterweight mass. The band can be such that the spring is positioned spaced away from spacer 1313A and the mass 1370. Note that the concept of FIG. 20 can be utilized with the concept of FIG. 19. That is, the band can correspond to the outer portion of the spring 2057 (it can have the L shape, as opposed to the inwardly extending portion) and the spring can be spring 1957. Spring 1957 can be clamped between the mass 1370 and the band, or can be attached to the band, etc.

The band can be a rigid structure, at least relative to the spring.

In view of the above, it can be seen that in an exemplary embodiment, there is a device, such as the transducer 1350 of FIG. 13, or the transducer of FIG. 15, etc. In an exemplary embodiment, the transducer is an electromagnetic transducer, and in some embodiments, electromagnetic vibrator, such as by way of example only and not by way of limitation, a vibrator of a bone conduction device. In this exemplary embodiment, the device can include a bobbin 554, about which is wound wires so as to establish an electromagnet when those wires are energized with an alternating current that causes the polarity of the magnetic flux to alternate. The device also includes the counterweight apparatus, which, consistent with the teachings herein, can include the counterweight mass 1370 and the permanent magnets 558A and 558B and the yokes 560A-C and the spacers 1313A. In some embodiments, collectively, these components are referred to as the seismic mass/seismic mass assembly.

As seen, in these embodiments, there is a flexible apparatus connecting a yoke (which can be a yoke of the bobbin (all bobbins have a yoke, if only the part that establishes the core about which the coils are wound), or the yoke of an unbalanced transducer (which may be the case where the bobbin is part of the counterweight, for example) to the counterweight apparatus. In this exemplary embodiment, the flexible apparatus is a spring, and, the spring is directly connected to the counterweight mass 1370, but it is noted that in some alternate embodiments, such as the variation of the embodiment of FIG. 19 where the spring is directly connected to the band 1988 and the spring is spaced away from the seismic mass, the spring is indirectly connected to the counterweight mass.

Hereinafter, a "bobbin" will often be described as the part that the spring connects to the counterweight. It is noted that any such disclosure also corresponds to a disclosure of an alternate embodiment where instead of the bobbin, there is a more generic yoke, as might be the case with respect to an unbalanced transducer. That is, while, as noted above, embodiments herein are described primarily in terms of a balanced transducer, these teachings are equally applicable to the unbalanced transducer, and thus in the interests of textual economy, any reference to a bobbin below corresponds to a reference in an alternate embodiment to a yoke (but again, all bobbins have a yoke).

Consistent with the embodiments of FIGS. 13-20, the flexible apparatus is attached to the counterweight apparatus via a radial connection (this includes the embodiment of FIG. 19, for example, which uses the band 1988—this would also include the arrangement were the band supports the spring such that the spring does not directly contact the mass 1370 and/or the spacers 1313A (indeed the spacers 1313A might be dispensed with in this embodiment)—the spring does not directly contact the counterweight assembly if the band is excluded from being included as part of such. This as diametrically opposed to the arrangement of FIG. 6C, where the bolts 677 provide an axial connection. (Note that in this embodiment, an axial connection can be utilized for the spring and the bobbin.)

But still, in an exemplary embodiment, the flexible apparatus is a monolithic component, and the establishment of the attachment is accomplished by the flexible apparatus (this thus excludes the embodiment of FIG. 19 for example).

In an exemplary embodiment, the flexible apparatus is a spring, and the establishment of the attachment is accomplished by the spring. This would exclude, for example, the embodiment of FIG. 20. Indeed, in this exemplary embodiment, the spring 2057 is a monolithic component. Another embodiment that would exclude FIG. 20 is an embodiment where forces that maintain attachment of the flexible apparatus to the counterweight apparatus are due to the flexible apparatus. (FIGS. 13 and 15, for example, are covered by this.)

The arrangement of FIG. 13 for example, or of FIG. 20 for that matter, provide radial connections because the connection is in the radial direction of the transducer, as opposed to the axial direction (up and down).

Some bookkeeping. While the above details of the flexible apparatus are presented in a manner such that it is attached via a radial connection, this does not preclude an attachment in the axial direction in addition to this radial connection. By way of example only and not by way of limitation, an epoxy or an adhesive or the like can be placed between the spring 1357 and the counterweight mass 1370 on the axial facing surfaces. Thus, radial connection can exist simultaneously with an axial connection. It is also noted that adhesive can also be utilized on the radial facing surfaces as well, so as to enhance the connection. The point here is that when it is detailed that there is a radial connection, it means that there only need be a radial connection, irrespective other types of connections that might be present.

In some embodiments, the connection is primarily a radial connection. In this regard, the majority of the connection force/retention forces a result of the radial connection (jumping ahead to method 2200, this would correspond to a transduction functional connection established primarily utilizing the radial connection). This can be measured by establishing a breakaway force. If the force required to remove the spring from the counterweight mass if only a radial connection was present is greater than the force required to remove the spring from the counterweight mass if only and axial connection present, the connection primarily a radial connection, and a connection that is primarily an axial connection would be the opposite such.

Of course, in some embodiments, the connection is only a radial connection.

The phrase counterweight assembly refers to a component or compilation of components that move relative to the bobbin if the bobbin is held steady (as is the case when, for example, the embodiment of FIG. 13 is used with the embodiment of FIG. 6A, for example, where, when coupling assembly 640 is attached to a skin penetrating abutment (snap coupled thereto, for example) the bobbin effectively does not move, relative to the abutment, and it is the counterweight assembly that moves. Conversely, in an exemplary embodiment, the counterweight assembly can be held fixed, and it could be the bobbin that moves relative to the counterweight. All of this as distinguished from, for example, where the counterweight assembly is identified as a seismic assembly/seismic apparatus, which means that the counterweight apparatus (seismic apparatus) moves relative to the bobbin/the bobbin is fixed. In this regard, the bobbin could be a seismic component if the counterweight assembly is held fixed.

These designations simply provide a convenient way of describing how the transducer is utilized. The generic phrases bobbin and counterweight assembly/counterweight apparatus do not require that one be fixed relative to the overall arrangement, as used herein.

Note that the addition of the phrase "mass" to counterweight, such as counterweight mass, means that there is a mass that is added to the overall system. This as distinguished from mere de minimis mass that would be present owing to the general construction of the device (say without mass 1370). It is also noted that a mass can be added to the bobbin so that there could be a bobbin mass, which would increase the mass of the bobbin, which can have utilitarian value with respect to an embodiment where the bobbin is the part that moves relative to the counterweight apparatus. The additional mass results in additional inertia when the device is vibrating, which can utilitarian value with respect to utilization of the transducer is a vibrator and a bone conduction device.

In this regard, there can be utilitarian value with respect to adding additional mass to the moving component of the transducer. In an exemplary embodiment, within reason, the more massive the seismic mass is, the better the performance. The additional mass is in addition to the mass of the yoke and the permanent magnets for example. This additional mass is also in addition to, for example, bobbin components if such is present. In an exemplary embodiment, the counterweight mass that is added can be a circular cylinder having a wall thickness. This circular cylinder is present as mass 1370 seen in FIG. 13. In contrast to the mass 670 of FIG. 6C, for example, a cross-section taken through the mass lying on a plane that is normal to the longitudinal axis 1399 is solid with respect to portions located between the outer profiles of the counterweight mass (of course, the interior will be hollow, as it is a cylinder). This can be seen from FIG. 21A, which depicts a cross-section of counterweight mass 1370 taken at, for example, a plane normal to the longitudinal axis 1399 and lying at a distance of 5, 10, 15, 20, 25, 30, 35, 40, 45, 50, 55, 60, 65, 70, 75, 80, 85, 90, 95 percent or any value or range of values in 1% increments of the total height of the counterweight mass from the top or the bottom. In an exemplary embodiment, if the recesses for the spring are ignored, this feature is present for the entire cylinder from top to bottom. But in any event, as can be seen, the interior of the cross section is contiguous. The cross-section is solid with respect to portions located between the outer profiles.

Figure 21:
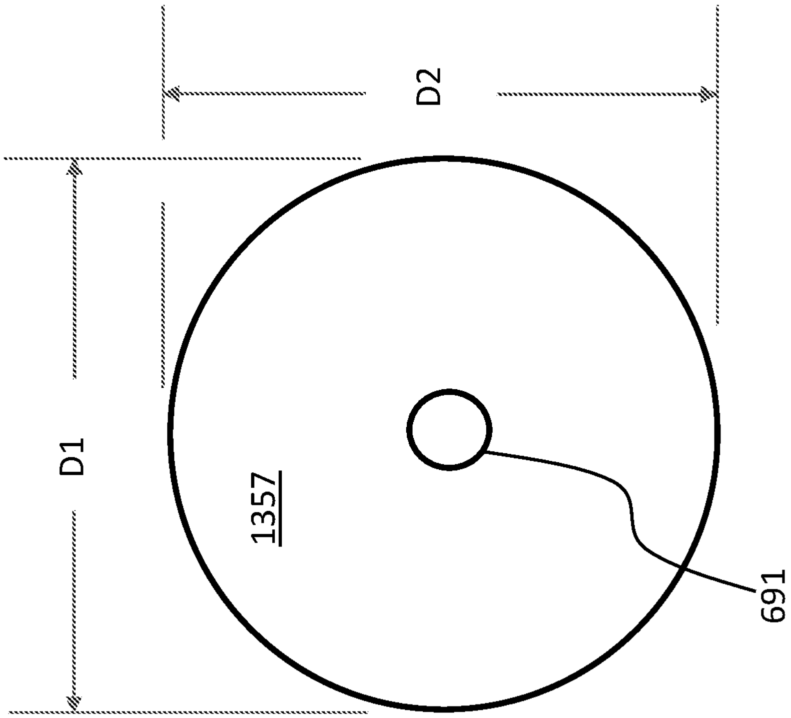
FIGS. 21-21A present schematics for dimensions.
Figure 21A:
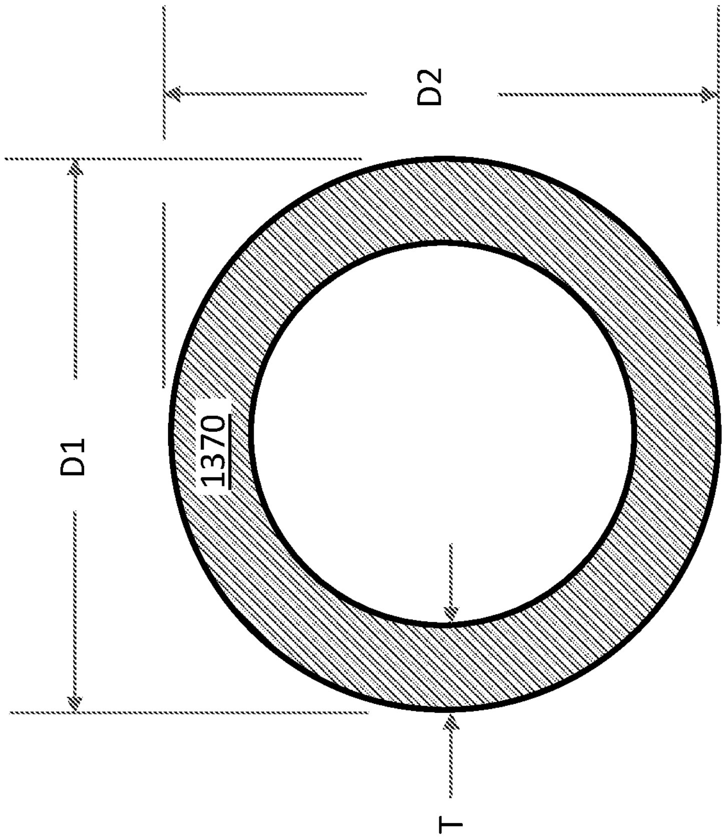
Figure 21B:
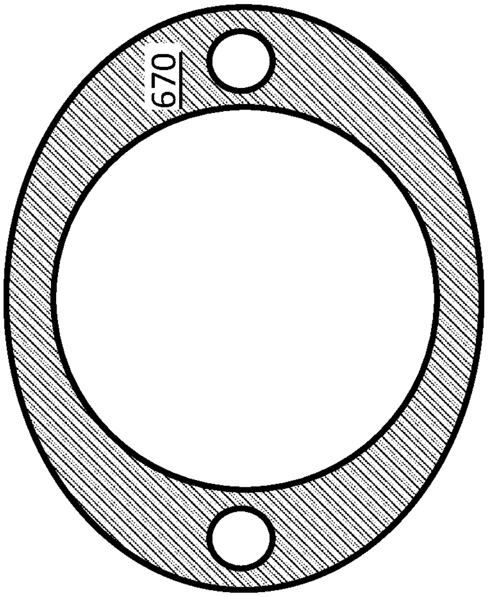
FIG. 21B depicts an arrangement that some embodiments can avoid when used.

All of this as contrasted to, for example, the arrangement seen in FIG. 21B, which depicts the two through holes for the bolts 679/rivets 679. As can be seen, the interior of the cross-section is not contiguous at some locations. The cross-section is not solid with respect to portions located between the outer profiles. Also as can be seen, briefly, the oblong shape that can be used to provide sufficient space for the bolts, etc. All this as contrasted to, for example, the much more rotationally even shape of FIG. 21A.

The above said utilitarian value with respect to having the counterweight that has a counterweight mass having a volumetric based density that is much more closer to the material density thereof than that which would otherwise be the case if the bolts where the rivets are used such as is the case with respect to the embodiment of FIG. 6C. By "volumetric based density," this is the density that an object has based on the shape. Thus, in an exemplary embodiment, the dedicated counterweight mass has a volumetric based density discounting for the hollow portion at the center thereof, that is at least and/or equal to 80, 81, 82, 83, 84, 85, 86, 87, 88, 89, 90, 91, 92, 93, 94, 95, 96, 97, 98, 99 or 100% of the material density thereof. For example, the value would be 100% for the embodiment of FIG. 19, but not 100% for the mass of FIG. 6C. It is noted that these values are calculated based on monolithic components, as opposed to aggregate components.

In an exemplary embodiment, the thickness of the "wall" of the mass (e.g., the distance from the outside of the arrangement of FIG. 21A to the interior wall-"T" in FIG. 21A) is 5, 6, 7, 8, 9, 10, 11, 12, 13, 14, 15, 16, 17, 18, 19, 20, 21, 22, 23, 24, 25, 26, 278, 28, 29 or 30 mm or any value or range of values therebetween in 0.1 mm increments, and these thicknesses can make up 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30% or any value or range of values therebetween in 0.1% increments of the values of D1 and/or D2.

In an exemplary embodiment, the thickness of the mass varies no more than 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30% from a mean, median and/or mode thickness or can have no variation, over a 360 degree sweep about the longitudinal axis, with respect to one or more or all of the above noted planes (or the entire mass). Thus, embodiments can provide a more evenly distributed wall thickness.

Briefly, with respect to the aforementioned embodiments that utilize the radial connections, a force of 5, 6, 7, 8, 9, 10, 11, 12, 13, 14, 15, 16, 17, 18, 19 or 20, 25, or 30 pounds or more or any value or range of values therebetween in half-pound increments is needed to release the flexible apparatus from the counterweight. In an exemplary embodiment, D1 and/or D2 is less than or equal to 0.5, 0.75, 1, 1.25, 1.5, 1.75, 2, 2.25, 2.5, 2.75, 3, 3.5, 4, 4.5, 5, 5.5 or 6 inches or any value or range of values therebetween in 0.01 inch increments. In an exemplary embodiment, a thickness of the spring (mean, median and/or mode) is less than or equal to 0.1, 0.2, 0.3, 0.4, 0.5, 0.6, 0.7, 0.8, 0.9, 1, 1.25, 1.5, 1.75 or 2 mm or any value or range of values therebetween in 0.01 mm increments.

Consistent with the teachings above, in an exemplary embodiment of the device, the flexible apparatus is attached to the counterweight apparatus via an arrangement that includes a portion that is plastically deformed in the radial direction (e.g., how the inwardly extending portions or the outwardly extending portions of the springs 1557 and 1357 are established, respectively). In an exemplary embodiment, the deformation maintains attachment between the flexible apparatus and the counterweight apparatus. Here, for example, the inwardly extending portions extend into the recesses in a male-female arrangement, and unless the elastic and/or plastic bias of the spring is overcome, there will be retention between the flexible apparatus and the counterweight apparatus.

Consistent with the teachings above, in an exemplary embodiment of the device, the flexible apparatus is attached to the counterweight apparatus via an arrangement that includes a portion that is elastically deformed in the radial direction (e.g., portions of the sidewall(s)/arms of springs 1557 and 1357). In this embodiment, the deformation is maintained by the counterweight apparatus, thus maintaining attachment between the flexible apparatus and the counterweight apparatus. By way of example only and not by way of limitation, irrespective of how the outwardly extending portion and/or the inwardly extending portion are established (this could be established via plastic deformation), the walls may have a bias to move inward or move outward, at least after being inserted or otherwise interfacing with the recesses in the counterweight mass, etc., which deformation that results in a connecting force between the flexible components and the seismic mass.

Consistent with the teachings detailed above with respect to FIG. 20, in an exemplary embodiment, the flexible apparatus is riveted and/or screwed and/or bolted to the counterweight apparatus, thereby maintaining attachment between the flexible apparatus and the counterweight apparatus. In this exemplary embodiment, the rivets and/or screws and/or bolts provide a radial connection, as contrasted to the embodiment of FIG. 6C.

Still further, in an exemplary embodiment there is a device, such as the transducer 1350 of FIG. 13, or the transducer of FIG. 15, etc. In an exemplary embodiment, the transducer is an electromagnetic transducer, and in some embodiments, electromagnetic vibrator, such as by way of example only and not by way of limitation, a vibrator of a bone conduction device. In this exemplary embodiment, the device can include a bobbin 554, about which is wound wires so as to establish an electromagnetic when those wires were energized, were energized with an alternating current causes the polarity of the magnetic flux to alternate. The device also includes the counterweight apparatus, which, consistent with the teachings herein, can include the counterweight mass 1370 and the permanent magnets 558A and 558B and the yokes 560A-C and the spacers 1313A. In this exemplary embodiment, the spring positively interferes with the counterweight apparatus, thus attaching the counterweight apparatus to the spring. FIGS. 13 and 15, for example, correspond to this embodiment. In an exemplary embodiment of this device, the positive interference occurs at an outer periphery of the counterweight apparatus (for example, FIG. 15). In an exemplary embodiment, the positive interference occurs at a location inside an outer periphery of the counterweight apparatus (for example, FIG. 13, the bottom portion of FIG. 18).

In an exemplary embodiment, the spring grips the counterweight apparatus, thereby maintaining attachment between the spring and the counterweight apparatus. Such an exemplary embodiment can be seen with respect to FIG. 15. That said, the embodiment of FIG. 18 also satisfies this with respect to both the top and the bottom springs, even though the bottom spring is located such that it does not fully span the counterweight apparatus. Conversely, in an exemplary embodiment the spring exerts an outward force on the counterweight apparatus, thereby maintaining attachment between the spring and the counterweight apparatus. This is the embodiment of FIG. 13 by way of example, in contrast to the embodiment of FIG. 15. With respect to FIG. 18, where, for example, 1556 has a wall with an outwardly extending portion, as opposed the inwardly extending portion seen in the figure, such would have a spring that exerts an outward force.

It is noted that while the embodiments just described relate to the spring, this can also be the case with respect to the overall flexible apparatus.

Consistent with some of the embodiments described above, the spring is plastically deformed in the radial direction, the deformed portion maintaining attachment between the spring and the counterweight apparatus. This can be a result of elastic deformation—the plastically deformed portion can still be elastically deform so as to achieve the maintenance of the attachment.

In some embodiment, forces that maintain attachment of the spring to the counterweight apparatus are uniformly distributed relative to the spring. This as contrasted to, for example, the utilization of bolts the like with respect to FIG. 6C (which does not positively interfere with the counterweight assembly-we are raising this contrasting example only to show a feature that does not relate to uniform distribution-FIG. 6C does not meet the feature of a spring that positively interferes of the counterweight apparatus). In some embodiments however, forces that maintain the attachment of the spring to the counterweight are not uniformly distributed (e.g., such as where there are two bolts, one on either side, such as the embodiment of FIG. 20).

Figure 22:
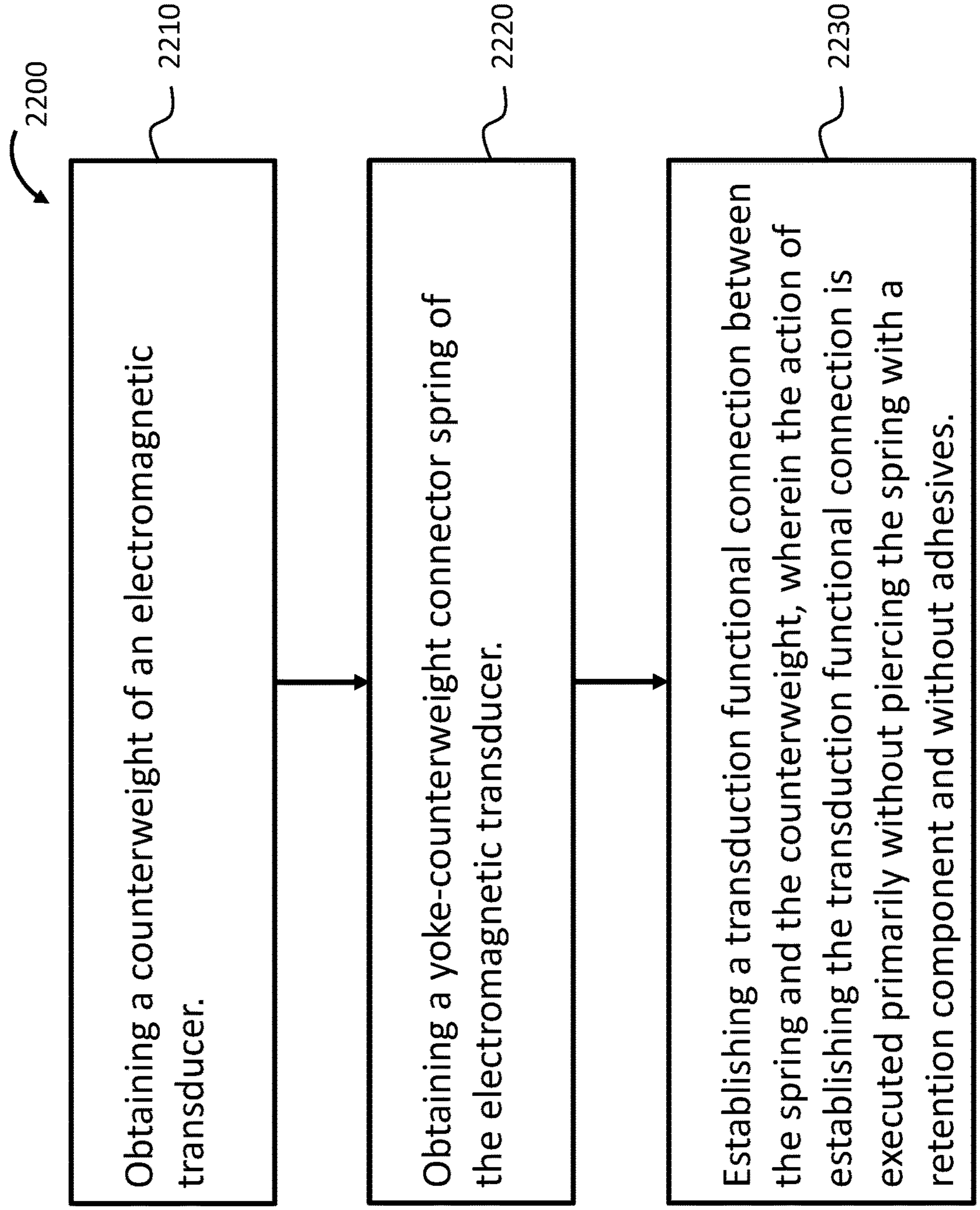
FIG. 22 depicts a flowchart for an exemplary method.

Embodiments include methods of assembly and methods of use. In this regard, FIG. 22 presents an exemplary algorithm for an exemplary method, method 2200. Method 2200 includes method action 2210, which includes obtaining a counterweight of an electromagnetic transducer. This can correspond to any of the counterweights of the embodiments of FIGS. 13-20, for example.

Method 2200 includes method action 2220, which includes obtaining a yoke-counterweight connector spring (e.g., 1556 or 1357) of the electromagnetic transducer (the spring is utilized to connect a yoke to the counterweight assembly (the yoke may or may not be directly connected to the spring)). If the yoke is part of a bobbin, the method action 2220 includes obtaining a bobbin-counterweight connector spring (e.g., 1556 or 1357) of the electromagnetic transducer (the spring is utilized to connect a bobbin to the counterweight assembly). It is noted that while method action 2220 is presented as following method action 2210, in an exemplary embodiment, method action 2220 can be executed before method action 2210 and/or can be executed at the same time. In this regard, unless otherwise noted, the order of any method action presented herein does not require that the method actions be practiced in that order. Method 2200 further includes method action 2230, which includes establishing a transduction functional connection between the spring and the counterweight, wherein the action of establishing the transduction functional connection is executed, in this embodiment, primarily, without piercing the spring with a retention component and without adhesives. (In some embodiments, there is no piercing and there is no adhesive, so the "primarily" caveat does not apply.)

By "transduction functional connection," it is meant that the connection is sufficient such that if no additional connection between the two components was applied, the connection could be utilized to execute transduction with the completed electromagnetic transducer. By way of example only and not by way of limitation, if the connection was made, for example, with such a weak connection that, for example, with respect to the bottom spring 1556. If the counterweight was lifted into the air, the spring 1556 falls off owing to its own weight, this would not be a transduction functional connection. Or, for example if a de minimis amount of shaking would cause the spring to fall off of the counterweight, the de minimis in comparison to the operational characteristics of the ultimate transducer, this too would not be a transduction functional component.

The prohibition on piercing the spring with a retention component would rule out the embodiment of FIG. 20, for example, at least where the connection is not established by some other arrangement (if, say the interference fit concept was utilized, and the bolts/screws simply provided redundancy, or if the interference fit provided the primary connection, that would be covered) and would rule out the arrangement of FIG. 6C for that matter. The "primarily caveat" does not rule out piercing the spring to attach the yoke-counterweight or bobbin-counterweight connector spring to the yoke or bobbin, respectively, providing that the primary connection is established without the piercing and without adhesives. In an exemplary embodiment, an adhesive can also be applied, but the primary connection is established irrespective of the presence of the adhesive. Still, in some other embodiments, the connection is established without piercing the spring with a retention component and/or without adhesives.

The above said, in an exemplary embodiment, where the embodiments utilize the positive interference and/or the radial connection, and adhesive for example, could be the primary connection. Here, the positive interference and/or the radial connection can be utilized to simply hold the components in place while the adhesive cures. This of course would not be a transduction functional connection established by the positive interference and/or by the radial connection (if the connection (without the adhesive) is not sufficient to be used for transduction), as the transduction functional connection is established by the adhesive. That is, such an arrangement would not be covered by method 2200. This is a different method.

In an exemplary embodiment, the action of establishing the transduction functional connection of method action 2220 is executed in less than 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.75, 0.5, or 0.25 minutes or any value or range of values therebetween in 0.01 minute increments from commencement of bringing components used to establish the connection into contact with each other. In this regard, for example, such as where the spring 1367 snap couples into the counterweight mass, method action 2200 can be executed in less than two or three minutes, and potentially in less than 30 seconds, or potentially even quicker. Accordingly, in an exemplary embodiment, the spring is snap coupled to the counterweight during the action of establishing the connection of method action 2230. This as distinct from an adhesive coupling or the bolts/rivet coupling of FIG. 6A. Again, this is not to say that rivets or bolts or screws would not be used after the snap coupling for example. This is because this is related to the execution of method action 2230 where the action is executed primarily without piercing the spring with a retention component and without an adhesive. Still, in some embodiments, the entire method can be executed such that upon the full completion of the manufacturing of the electromagnetic transducer, there are no piercings of the spring with a retention component and/or there is no adhesive. By way of example only and not by way of limitation, at the end of the manufacturing process for the electromagnetic transducer (that is, the product is ready to be shipped or put into its final configuration, such as to be placed into a percutaneous bone conduction device, a transcutaneous bone conduction device (active or passive), or a middle ear transducer, or a conventional hearing aid for that matter), the only thing that establishes the connection can be the positive interference and/or the radial connection. In some embodiments of such, the connection is only that of the embodiments of FIGS. 13-19, for example.

Accordingly, in an exemplary embodiment, there is a method that includes executing method 2200, and the method action of placing the transducer, in a completed form, into a housing of a hearing prosthesis, where the transduction functional component is maintained primarily without piercing the spring with a retention component and without adhesive. Alternatively, in an exemplary embodiment, there is a method action of placing the transducer, in a completed form, into a housing of a hearing prosthesis, where the transduction functional component is maintained without piercing the spring with a retention component and without adhesive (thus, there is no piercing or adhesive, as opposed to the "primarily" embodiments). Thus, in an exemplary embodiment, there is a modified method where the action of establishing the transduction functional connection is executed without piercing the spring with a retention component and without adhesives (there is no piercing or adhesive).

In some embodiments, the spring is at least one of clamped around or trapped in the counterweight using a clamping element or a trapping element, respectively. The clamping element could be ring 1776 of the embodiment of FIG. 17, and the trapping element could be the hardened resin/epoxy provided into recess 1818 of the embodiment of FIG. 18.

In an exemplary embodiment of method 2200, the spring is bottlecapped to the counterweight during the action of establishing the connection. By way of example only and not by way of limitation, in an exemplary embodiment, a flat plate of an embryonic finalized spring can be placed onto the top (and also the bottom with respect to the bottom spring) over the counterweight mass, and then a press can be utilized to plastically deformed the spring downward and then inward (or outward, depending on the embodiment), where the plastic deformation results in the retention of the spring to the counterweight mass. One of ordinary skill in the art can inspect the end product and determine that the spring was bottlecapped. By rough analogy, this would be like obtaining a beer bottle that is bottlecapped such that a bottlecap opener is required to remove the bottlecap (as opposed to a twist off). But that leads to another exemplary embodiment, where, in some embodiments, the spring and/or the flexible apparatus is threaded. By way of example only and not by way of limitation, the wall 1445 may not have the outwardly extending portion or an inwardly extending portion (the spring can be like spring 2057 before the bolts or holes therein, for example, but instead, the inside of the wall and/or the outside of the wall can be threaded. This can be screwed onto a thread that is located at and inboard side and/or in and/or outboard side of the counterweight mass. Note also that in some exemplary embodiments, the bands or the like can be threaded. This would establish a positive interference, positive retention. In an exemplary embodiment, the action of establishing the connection of method 2200 is executed using positive retention between the spring and the counterweight occurring at outside surfaces the counterweight (this can be inboard or outboard, for example).

For the purposes of abundant clarification, it is noted that the requirements associated with method action 2230, irrespective of whether or not there is piercing or adhesive related to the connection between the counterweight mass and the spring do not extend to the attachment regime of the spring to the bobbin. A bolt or a rivet can be utilized as the primary and/or the only means of connection between the spring and the bobbin, and still practice the embodiments of method 2200 detailed above. To be clear, in an exemplary embodiment, after and/or before practicing method 2200, there can be the action of attaching the spring to the bobbin, which action can be executed utilizing a bolts or the like such as that shown in FIG. 6A above.

The above said, in an exemplary embodiment, any one or more of the teachings associated with FIGS. 13 to 20 can be applied to attaching the spring to the bobbin. In an exemplary embodiment, a band of reduced size could be located on the side of the spring facing the bobbin, which band could snap couple around a recessed portion in the bobbin for example. Also by way of example only and not by way of limitation, a hole can be present at the center of spring 2057 by way of example, and the top of the bobbin as shown in FIG. 20 extend through the hole. In an exemplary embodiment, the spring can establish an interference fit. In an exemplary embodiment, the diameter proximate the hole of the bobbin could be reduced relative to portions above and/or below that, and the spring coat effectively snap into that reduced diameter, thus preventing the bobbin and/or spring from moving relative to one another in the longitudinal axis at the location.

Figure 12A:
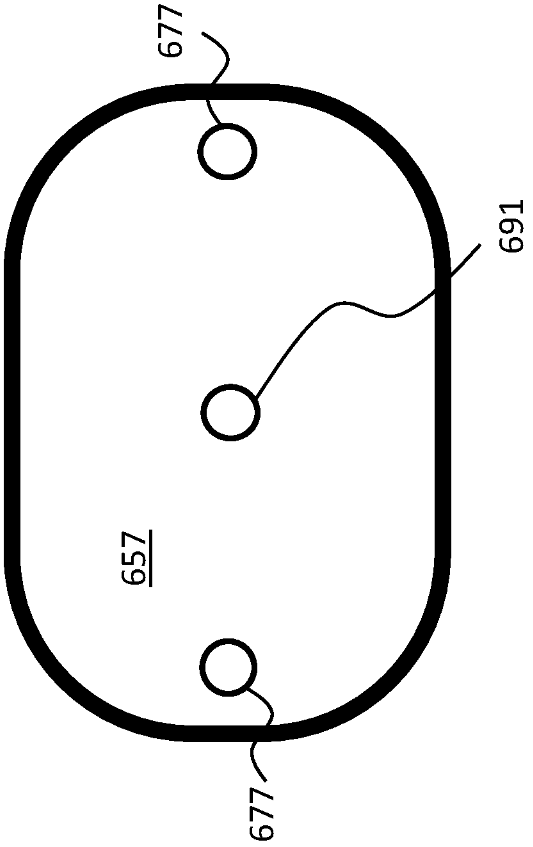
FIG. 12A presents a top view of the embodiment of FIG. 6A with the bolts of FIG. 6C.

FIG. 21 presents a view looking downward on one or more of the transducers of FIGS. 13 to 20. As can be seen, an outer circumference of the counterweight and/or spring and/or the entire transducer, lying on a plane taken normal to a radial direction of the transducer (normal to axis 1399, is at least about circular. FIG. 21 depicts a circular shape. This as contrasted to, for example, the transducer of FIG. 6A for example, which has a racetrack shape as seen in FIG. 12A. In an exemplary embodiment, continuing with reference to FIG. 21, where D1 and D2 are measured 90° offset from each other about the longitudinal axis 1399, D1 can be 0.75, 0.8, 0.85, 0.9, 0.95, 1, 1.05, 1.1, 1.15, 1.2, 1.25, or any value or rage of values therebetween in 0.01 increments (e.g., 0.83, 1.11, 0.87 to 0.122) time D2. Where D1 and D2 are the outer diameters on a given plane. It is noted that the aforementioned values for D1, in addition to what is shown in FIG. 21, can also be for other distances measured at other angles from where D2 is measured. For example, D1 can be measured 5, 10, 15, 20, 25, 30, 35, 40, 45, 50, 55, 60, 65, 70, 75, 80 and/or 85 degrees from where D2 is measured, and D1 can have the aforementioned values on any one or more of those angles.

An exemplary embodiment enables the spring tension and/or the geometry of the spring to be adjusted so as to change the resonance frequency of the transducer after the transducer has been manufactured and/or after the spring is coupled to the counterweight. With respect to the former, there can be utilitarian value with respect to enabling adjustment so as to adjust the resonance frequency for changing circumstances/environmental conditions or otherwise to compensate for changes in the overall transducer that might occur over a lifetime of use thereof. With respect to the latter, this can enable tuning during the manufacturing process and/or can enable adjustment so that the resulting transducer has a given functionality for a given intended use in one product versus another product. And of course, embodiments include methods that include executing one or more of these adjustment actions.

Figure 23:
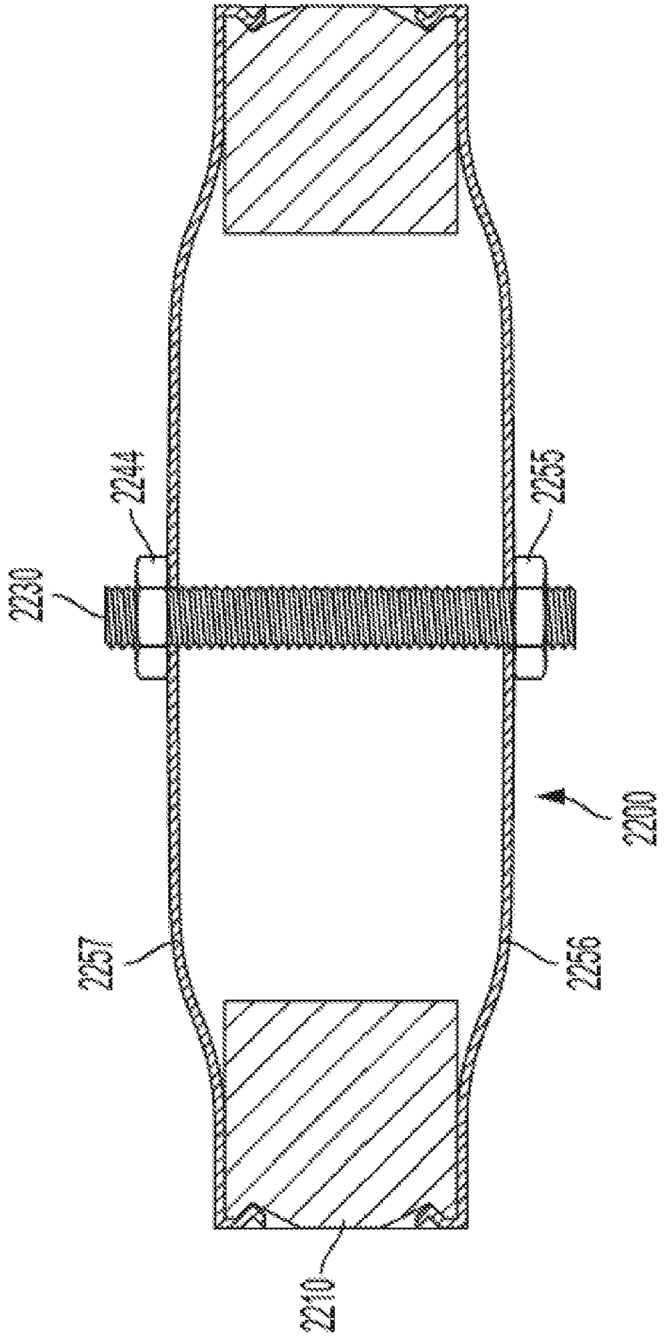
FIG. 23 depicts another exemplary transducer.

FIG. 23 presents an exemplary conceptual arrangement where the counterweight 2210 is gripped by springs 2257 and 2256. The attachment of the spring can be any attachment disclosed herein. In this regard, this embodiment does not necessarily require the attachment regimes detailed above with respect to FIGS. 13 to 20. FIG. 23 presents threaded rod 2277, to which is attached two thin nuts 2288. Nuts 2288 can be tightened or loosened, thus changing (or one nut can be tightened or loosened, depending on the arrangement), which results in an increase or decrease of tension on the spring. This can result in a change of the resonance frequency.

The embodiment depicted in FIG. 23 depicts a multi-contoured spring as seen (contoured beyond the bottle-capped portions at the ends). In an exemplary embodiment, the spring can be a flat plate spring. That is, the concepts associated with adjusting the resonance frequency can be applicable to both a contoured spring and a flat spring.

Any feature of any embodiment herein can be combined with or otherwise be present in any other feature of any other embodiment unless otherwise noted or unless otherwise not enabled. Any feature disclosed herein can be explicitly excluded from any embodiment and excluded from combination with any other embodiment unless otherwise specified or unless otherwise not enabled. Any disclosure of any manufacturing process herein corresponds to a disclosure of the resulting apparatus made from that manufacturing process. Any disclosure herein of an apparatus or device corresponds to a disclosure of making that apparatus or device. Any disclosure herein of a method corresponds to a disclosure of an apparatus and/or system for executing that method. Any disclosure herein of an apparatus and/or a system disclosed herein corresponds to a disclosure of a method of utilizing that system to achieve its functionality.

Any one or more of the features detailed herein can be combined with any other one or more of the features detailed herein unless otherwise noted provided that the art enables such. Any one or more the features detailed herein can be specifically excluded from use with or otherwise from combination with any other one or more of the features detailed herein unless otherwise noted provided that the art enables such.

Any teachings herein of the suspension systems and associated features (e.g., opening through the seismic mass, spring supports, connections with the housing, etc.) can be applicable to percutaneous bone conduction devices or transcutaneous bone conduction devices. In this regard, in an exemplary embodiment, the teachings detailed herein can be applicable to any of the embodiments of FIGS. 2, 3, and/or 4. Indeed, in an exemplary embodiment, there is a passive transcutaneous bone conduction device to which the coupling assembly is attached to a plate that interfaces with skin of the recipient. In an exemplary embodiment, the coupling assembly couples to a component of the plate just as the percutaneous bone conduction device snap couples to the abutment. In an alternate embodiment, the coupling assembly entails a shaft that extends from, for example, the bobbin, to the plate, and one of the springs can be connected to the shaft (or to any other static component). In an exemplary embodiment, the plate forms a side of the overall housing/enclosure in which the vibrator is located. In an exemplary embodiment, the teachings herein are applied to an active transcutaneous bone conduction device.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A device, comprising:
a yoke;
a counterweight apparatus; and
a flexible apparatus connecting the yoke to the counterweight apparatus and enabling the counterweight apparatus to move relative to the yoke, wherein
the flexible apparatus is attached to the counterweight apparatus via a radial connection, and
the device is an electromagnetic transducer.

2. The device of claim 1, wherein:
the flexible apparatus is attached to the counterweight apparatus via an arrangement that includes a portion that is elastically deformed in the radial direction, the deformation being maintained by the counterweight apparatus, thus maintaining attachment between the flexible apparatus and the counterweight apparatus.

3. The device of claim 1, wherein:
the flexible apparatus is attached to the counterweight apparatus via an arrangement that includes a portion that is plastically deformed in the radial direction, the deformation maintaining attachment between the flexible apparatus and the counterweight apparatus.

4. The device of claim 1, wherein:
the counterweight includes a dedicated counterweight mass having a volumetric based density at least 90% of the material density thereof.

5. The device of claim 1, wherein:
forces that maintain attachment of the flexible apparatus to the counterweight apparatus are due to the flexible apparatus.

6. The device of claim 1, wherein:
an outer circumference of the counterweight, lying on a plane taken normal to a radial direction of the transducer, is at least about circular.

7. The device of claim 1, wherein:
the flexible apparatus has a first portion that extends in a horizontal direction and also has a second portion that extends in a vertical direction away from the first portion, which second portion establishes the radial connection.

8. A device, comprising:
a counterweight apparatus; and
a spring connected to the counterweight apparatus, wherein
the spring positively interferes with the counterweight apparatus, thus attaching the counterweight apparatus to the spring, and wherein the device is an electromagnetic transducer.

9. The device of claim 8, wherein:
the positive interference occurs at an outer periphery of the counterweight apparatus.

10. The device of claim 8, wherein:
the positive interference occurs at a location inside an outer periphery of the counterweight apparatus.

11. The device of claim 8, wherein:
the spring grips the counterweight apparatus, thereby maintaining attachment between the spring and the counterweight apparatus.

12. The device of claim 8, wherein:
the spring exerts an outward force on the counterweight apparatus, thereby maintaining attachment between the spring and the counterweight apparatus.

13. The device of claim 8, wherein:
the spring is plastically deformed in the radial direction, the deformed portion maintaining attachment between the spring and the counterweight apparatus.

14. The device of claim 8, wherein:
forces that maintain attachment of the spring to the counterweight apparatus are uniformly distributed relative to the spring.

15. A method, comprising:
obtaining a counterweight of an electromagnetic transducer;
obtaining a yoke-counterweight connector spring of the electromagnetic transducer; and
establishing a transduction functional connection between the spring and the counterweight, wherein the action of establishing the transduction functional connection is executed primarily without piercing the spring with a retention component and without adhesives.

16. The method of claim 15, wherein:
the action of establishing the transduction functional connection is executed in less than 10 minutes from commencement of bringing components used to establish the connection into contact with each other.

17. The method of claim 15, wherein:
the spring is snap coupled to the counterweight during the action of establishing the connection.

18. The method of claim 15, wherein:
the spring is bottle capped to the counterweight during the action of establishing the connection.

19. The method of claim 15, wherein:
the action of establishing the connection is executed using positive retention between the spring and the counterweight occurring at outside surfaces of the counterweight.

20. The method of claim 15, further comprising:
placing the transducer, in a completed form, into a housing of a hearing prosthesis, where the transduction functional component is maintained primarily without piercing the spring with a retention component and without adhesive.

21. The method of claim 15, further comprising:
adjusting a tension on the spring to adjust a resonance frequency of the electromagnetic transducer.

* * * * *